US012690032B2

(12) United States Patent
Chen et al.

(10) Patent No.: US 12,690,032 B2
(45) Date of Patent: Jul. 21, 2026

(54) TRANSMISSION BATCH SCHEDULING AND RESOURCE MANAGEMENT

(71) Applicant: QUALCOMM Incorporated, San Diego, CA (US)

(72) Inventors: Wanshi Chen, San Diego, CA (US); Prashanth Haridas Hande, San Diego, CA (US); Jay Kumar Sundararajan, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 18/439,472

(22) Filed: Feb. 12, 2024

(65) Prior Publication Data

US 2024/0188072 A1 Jun. 6, 2024

Related U.S. Application Data

(63) Continuation of application No. 16/943,741, filed on Jul. 30, 2020, now Pat. No. 11,943,762.
(Continued)

(51) Int. Cl.
*H04W 72/1268* (2023.01)
*H04L 5/00* (2006.01)
(Continued)

(52) U.S. Cl.
CPC ......... *H04W 72/1268* (2013.01); *H04L 5/001* (2013.01); *H04L 5/0044* (2013.01); *H04L 5/1469* (2013.01); *H04W 72/23* (2023.01)

(58) Field of Classification Search
CPC .............. H04W 72/1268; H04W 72/23; H04L 5/0001; H04L 5/0044; H04L 5/1469
See application file for complete search history.

(56) References Cited

U.S. PATENT DOCUMENTS 9,844,072 B2 12/2017 Chen et al.
2006/0083236 A1 4/2006 Rachwalski et al.
(Continued)

FOREIGN PATENT DOCUMENTS

CN 109923824 A 6/2019
EP 3478019 A1 5/2019
(Continued)

OTHER PUBLICATIONS

International Preliminary Report on Patentability—PCT/US2020/044590 The International Bureau of WIPO—Geneva, Switzerland, Feb. 10, 2022.
(Continued)

*Primary Examiner* — Kevin M Cunningham
(74) *Attorney, Agent, or Firm* — Holland & Hart LLP

(57) ABSTRACT

Methods, systems, and devices for wireless communications are described. Devices of a wireless communications system may be configured to group data packets as a batch or file. In some cases, resources may be determined based on one or more resource grants corresponding to file communication. Other aspects may include DCI configurations corresponding to file communication, resource grants may be configured to assign resources for communication of a file. For example, a DCI may be specifically configured for granting resources for communication of a file. In another example, configured grants may include a configured grant index corresponding to communication of a file. Other aspects may include configuration of a UE for responding to a preemption indication when a file is scheduled for communication, power adjustments for communication of a file, reference signal configurations for communication of a file, and/or coherent detection/transmission across two or more packets of a file.

19 Claims, 33 Drawing Sheets

Related U.S. Application Data

(60) Provisional application No. 62/881,719, filed on Aug. 1, 2019.

(51) Int. Cl.
   H04L 5/14     (2006.01)
   H04W 72/23    (2023.01)

(56)               References Cited

U.S. PATENT DOCUMENTS

| | | | |
|---|---|---|---|
| 2014/0105096 | A1 | 4/2014 | Wang et al. |
| 2014/0198664 | A1 | 7/2014 | Chen et al. |
| 2014/0317350 | A1 | 10/2014 | Langas et al. |
| 2015/0189544 | A1 | 7/2015 | Chen et al. |
| 2017/0118114 | A1 | 4/2017 | Shelar et al. |
| 2017/0230994 | A1 | 8/2017 | You et al. |
| 2018/0026740 | A1 * | 1/2018 | Chen ..................... H01J 49/165 370/328 |
| 2018/0199359 | A1 | 7/2018 | Cao et al. |
| 2018/0288746 | A1 | 10/2018 | Zhang et al. |
| 2019/0166057 | A1 | 5/2019 | Gilson |
| 2019/0190687 | A1 | 6/2019 | Yi et al. |
| 2019/0306801 | A1 | 10/2019 | Zhou et al. |
| 2019/0306857 | A1 | 10/2019 | Lin |
| 2019/0342874 | A1 * | 11/2019 | Davydov .............. H04W 72/23 |
| 2020/0107400 | A1 * | 4/2020 | Sun ........................ H04W 72/23 |
| 2020/0267663 | A1 * | 8/2020 | Xu ....................... H04B 17/327 |
| 2021/0037552 | A1 | 2/2021 | Chen et al. |
| 2021/0212105 | A1 | 7/2021 | Takeda et al. |

FOREIGN PATENT DOCUMENTS

| | | |
|---|---|---|
| WO | WO-2016048593 | 3/2016 |
| WO | WO2019103797 | 5/2019 |

OTHER PUBLICATIONS

International Search Report and Written Opinion—PCT/US2020/044590—ISA/EPO—Oct. 28, 2020.

* cited by examiner

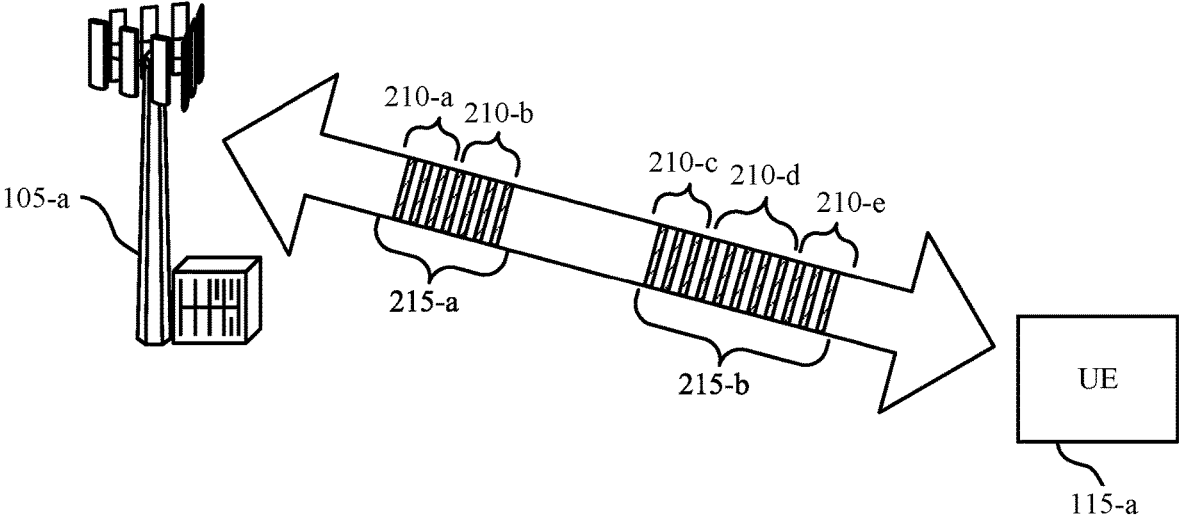
105-a
210-a 210-b
210-c 210-d
210-e
215-a
215-b
UE
115-a
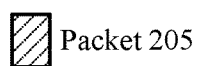 Packet 205
200
FIG. 2

Preemption Indication 510

Packet 530

615

File 105-d

UE 115-d

Legacy DCI 605

Transmission Batch DCI 610

Packet 630

600

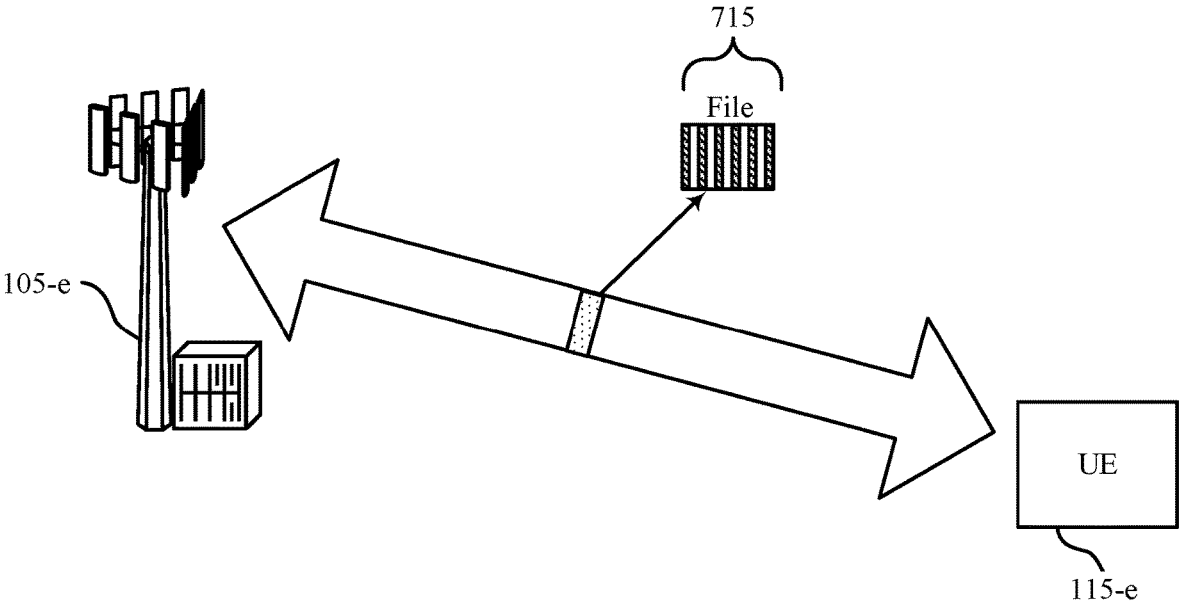
715
File
105-e
UE
115-e
 Transmission Batch Configured
Grant 710
Packet 730
700
FIG. 7

115

805 — Identify Transmission Direction Schedule For Slot

Grant

810

815 — Identify Symbols Of The Slot

820 — Determine Transmission Power

105

825 — Communicate

800

115

105

Control Channel

905

910 Identify First Set Of Decoding Candidates

915 Identify Second Set Of Decoding Candidates

920 Communicate

900

Transmission Direction Identifier

1310

Symbol Identifier

1320

Batch Decoding Component

1330

Grant Activation Component

1340

Resource Identification Component

1350

Preemption Interface

1360

Grant Receiving Interface

1315

Communication Interface

1325

Decoding Component

1335

Batch Transmission Component

1345

Preemption Processing Component

1355

Transmission Power Component

1365

1305

1300

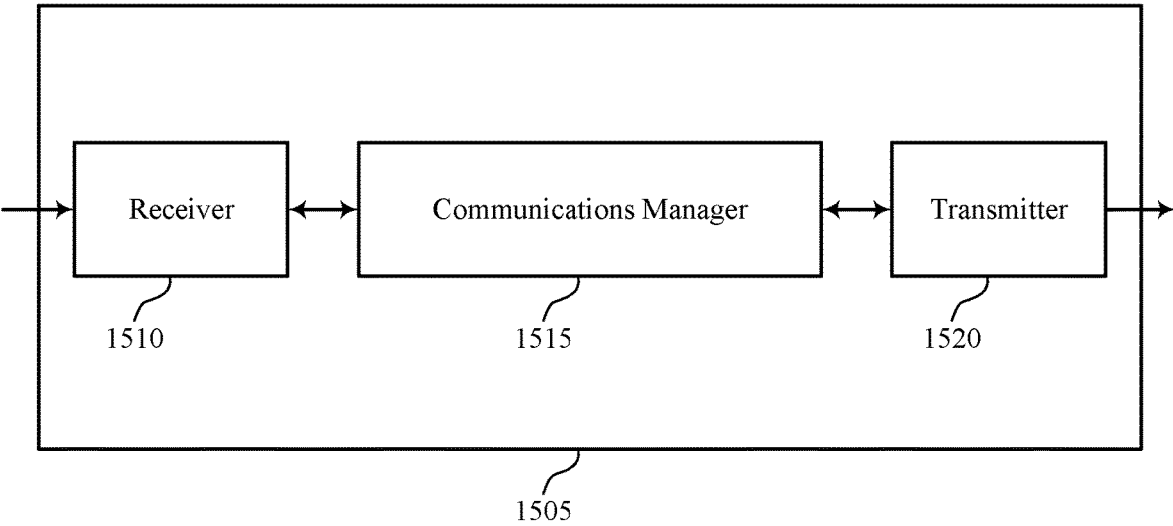
1510          1515          1520
1505
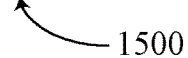 1500
FIG. 15

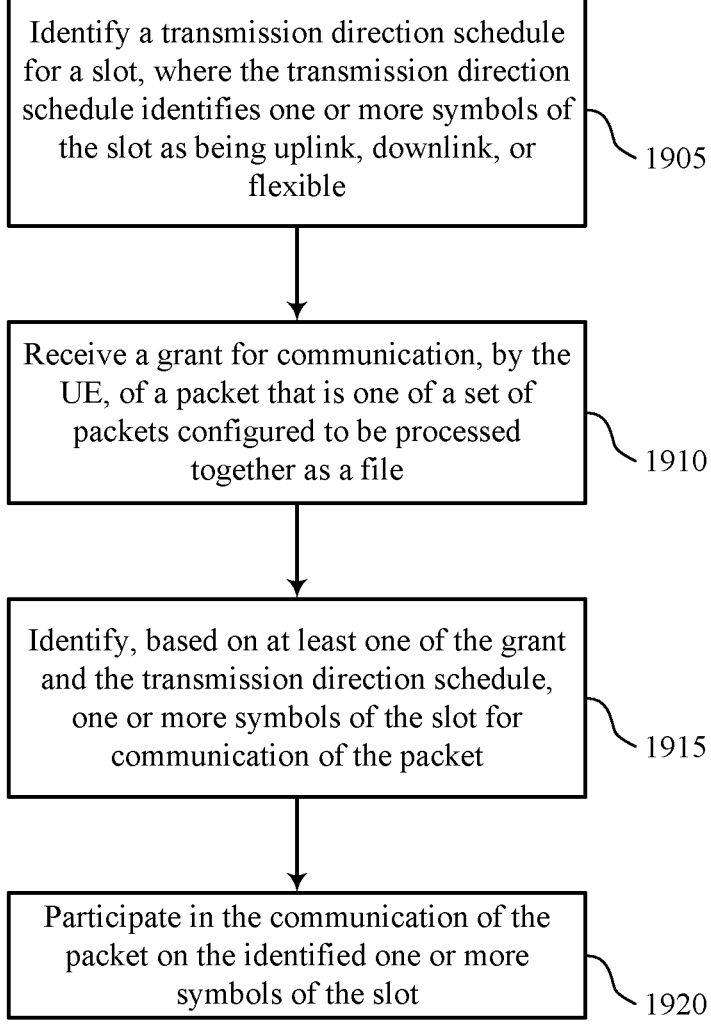

Identify a transmission direction schedule for a slot, where the transmission direction schedule identifies one or more symbols of the slot as being uplink, downlink, or flexible          1905

Receive a grant for communication, by the UE, of a packet that is one of a set of packets configured to be processed together as a file          1910

Identify, based on at least one of the grant and the transmission direction schedule, one or more symbols of the slot for communication of the packet          1915

Participate in the communication of the packet on the identified one or more symbols of the slot          1920

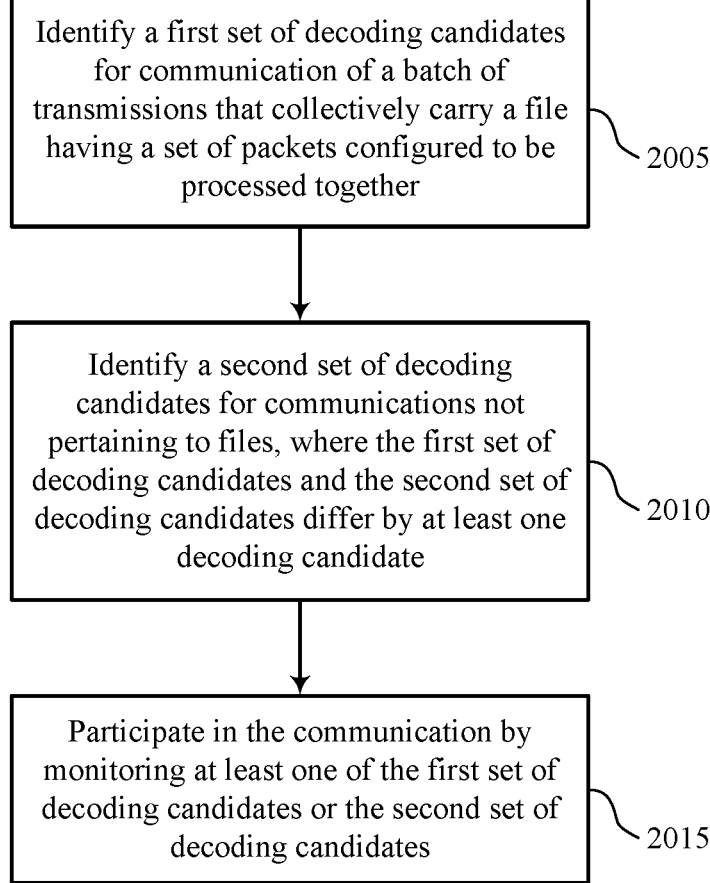

Identify a first set of decoding candidates for communication of a batch of transmissions that collectively carry a file having a set of packets configured to be processed together

2005

Identify a second set of decoding candidates for communications not pertaining to files, where the first set of decoding candidates and the second set of decoding candidates differ by at least one decoding candidate

2010

Participate in the communication by monitoring at least one of the first set of decoding candidates or the second set of decoding candidates

Figure 21:
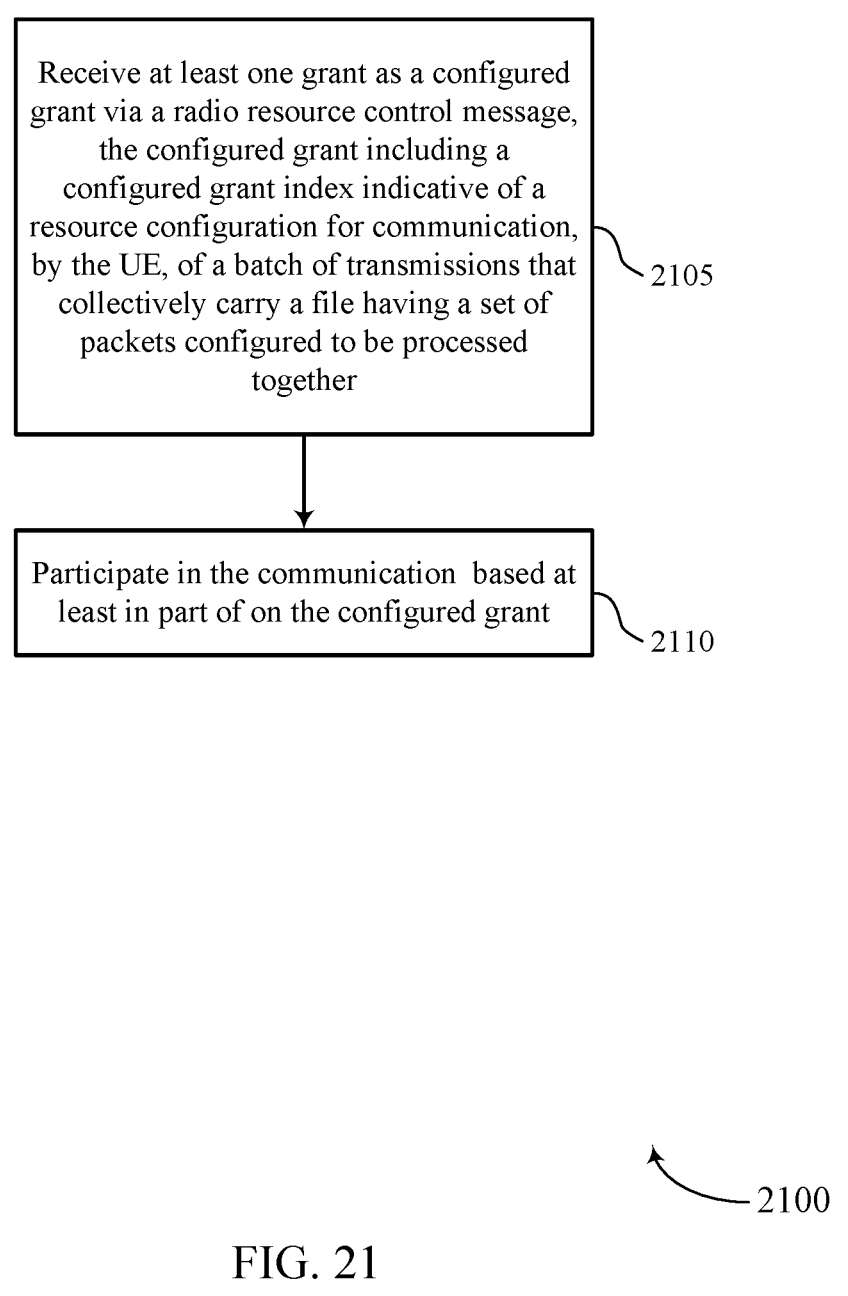

Receive at least one grant as a configured grant via a radio resource control message, the configured grant including a configured grant index indicative of a resource configuration for communication, by the UE, of a batch of transmissions that collectively carry a file having a set of packets configured to be processed together ⟍ 2105

Participate in the communication based at least in part of on the configured grant ⟍ 2110

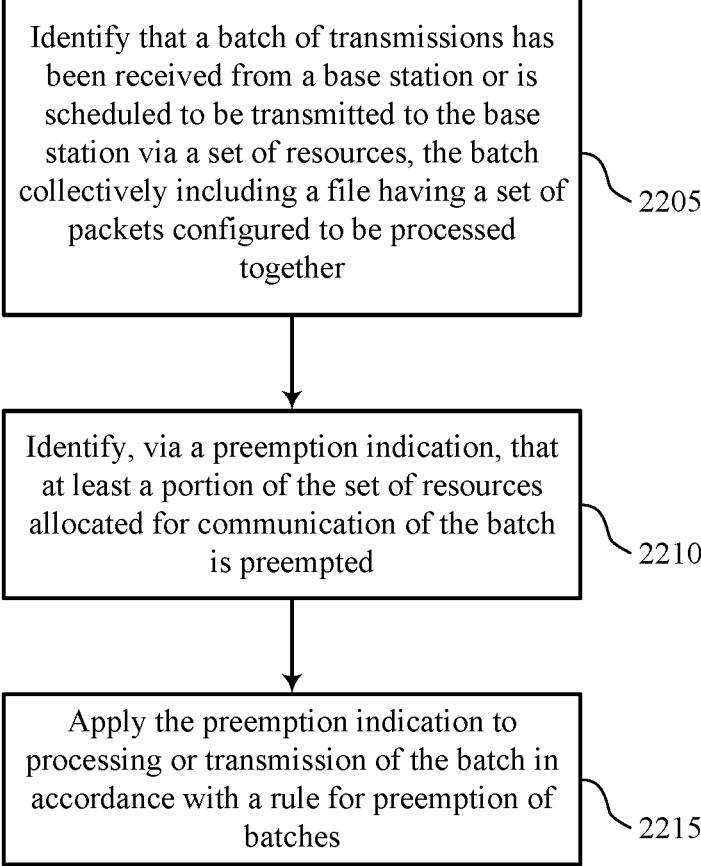

Identify that a batch of transmissions has been received from a base station or is scheduled to be transmitted to the base station via a set of resources, the batch collectively including a file having a set of packets configured to be processed together

2205

Identify, via a preemption indication, that at least a portion of the set of resources allocated for communication of the batch is preempted

2210

Apply the preemption indication to processing or transmission of the batch in accordance with a rule for preemption of batches

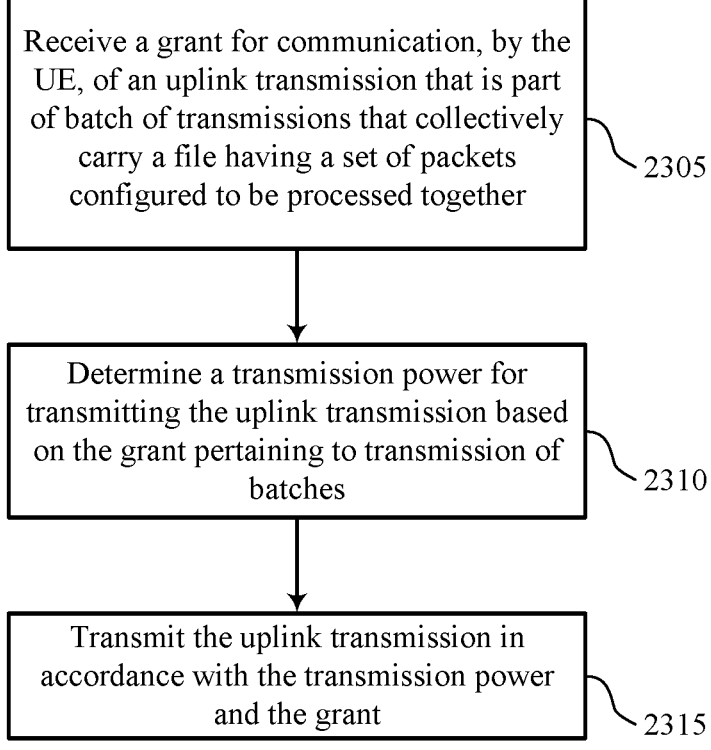

Receive a grant for communication, by the UE, of an uplink transmission that is part of batch of transmissions that collectively carry a file having a set of packets configured to be processed together    2305

Determine a transmission power for transmitting the uplink transmission based on the grant pertaining to transmission of batches    2310

Transmit the uplink transmission in accordance with the transmission power and the grant    2315

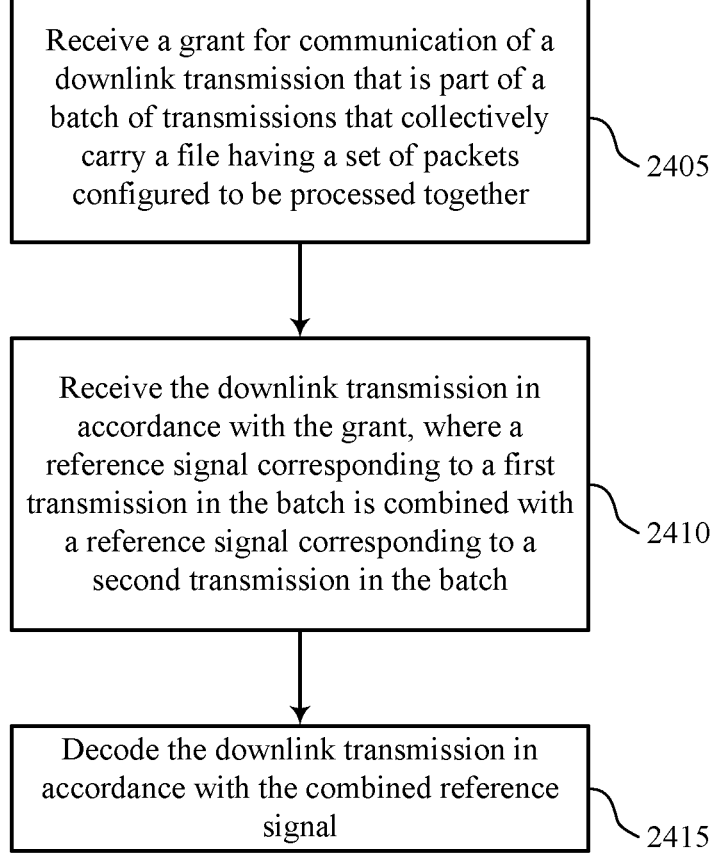

Receive a grant for communication of a downlink transmission that is part of a batch of transmissions that collectively carry a file having a set of packets configured to be processed together

2405

Receive the downlink transmission in accordance with the grant, where a reference signal corresponding to a first transmission in the batch is combined with a reference signal corresponding to a second transmission in the batch

2410

Decode the downlink transmission in accordance with the combined reference signal

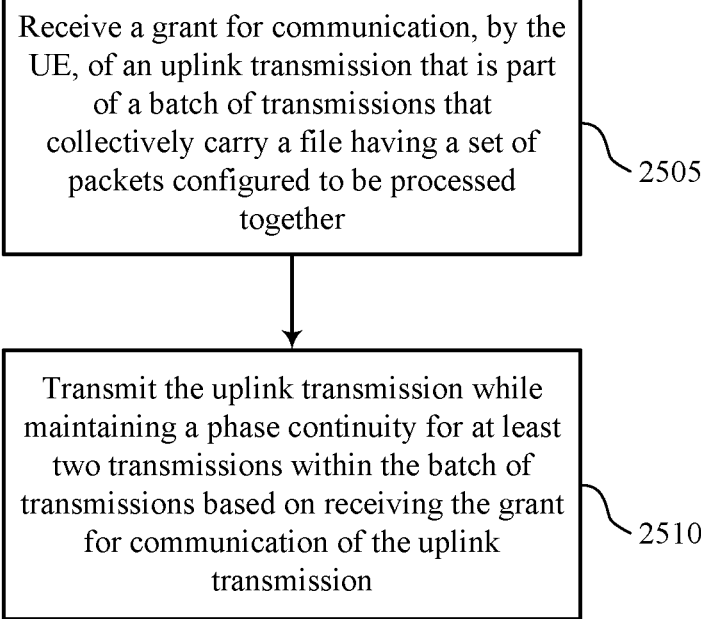

Receive a grant for communication, by the UE, of an uplink transmission that is part of a batch of transmissions that collectively carry a file having a set of packets configured to be processed together

2505

Transmit the uplink transmission while maintaining a phase continuity for at least two transmissions within the batch of transmissions based on receiving the grant for communication of the uplink transmission

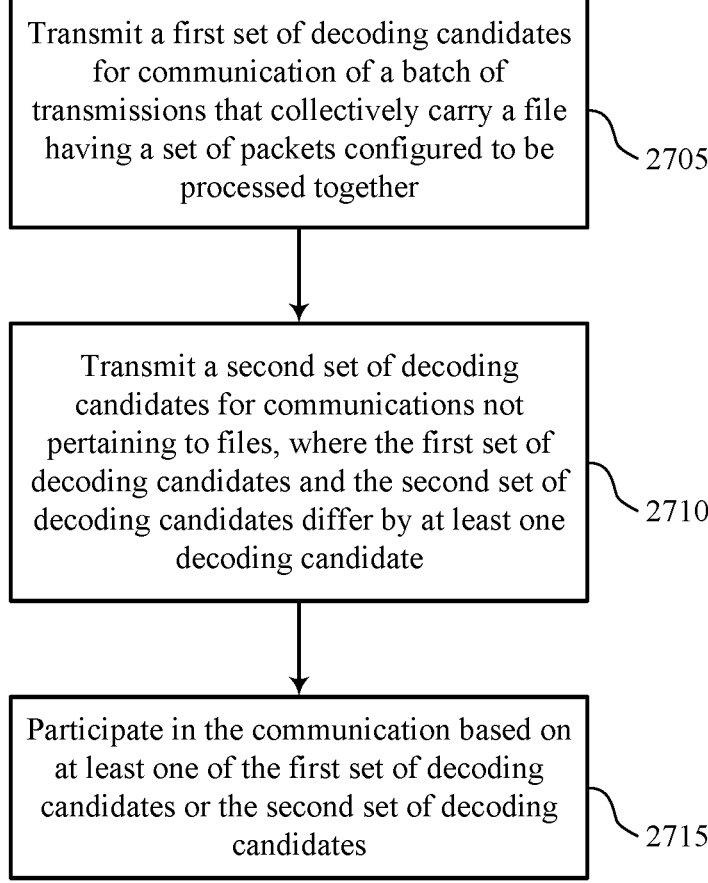

Transmit a first set of decoding candidates for communication of a batch of transmissions that collectively carry a file having a set of packets configured to be processed together

2705

Transmit a second set of decoding candidates for communications not pertaining to files, where the first set of decoding candidates and the second set of decoding candidates differ by at least one decoding candidate

2710

Participate in the communication based on at least one of the first set of decoding candidates or the second set of decoding candidates

Figure 28:
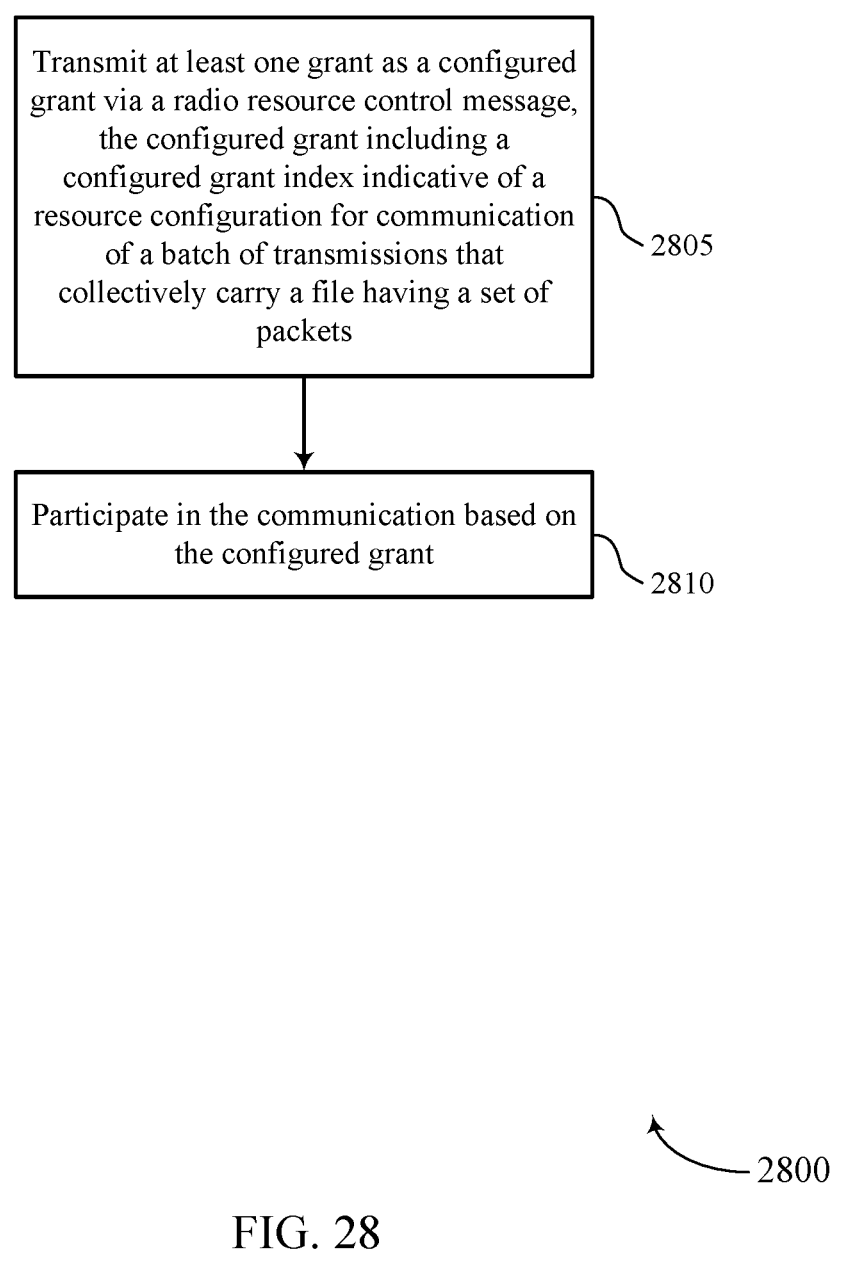

Transmit at least one grant as a configured grant via a radio resource control message, the configured grant including a configured grant index indicative of a resource configuration for communication of a batch of transmissions that collectively carry a file having a set of packets

~2805

Participate in the communication based on the configured grant

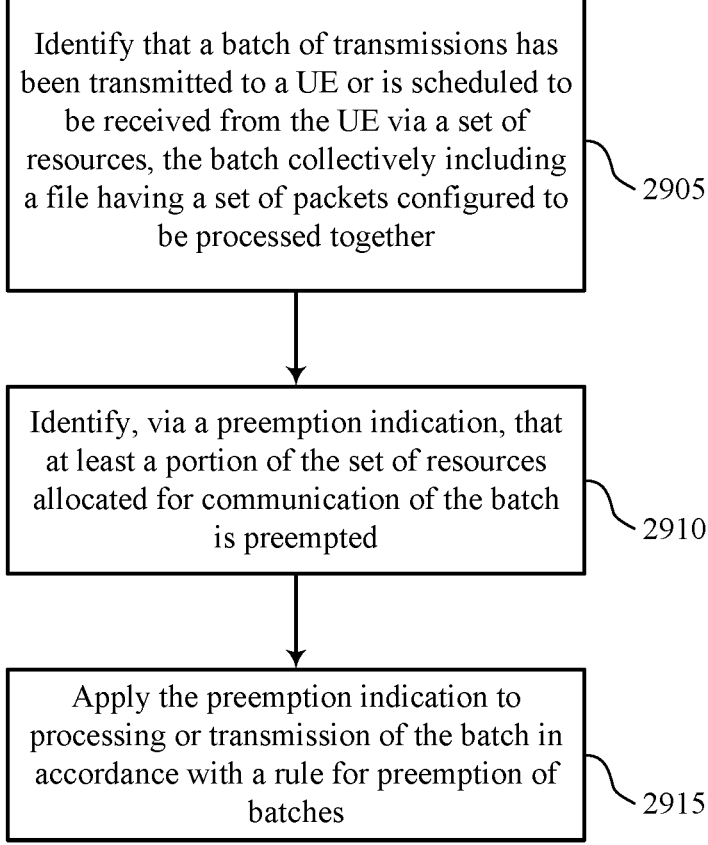

Identify that a batch of transmissions has been transmitted to a UE or is scheduled to be received from the UE via a set of resources, the batch collectively including a file having a set of packets configured to be processed together

2905

Identify, via a preemption indication, that at least a portion of the set of resources allocated for communication of the batch is preempted

2910

Apply the preemption indication to processing or transmission of the batch in accordance with a rule for preemption of batches

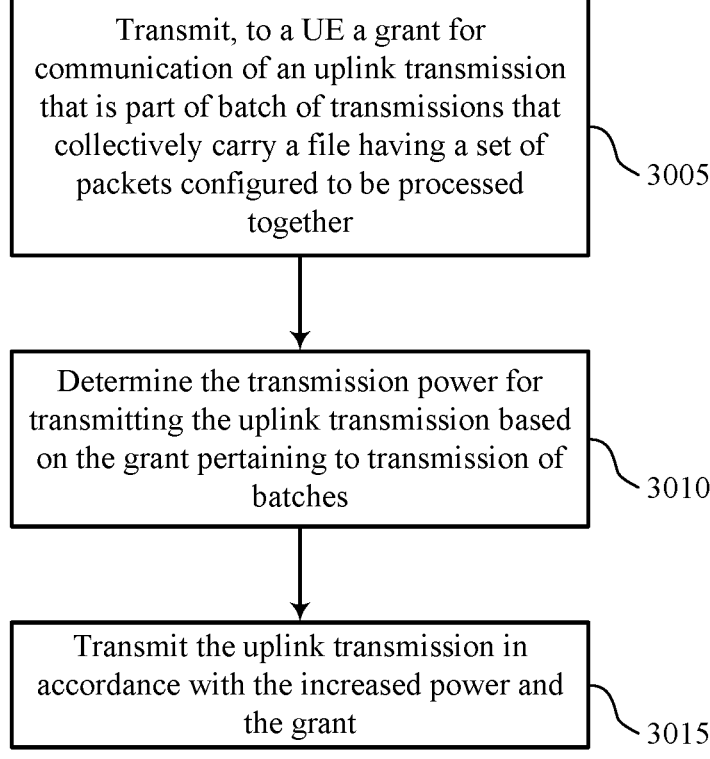

Transmit, to a UE a grant for communication of an uplink transmission that is part of batch of transmissions that collectively carry a file having a set of packets configured to be processed together

3005

Determine the transmission power for transmitting the uplink transmission based on the grant pertaining to transmission of batches

3010

Transmit the uplink transmission in accordance with the increased power and the grant

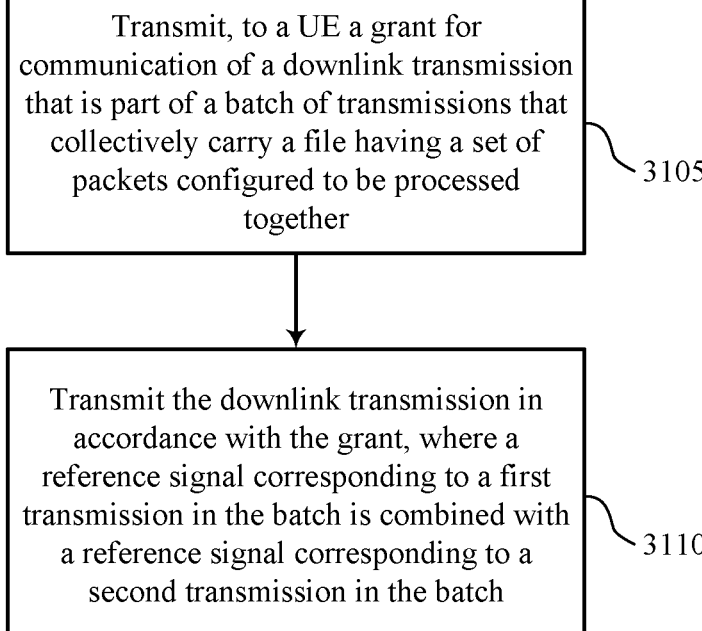

Transmit, to a UE a grant for communication of a downlink transmission that is part of a batch of transmissions that collectively carry a file having a set of packets configured to be processed together

3105

Transmit the downlink transmission in accordance with the grant, where a reference signal corresponding to a first transmission in the batch is combined with a reference signal corresponding to a second transmission in the batch

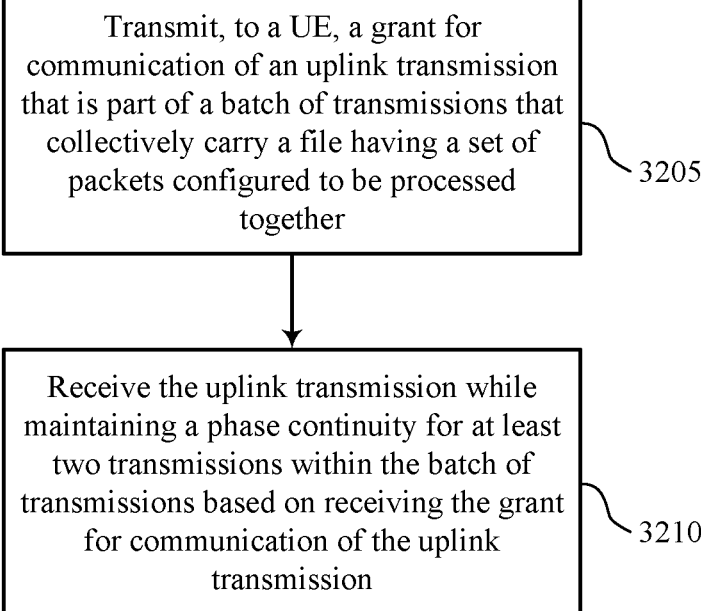

Transmit, to a UE, a grant for communication of an uplink transmission that is part of a batch of transmissions that collectively carry a file having a set of packets configured to be processed together ⟍ 3205

Receive the uplink transmission while maintaining a phase continuity for at least two transmissions within the batch of transmissions based on receiving the grant for communication of the uplink transmission ⟍ 3210

TRANSMISSION BATCH SCHEDULING AND RESOURCE MANAGEMENT

CROSS REFERENCE

The present Application for Patent is a Continuation of U.S. patent application Ser. No. 16/943,741 by CHEN et al., entitled, "TRANSMISSION BATCH SCHEDULING AND RESOURCE MANAGEMENT" filed Jul. 30, 2020, which claims the benefit of U.S. Provisional Patent Application No. 62/881,719 by CHEN et al., entitled "TRANSMISSION BATCH SCHEDULING AND RESOURCE MANAGE-MENT," filed Aug. 1, 2019, assigned to the assignee hereof, and expressly incorporated by reference herein.

TECHNICAL FIELD

The following relates generally to wireless communications and more specifically to transmission batch scheduling and resource management.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include a number of base stations or network access nodes, each simultaneously supporting communication for multiple communication devices, which may be otherwise known as user equipment (UE).

Some wireless communications systems (for example, NR systems), may support high throughput and low latency communications. Some techniques for supporting high throughput and low latency communications, however, may be improved.

SUMMARY

The described techniques relate to improved methods, systems, devices, and apparatuses that support transmission batch scheduling and resource management. Generally, the described techniques provide for protocols for communicating an extended reality (XR) file of an XR application. A user equipment (UE) in a wireless communications system, such as a New Radio (NR) system or a Long Term Evolution (LTE) system, may support applications associated with high throughput and low latency. Specifically, wireless communications systems supporting XR applications may be associated with a high data rate requirement and a tight delay budget. In some example XR applications, one or more transmitted packets may be in the form of groups or files.

According to one or more aspects of the present disclosure, a UE may identify a packet that is one of a set of packets configured to be processed together as a file. The UE may perform resource management for communicating the packet based on identifying that the packet is one of the set of packets configured to be processed together as the file. The UE may further participate in the communicating of the packet in accordance with the resource management and the packet being one of the set of packets configured to be processed together as the file.

According to one or more aspects of the present disclosure, to perform the resource management, UE may identify a transmission direction schedule for a slot. The schedule may identify one or more symbols of the slot as being uplink, downlink, or flexible. The UE may receive a grant for communication of a file, which may include a plurality of packets configured to be processed together. Based on the transmission direction schedule and the grant, the UE may identify one or more symbols in the slot for communication of one or more of the packets of the file and participate in the communication of the packet on the identified slots. Participation in communication of the packet may include transmitting a batch of transmissions including the packet or receiving a batch of transmissions including the packet. In some cases, the UE identifies the transmission direction schedule for the symbols based on a transmission direction schedule received via a cell-specific or UE-specific radio resource control message. The UE may also identify one or more flexible symbols of the slot as being an uplink or downlink symbol based on whether the grant is a UE-specific downlink control information (DCI) message, a configured grant, a group common DCI, etc.

According to one or more additional aspects of the present disclosure, to perform the resource management, a UE may identify a first set of decoding candidates and a second set of decoding candidates. The first set of decoding candidates may be designated for communication of a batch of transmissions that collectively carry a file having a plurality of packets configured to be processed together. The second set of decoding candidates may be allocated for communications not pertaining to files. Further, the second set of decoding candidates may differ from the first set of decoding candidates by at least one decoding candidate. The UE may also participate in communication by monitoring at least one of the first set of decoding candidates or the second set of decoding candidates. Identification of the first and second set of decoding candidates may include monitoring for a cell-specific or a group-specific downlink channel or monitoring for one or more UE-specific grants.

According to an additional aspect of the present disclosure, to perform the resource management, a UE may participate in communication of a file based on a received configured grant index. The UE may receive at least one grant as a configured grant via a radio resource control message. The configured grant may include the index indicative a resource configuration for communication of a batch of transmissions that collectively carry the file having a plurality of packets configured to be processed together. The UE may then participate in the communication based at least in part on the configured grant. The UE may activate the configured grant based on the size of the file, buffer size, quality of service requirements, or a combination thereof. Activation of the configured grant may assign one or more transport blocks for communication of the file.

In additional aspects of the present disclosure, to perform the resource management, the UE may be configured to communicate a batch of transmission comprising a file having a plurality of packets configured to be processed together based on a preemption indication. The preemption indication may identify that at least portion of a set of resources allocated for communication of the batch is preempted. The UE may apply the preemption indication to processing or transmission of the batch in accordance with a rule for preemption of the batch. The rule may indicate whether the UE ignores the preemption indication, processes, or communicates the batch based on the preemption indication, etc.

According to one or more additional aspects of the present disclosure, to perform the resource management, the UE may adjust a transmission power for transmitting a batch of transmissions that collectively carry a file having a plurality of packets configured to be processed together. For example, the UE may increase the transmission power for communication of the file such that the file has an increased likelihood of being received and processed at a base station. Further, a batch of transmissions that carry a file may also include combined reference signals such that the file may have an increased likelihood of being received and processed. In some cases, a UE may schedule a file for uplink transmission based on a received grant and maintain a phase continuity for a least two transmissions within a batch configured to carry the file.

A method of wireless communications at a UE is described. The method may include identifying a packet that is one of a set of packets configured to be processed together as a file, performing resource management for communicating the packet based on identifying that the packet is one of the set of packets configured to be processed together as the file, and participating in the communicating of the packet in accordance with the resource management and the packet being one of the set of packets configured to be processed together as the file.

An apparatus for wireless communications at a UE is described. The apparatus may include a processor, memory coupled (e.g., operatively, communicatively, functionally, electronically, electrically, etc.) with the processor, and instructions stored in the memory. The instructions may be executable by the processor to cause the apparatus to identify a packet that is one of a set of packets configured to be processed together as a file, perform resource management for communicating the packet based on identifying that the packet is one of the set of packets configured to be processed together as the file, and participate in the communicating of the packet in accordance with the resource management and the packet being one of the set of packets configured to be processed together as the file.

Another apparatus for wireless communications at a UE is described. The apparatus may include means for identifying a packet that is one of a set of packets configured to be processed together as a file, performing resource management for communicating the packet based on identifying that the packet is one of the set of packets configured to be processed together as the file, and participating in the communicating of the packet in accordance with the resource management and the packet being one of the set of packets configured to be processed together as the file.

A non-transitory computer-readable medium storing code for wireless communications at a UE is described. The code may include instructions executable by a processor to identify a packet that is one of a set of packets configured to be processed together as a file, perform resource management for communicating the packet based on identifying that the packet is one of the set of packets configured to be processed together as the file, and participate in the communicating of the packet in accordance with the resource management and the packet being one of the set of packets configured to be processed together as the file.

A method of wireless communications at a UE is described. The method may include identifying a transmission direction schedule for a slot, where the transmission direction schedule identifies one or more symbols of the slot as being uplink, downlink, or flexible, receiving a grant for communication, by the UE, of a packet that is one of a set of packets configured to be processed together as a file, identifying, based on at least one of the grant and the transmission direction schedule, one or more symbols of the slot for communication of the packet, and participating in the communication of the packet on the identified one or more symbols of the slot.

An apparatus for wireless communications at a UE is described. The apparatus may include a processor, memory coupled (e.g., operatively, communicatively, functionally, electronically, electrically, etc.) with the processor, and instructions stored in the memory. The instructions may be executable by the processor to cause the apparatus to identify a transmission direction schedule for a slot, where the transmission direction schedule identifies one or more symbols of the slot as being uplink, downlink, or flexible, receive a grant for communication, by the UE, of a packet that is one of a set of packets configured to be processed together as a file, identify, based on at least one of the grant and the transmission direction schedule, one or more symbols of the slot for communication of the packet, and participate in the communication of the packet on the identified one or more symbols of the slot.

Another apparatus for wireless communications at a UE is described. The apparatus may include means for identifying a transmission direction schedule for a slot, where the transmission direction schedule identifies one or more symbols of the slot as being uplink, downlink, or flexible, receiving a grant for communication, by the UE, of a packet that is one of a set of packets configured to be processed together as a file, identifying, based on at least one of the grant and the transmission direction schedule, one or more symbols of the slot for communication of the packet, and participating in the communication of the packet on the identified one or more symbols of the slot.

A non-transitory computer-readable medium storing code for wireless communications at a UE is described. The code may include instructions executable by a processor to identify a transmission direction schedule for a slot, where the transmission direction schedule identifies one or more symbols of the slot as being uplink, downlink, or flexible, receive a grant for communication, by the UE, of a packet that is one of a set of packets configured to be processed together as a file, identify, based on at least one of the grant and the transmission direction schedule, one or more symbols of the slot for communication of the packet, and participate in the communication of the packet on the identified one or more symbols of the slot.

In some examples of the method, apparatuses, and non-transitory computer-readable medium described herein, identifying the transmission direction schedule for the slot may include operations, features, means, or instructions for receiving the transmission direction schedule via a cell-specific or UE-specific radio resource control message, where a transmission direction of the one or more symbols, as indicated by the grant, may be in accordance with the transmission direction schedule for the one or more symbols.

In some examples of the method, apparatuses, and non-transitory computer-readable medium described herein, identifying the one or more symbols of the slot for communication of the packet may include operations, features, means, or instructions for identifying that at least one of the one or more symbols may be a flexible symbol, as indicated by the transmission direction schedule.

In some examples of the method, apparatuses, and non-transitory computer-readable medium described herein, receiving the grant for communication of the packet further may include operations, features, means, or instructions for receiving the grant via a UE-specific downlink control information message, where a transmission direction of the flexible symbol may be based on the grant.

In some examples of the method, apparatuses, and non-transitory computer-readable medium described herein, receiving the grant for communication of the packet further may include operations, features, means, or instructions for receiving the grant as a configured grant via a radio resource control message, and receiving a group common downlink control information message, where a transmission direction of the flexible symbol may be based on the group common downlink control information message.

In some examples of the method, apparatuses, and non-transitory computer-readable medium described herein, receiving the grant for communication of the packet further may include operations, features, means, or instructions for receiving the grant as a configured grant via a radio resource control message, where a transmission direction of the flexible symbol may be based on the grant.

In some examples of the method, apparatuses, and non-transitory computer-readable medium described herein, receiving the grant for communication of the packet further may include operations, features, means, or instructions for receiving the grant as a configured grant via a radio resource control message, and receiving a group common downlink control information message, where a transmission direction of the flexible symbol may be based on the group common downlink control information message and where the group common downlink control information message may be formatted as a file-specific format.

A method of wireless communications at a UE is described. The method may include identifying a first set of decoding candidates for communication of a batch of transmissions that collectively carry a file having a set of packets configured to be processed together, identifying a second set of decoding candidates for communications not pertaining to files, where the first set of decoding candidates and the second set of decoding candidates differ by at least one decoding candidate, and participating in the communication by monitoring at least one of the first set of decoding candidates or the second set of decoding candidates.

An apparatus for wireless communications at a UE is described. The apparatus may include a processor, memory coupled (e.g., operatively, communicatively, functionally, electronically, electrically, etc.) with the processor, and instructions stored in the memory. The instructions may be executable by the processor to cause the apparatus to identify a first set of decoding candidates for communication of a batch of transmissions that collectively carry a file having a set of packets configured to be processed together, identify a second set of decoding candidates for communications not pertaining to files, where the first set of decoding candidates and the second set of decoding candidates differ by at least one decoding candidate, and participate in the communication by monitoring at least one of the first set of decoding candidates or the second set of decoding candidates.

Another apparatus for wireless communications at a UE is described. The apparatus may include means for identifying a first set of decoding candidates for communication of a batch of transmissions that collectively carry a file having a set of packets configured to be processed together, identifying a second set of decoding candidates for communications not pertaining to files, where the first set of decoding candidates and the second set of decoding candidates differ by at least one decoding candidate, and participating in the communication by monitoring at least one of the first set of decoding candidates or the second set of decoding candidates.

A non-transitory computer-readable medium storing code for wireless communications at a UE is described. The code may include instructions executable by a processor to identify a first set of decoding candidates for communication of a batch of transmissions that collectively carry a file having a set of packets configured to be processed together, identify a second set of decoding candidates for communications not pertaining to files, where the first set of decoding candidates and the second set of decoding candidates differ by at least one decoding candidate, and participate in the communication by monitoring at least one of the first set of decoding candidates or the second set of decoding candidates.

In some examples of the method, apparatuses, and non-transitory computer-readable medium described herein, identifying the first set of decoding candidates and identifying the second set of decoding candidates further may include operations, features, means, or instructions for monitoring a cell-specific or a group-specific downlink control channel.

In some examples of the method, apparatuses, and non-transitory computer-readable medium described herein, identifying the first set of decoding candidates and identifying the second set of decoding candidates further may include operations, features, means, or instructions for monitoring for one or more UE-specific grants.

In some examples of the method, apparatuses, and non-transitory computer-readable medium described herein, the first set of decoding candidates and the second set of decoding candidates differ by at least one decoding candidate based on a set of aggregation levels, a set of decoding candidates for a given aggregation level, or a downlink control information message size.

In some examples of the method, apparatuses, and non-transitory computer-readable medium described herein, the first set of decoding candidates may have a higher aggregation level than the second set of decoding candidates.

In some examples of the method, apparatuses, and non-transitory computer-readable medium described herein, a downlink control information in the first set of decoding candidates includes an indication linking the downlink control information message to a previous downlink message in a previous grant corresponding to the batch of transmissions.

A method of wireless communications at a UE is described. The method may include receiving at least one grant as a configured grant via a radio resource control message, the configured grant including a configured grant index indicative of a resource configuration for communication, by the UE, of a batch of transmissions that collectively carry a file having a set of packets configured to be processed together and participating in the communication based at least in part of on the configured grant.

An apparatus for wireless communications at a UE is described. The apparatus may include a processor, memory coupled (e.g., operatively, communicatively, functionally, electronically, electrically, etc.) with the processor, and instructions stored in the memory. The instructions may be executable by the processor to cause the apparatus to receive at least one grant as a configured grant via a radio resource control message, the configured grant including a configured grant index indicative of a resource configuration for communication, by the UE, of a batch of transmissions that collectively carry a file having a set of packets configured to be processed together and participate in the communication based at least in part of on the configured grant.

Another apparatus for wireless communications at a UE is described. The apparatus may include means for receiving at least one grant as a configured grant via a radio resource control message, the configured grant including a configured grant index indicative of a resource configuration for communication, by the UE, of a batch of transmissions that collectively carry a file having a set of packets configured to be processed together and participating in the communication based at least in part of on the configured grant.

A non-transitory computer-readable medium storing code for wireless communications at a UE is described. The code may include instructions executable by a processor to receive at least one grant as a configured grant via a radio resource control message, the configured grant including a configured grant index indicative of a resource configuration for communication, by the UE, of a batch of transmissions that collectively carry a file having a set of packets configured to be processed together and participate in the communication based at least in part of on the configured grant.

In some examples of the method, apparatuses, and non-transitory computer-readable medium described herein, receiving the at least one grant as the configured grant may include operations, features, means, or instructions for receiving the configured grant including one or more assignments for the communication of the file using two or more transport blocks.

In some examples of the method, apparatuses, and non-transitory computer-readable medium described herein, the two or more transport blocks may be scheduled by the one or more assignments to be transmitted or received in two or more adjacent slots.

Some examples of the method, apparatuses, and non-transitory computer-readable medium described herein may further include operations, features, means, or instructions for activating the configured grant based on the file, a buffer size, quality of service requirements, or a combination thereof.

In some examples of the method, apparatuses, and non-transitory computer-readable medium described herein, the activation indicates a number of transport blocks for communication of the batch of transmissions.

In some examples of the method, apparatuses, and non-transitory computer-readable medium described herein, the configured grant may be for communication of the file via uplink resources, downlink resources, or sidelink resources.

A method of wireless communications at a UE is described. The method may include identifying that a batch of transmissions has been received from a base station or is scheduled to be transmitted to the base station via a set of resources, the batch collectively including a file having a set of packets configured to be processed together, identifying, via a preemption indication, that at least a portion of the set of resources allocated for communication of the batch is preempted, and applying the preemption indication to processing or transmission of the batch in accordance with a rule for preemption of batches.

An apparatus for wireless communications at a UE is described. The apparatus may include a processor, memory coupled (e.g., operatively, communicatively, functionally, electronically, electrically, etc.) with the processor, and instructions stored in the memory. The instructions may be executable by the processor to cause the apparatus to identify that a batch of transmissions has been received from a base station or is scheduled to be transmitted to the base station via a set of resources, the batch collectively including a file having a set of packets configured to be processed together, identify, via a preemption indication, that at least a portion of the set of resources allocated for communication of the batch is preempted, and apply the preemption indication to processing or transmission of the batch in accordance with a rule for preemption of batches.

Another apparatus for wireless communications at a UE is described. The apparatus may include means for identifying that a batch of transmissions has been received from a base station or is scheduled to be transmitted to the base station via a set of resources, the batch collectively including a file having a set of packets configured to be processed together, identifying, via a preemption indication, that at least a portion of the set of resources allocated for communication of the batch is preempted, and applying the preemption indication to processing or transmission of the batch in accordance with a rule for preemption of batches.

A non-transitory computer-readable medium storing code for wireless communications at a UE is described. The code may include instructions executable by a processor to identify that a batch of transmissions has been received from a base station or is scheduled to be transmitted to the base station via a set of resources, the batch collectively including a file having a set of packets configured to be processed together, identify, via a preemption indication, that at least a portion of the set of resources allocated for communication of the batch is preempted, and apply the preemption indication to processing or transmission of the batch in accordance with a rule for preemption of batches.

In some examples of the method, apparatuses, and non-transitory computer-readable medium described herein, the batch may be received from the base station, and where applying the preemption indication to processing or transmission of the batch may include operations, features, means, or instructions for processing the batch without processing transmissions received on the portion of the set of resources indicated as preempted, in accordance with the rule for preemption of batches.

In some examples of the method, apparatuses, and non-transitory computer-readable medium described herein, the batch may be transmitted to the base station, and where applying the preemption indication to processing or transmission of the batch may include operations, features, means, or instructions for transmitting a first portion of the file using resources of the set of resources that precede the portion of the set of resources indicated as preempted, and refraining from transmitting a second portion of the file on the portion of the set of resources indicated as preempted, in accordance with the rule for preemption of batches.

In some examples of the method, apparatuses, and non-transitory computer-readable medium described herein, the batch may be received from the base station, and where applying the preemption indication to processing or transmission of the batch may include operations, features, means, or instructions for processing the batch by ignoring the preemption indication, in accordance with the rule for preemption of batches.

In some examples of the method, apparatuses, and non-transitory computer-readable medium described herein, the batch may be transmitted to the base station, and where applying the preemption indication to processing or transmission of the batch may include operations, features, means, or instructions for transmitting the file by ignoring the preemption indication, in accordance with the rule for preemption of batches.

Some examples of the method, apparatuses, and non-transitory computer-readable medium described herein may further include operations, features, means, or instructions for monitoring at least one legacy preemption indication, and processing the batch by ignoring the legacy preemption indication.

A method of wireless communications at a UE is described. The method may include receiving a grant for communication, by the UE, of an uplink transmission that is part of batch of transmissions that collectively carry a file having a set of packets configured to be processed together, determining a transmission power for transmitting the uplink transmission based on the grant pertaining to transmission of batches, and transmitting the uplink transmission in accordance with the transmission power and the grant.

An apparatus for wireless communications at a UE is described. The apparatus may include a processor, memory coupled (e.g., operatively, communicatively, functionally, electronically, electrically, etc.) with the processor, and instructions stored in the memory. The instructions may be executable by the processor to cause the apparatus to receive a grant for communication, by the UE, of an uplink transmission that is part of batch of transmissions that collectively carry a file having a set of packets configured to be processed together, determine a transmission power for transmitting the uplink transmission based on the grant pertaining to transmission of batches, and transmit the uplink transmission in accordance with the transmission power and the grant.

Another apparatus for wireless communications at a UE is described. The apparatus may include means for receiving a grant for communication, by the UE, of an uplink transmission that is part of batch of transmissions that collectively carry a file having a set of packets configured to be processed together, determining a transmission power for transmitting the uplink transmission based on the grant pertaining to transmission of batches, and transmitting the uplink transmission in accordance with the transmission power and the grant.

A non-transitory computer-readable medium storing code for wireless communications at a UE is described. The code may include instructions executable by a processor to receive a grant for communication, by the UE, of an uplink transmission that is part of batch of transmissions that collectively carry a file having a set of packets configured to be processed together, determine a transmission power for transmitting the uplink transmission based on the grant pertaining to transmission of batches, and transmit the uplink transmission in accordance with the transmission power and the grant.

Some examples of the method, apparatuses, and non-transitory computer-readable medium described herein may further include operations, features, means, or instructions for determining an amount of the transmission power based on a size of the file.

Some examples of the method, apparatuses, and non-transitory computer-readable medium described herein may further include operations, features, means, or instructions for determining an amount of the transmission power based on an indication from a control channel.

Some examples of the method, apparatuses, and non-transitory computer-readable medium described herein may further include operations, features, means, or instructions for determining an amount of the transmission power based on a pre-defined power offset.

A method of wireless communications at a UE is described. The method may include receiving a grant for communication of a downlink transmission that is part of a batch of transmissions that collectively carry a file having a set of packets configured to be processed together, receiving the downlink transmission in accordance with the grant, where a reference signal corresponding to a first transmission in the batch is combined with a reference signal corresponding to a second transmission in the batch, and decoding the downlink transmission in accordance with the combined reference signal.

An apparatus for wireless communications at a UE is described. The apparatus may include a processor, memory coupled (e.g., operatively, communicatively, functionally, electronically, electrically, etc.) with the processor, and instructions stored in the memory. The instructions may be executable by the processor to cause the apparatus to receive a grant for communication of a downlink transmission that is part of a batch of transmissions that collectively carry a file having a set of packets configured to be processed together, receive the downlink transmission in accordance with the grant, where a reference signal corresponding to a first transmission in the batch is combined with a reference signal corresponding to a second transmission in the batch, and decode the downlink transmission in accordance with the combined reference signal.

Another apparatus for wireless communications at a UE is described. The apparatus may include means for receiving a grant for communication of a downlink transmission that is part of a batch of transmissions that collectively carry a file having a set of packets configured to be processed together, receiving the downlink transmission in accordance with the grant, where a reference signal corresponding to a first transmission in the batch is combined with a reference signal corresponding to a second transmission in the batch, and decoding the downlink transmission in accordance with the combined reference signal.

A non-transitory computer-readable medium storing code for wireless communications at a UE is described. The code may include instructions executable by a processor to receive a grant for communication of a downlink transmission that is part of a batch of transmissions that collectively carry a file having a set of packets configured to be processed together, receive the downlink transmission in accordance with the grant, where a reference signal corresponding to a first transmission in the batch is combined with a reference signal corresponding to a second transmission in the batch, and decode the downlink transmission in accordance with the combined reference signal.

In some examples of the method, apparatuses, and non-transitory computer-readable medium described herein, a precoding and energy per resource element may be consistent across each transmission of the set of transmissions of the batch.

A method of wireless communications at a UE is described. The method may include receiving a grant for communication, by the UE, of an uplink transmission that is part of a batch of transmissions that collectively carry a file having a set of packets configured to be processed together and transmitting the uplink transmission while maintaining a phase continuity for at least two transmissions within the batch of transmissions based on receiving the grant for communication of the uplink transmission.

An apparatus for wireless communications at a UE is described. The apparatus may include a processor, memory coupled (e.g., operatively, communicatively, functionally, electronically, electrically, etc.) with the processor, and instructions stored in the memory. The instructions may be executable by the processor to cause the apparatus to receive a grant for communication, by the UE, of an uplink transmission that is part of a batch of transmissions that collectively carry a file having a set of packets configured to be processed together and transmit the uplink transmission while maintaining a phase continuity for at least two transmissions within the batch of transmissions based on receiving the grant for communication of the uplink transmission.

Another apparatus for wireless communications at a UE is described. The apparatus may include means for receiving a grant for communication, by the UE, of an uplink transmission that is part of a batch of transmissions that collectively carry a file having a set of packets configured to be processed together and transmitting the uplink transmission while maintaining a phase continuity for at least two transmissions within the batch of transmissions based on receiving the grant for communication of the uplink transmission.

A non-transitory computer-readable medium storing code for wireless communications at a UE is described. The code may include instructions executable by a processor to receive a grant for communication, by the UE, of an uplink transmission that is part of a batch of transmissions that collectively carry a file having a set of packets configured to be processed together and transmit the uplink transmission while maintaining a phase continuity for at least two transmissions within the batch of transmissions based on receiving the grant for communication of the uplink transmission.

In some examples of the method, apparatuses, and non-transitory computer-readable medium described herein, the phase continuity may be maintained based on prohibiting power adjustments within the at least two transmissions.

Some examples of the method, apparatuses, and non-transitory computer-readable medium described herein may further include operations, features, means, or instructions for determining a first DM-RS pattern for a first transmission of the at least two transmissions, and determining a second DM-RS pattern for a second transmission of the at least two transmissions based on at least in part of the first DM-RS pattern.

A method of wireless communications at a base station is described. The method may include identifying a transmission direction schedule for a slot, where the transmission direction schedule identifies one or more symbols of the slot as being uplink, downlink, or flexible, transmitting, to a UE, a grant for communication of a packet that is one of a set of packets configured to be processed together as a file, identifying, based on at least one of the grant and the transmission direction schedule, one or more symbols of the slot for communication of the packet, and participating in the communication of the packet on the identified one or more symbols of the slot.

An apparatus for wireless communications at a base station is described. The apparatus may include a processor, memory coupled (e.g., operatively, communicatively, functionally, electronically, electrically, etc.) with the processor, and instructions stored in the memory. The instructions may be executable by the processor to cause the apparatus to identify a transmission direction schedule for a slot, where the transmission direction schedule identifies one or more symbols of the slot as being uplink, downlink, or flexible, transmit, to a UE, a grant for communication of a packet that is one of a set of packets configured to be processed together as a file, identify, based on at least one of the grant and the transmission direction schedule, one or more symbols of the slot for communication of the packet, and participate in the communication of the packet on the identified one or more symbols of the slot.

Another apparatus for wireless communications at a base station is described. The apparatus may include means for identifying a transmission direction schedule for a slot, where the transmission direction schedule identifies one or more symbols of the slot as being uplink, downlink, or flexible, transmitting, to a UE, a grant for communication of a packet that is one of a set of packets configured to be processed together as a file, identifying, based on at least one of the grant and the transmission direction schedule, one or more symbols of the slot for communication of the packet, and participating in the communication of the packet on the identified one or more symbols of the slot.

A non-transitory computer-readable medium storing code for wireless communications at a base station is described. The code may include instructions executable by a processor to identify a transmission direction schedule for a slot, where the transmission direction schedule identifies one or more symbols of the slot as being uplink, downlink, or flexible, transmit, to a UE, a grant for communication of a packet that is one of a set of packets configured to be processed together as a file, identify, based on at least one of the grant and the transmission direction schedule, one or more symbols of the slot for communication of the packet, and participate in the communication of the packet on the identified one or more symbols of the slot.

In some examples of the method, apparatuses, and non-transitory computer-readable medium described herein, identifying the transmission direction schedule for the slot may include operations, features, means, or instructions for transmitting, to the UE, the transmission direction schedule via a cell-specific or UE-specific radio resource control message, where a transmission direction of one or more symbols of a slot, as indicated by the grant, may be in accordance with the transmission direction schedule for the one or more symbols.

In some examples of the method, apparatuses, and non-transitory computer-readable medium described herein, identifying the one or more symbols of the slot for communication of the packet may include operations, features, means, or instructions for identifying that at least one of the one or more symbols may be a flexible symbol, as indicated by the transmission direction schedule.

In some examples of the method, apparatuses, and non-transitory computer-readable medium described herein, transmitting the grant for communication of the packet may include operations, features, means, or instructions for transmitting the grant via a UE-specific downlink control information message, where a transmission direction of the flexible symbol of a slot may be based on the grant.

In some examples of the method, apparatuses, and non-transitory computer-readable medium described herein, transmitting the grant for communication of the packet may include operations, features, means, or instructions for transmitting the grant as a configured grant via a radio resource control message, and transmitting a group common downlink control information message, where a transmission direction of the flexible symbol of a slot may be based on the group common downlink control information message.

In some examples of the method, apparatuses, and non-transitory computer-readable medium described herein, transmitting the grant for communication of the packet further may include operations, features, means, or instructions for transmitting the grant as a configured grant via a radio resource control message, where a transmission direction of the flexible symbol may be based on the grant.

In some examples of the method, apparatuses, and non-transitory computer-readable medium described herein, transmitting the grant for communication of the packet further may include operations, features, means, or instructions for transmitting the grant as a configured grant via a radio resource control message, and transmitting a group common downlink control information message, where a transmission direction of the flexible symbol may be based on the group common downlink control information message and where the group common downlink control information message may be formatted as a batch-specific format.

A method of wireless communications at a base station is described. The method may include transmitting a first set of decoding candidates for communication of a batch of transmissions that collectively carry a file having a set of packets configured to be processed together, transmitting a second set of decoding candidates for communications not pertaining to files, where the first set of decoding candidates and the second set of decoding candidates differ by at least one decoding candidate, and participating in the communication based on at least one of the first set of decoding candidates or the second set of decoding candidates.

An apparatus for wireless communications at a base station is described. The apparatus may include a processor, memory coupled (e.g., operatively, communicatively, functionally, electronically, electrically, etc.) with the processor, and instructions stored in the memory. The instructions may be executable by the processor to cause the apparatus to transmit a first set of decoding candidates for communication of a batch of transmissions that collectively carry a file having a set of packets configured to be processed together, transmit a second set of decoding candidates for communications not pertaining to files, where the first set of decoding candidates and the second set of decoding candidates differ by at least one decoding candidate, and participate in the communication based on at least one of the first set of decoding candidates or the second set of decoding candidates.

Another apparatus for wireless communications at a base station is described. The apparatus may include means for transmitting a first set of decoding candidates for communication of a batch of transmissions that collectively carry a file having a set of packets configured to be processed together, transmitting a second set of decoding candidates for communications not pertaining to files, where the first set of decoding candidates and the second set of decoding candidates differ by at least one decoding candidate, and participating in the communication based on at least one of the first set of decoding candidates or the second set of decoding candidates.

A non-transitory computer-readable medium storing code for wireless communications at a base station is described. The code may include instructions executable by a processor to transmit a first set of decoding candidates for communication of a batch of transmissions that collectively carry a file having a set of packets configured to be processed together, transmit a second set of decoding candidates for communications not pertaining to files, where the first set of decoding candidates and the second set of decoding candidates differ by at least one decoding candidate, and participate in the communication based on at least one of the first set of decoding candidates or the second set of decoding candidates.

In some examples of the method, apparatuses, and non-transitory computer-readable medium described herein, transmitting the first set of decoding candidates and transmitted the second set of decoding candidates further may include operations, features, means, or instructions for transmitting the first set of decoding candidates or the second set of decoding candidates in a cell-specific or a group-specific downlink control channel.

In some examples of the method, apparatuses, and non-transitory computer-readable medium described herein, transmitting the first set of decoding candidates and transmitting the second set of decoding candidates further may include operations, features, means, or instructions for transmitting one or more UE-specific grants.

In some examples of the method, apparatuses, and non-transitory computer-readable medium described herein, the first set of decoding candidates and the second set of decoding candidates differ by at least one decoding candidate based on a set of aggregation levels, a set of decoding candidates for a given aggregation level, or a downlink control information message size.

In some examples of the method, apparatuses, and non-transitory computer-readable medium described herein, the first set of decoding candidates may have a higher aggregation level than the second set of decoding candidates.

In some examples of the method, apparatuses, and non-transitory computer-readable medium described herein, a downlink control information in the first set of decoding candidates includes an indication linking the downlink control information message to a previous downlink message in a previous grant corresponding to the batch of transmissions.

A method of wireless communication at a base station is described. The method may include transmitting at least one grant as a configured grant via a radio resource control message, the configured grant including a configured grant index indicative of a resource configuration for communication of a batch of transmissions that collectively carry a file having a set of packets and participating in the communication based on the configured grant.

An apparatus for wireless communication at a base station is described. The apparatus may include a processor, memory coupled (e.g., operatively, communicatively, functionally, electronically, electrically, etc.) with the processor, and instructions stored in the memory. The instructions may be executable by the processor to cause the apparatus to transmit at least one grant as a configured grant via a radio resource control message, the configured grant including a configured grant index indicative of a resource configuration for communication of a batch of transmissions that collectively carry a file having a set of packets and participate in the communication based on the configured grant.

Another apparatus for wireless communication at a base station is described. The apparatus may include means for transmitting at least one grant as a configured grant via a radio resource control message, the configured grant including a configured grant index indicative of a resource configuration for communication of a batch of transmissions that collectively carry a file having a set of packets and participating in the communication based on the configured grant.

A non-transitory computer-readable medium storing code for wireless communication at a base station is described. The code may include instructions executable by a processor to transmit at least one grant as a configured grant via a radio resource control message, the configured grant including a configured grant index indicative of a resource configuration for communication of a batch of transmissions that collectively carry a file having a set of packets and participate in the communication based on the configured grant.

In some examples of the method, apparatuses, and non-transitory computer-readable medium described herein, transmitting the at least one grant as the configured grant may include operations, features, means, or instructions for transmitting the configured grant including one or more assignments for the communication of the file using two or more transport blocks.

In some examples of the method, apparatuses, and non-transitory computer-readable medium described herein, the two or more transport blocks may be scheduled by the grant to be transmitted or received in two or more adjacent slots.

In some examples of the method, apparatuses, and non-transitory computer-readable medium described herein, the configured grant may be for communication of the file via uplink resources, downlink resources, or sidelink resources.

A method of wireless communications at a base station is described. The method may include identifying that a batch of transmissions has been transmitted to a UE or is scheduled to be received from the UE via a set of resources, the batch collectively including a file having a set of packets configured to be processed together, identifying, via a preemption indication, that at least a portion of the set of resources allocated for communication of the batch is preempted, and applying the preemption indication to processing or transmission of the batch in accordance with a rule for preemption of batches.

An apparatus for wireless communications at a base station is described. The apparatus may include a processor, memory coupled (e.g., operatively, communicatively, functionally, electronically, electrically, etc.) with the processor, and instructions stored in the memory. The instructions may be executable by the processor to cause the apparatus to identify that a batch of transmissions has been transmitted to a UE or is scheduled to be received from the UE via a set of resources, the batch collectively including a file having a set of packets configured to be processed together, identify, via a preemption indication, that at least a portion of the set of resources allocated for communication of the batch is preempted, and apply the preemption indication to processing or transmission of the batch in accordance with a rule for preemption of batches.

Another apparatus for wireless communications at a base station is described. The apparatus may include means for identifying that a batch of transmissions has been transmitted to a UE or is scheduled to be received from the UE via a set of resources, the batch collectively including a file having a set of packets configured to be processed together, identifying, via a preemption indication, that at least a portion of the set of resources allocated for communication of the batch is preempted, and applying the preemption indication to processing or transmission of the batch in accordance with a rule for preemption of batches.

A non-transitory computer-readable medium storing code for wireless communications at a base station is described. The code may include instructions executable by a processor to identify that a batch of transmissions has been transmitted to a UE or is scheduled to be received from the UE via a set of resources, the batch collectively including a file having a set of packets configured to be processed together, identify, via a preemption indication, that at least a portion of the set of resources allocated for communication of the batch is preempted, and apply the preemption indication to processing or transmission of the batch in accordance with a rule for preemption of batches.

In some examples of the method, apparatuses, and non-transitory computer-readable medium described herein, the batch may be transmitted to the UE, and where applying the preemption indication to processing or transmission of the batch may include operations, features, means, or instructions for processing the batch without processing transmissions transmitted on the portion of the set of resources indicated as preempted, in accordance with the rule for preemption of batches.

In some examples of the method, apparatuses, and non-transitory computer-readable medium described herein, the batch may be received from the UE, and where applying the preemption indication to processing or transmission of the batch may include operations, features, means, or instructions for receiving a first portion of the file using resources of the set of resources that precede the portion of the set of resources indicated as preempted, where a second portion of the file on the portion of the set of resource indicated as preempted may be not received in accordance with the rule for preemption of batches.

Some examples of the method, apparatuses, and non-transitory computer-readable medium described herein may further include operations, features, means, or instructions for processing the batch by ignoring the preemption indication, in accordance with the rule for preemption of batches.

In some examples of the method, apparatuses, and non-transitory computer-readable medium described herein, the batch may be received from the UE, and where applying the preemption indication to processing or transmission of the batch may include operations, features, means, or instructions for receiving the batch in accordance with the rule for preemption of batches.

Some examples of the method, apparatuses, and non-transitory computer-readable medium described herein may further include operations, features, means, or instructions for transmitting at least one legacy preemption indication, and transmitting the preemption indication that may be specific to the batch transmissions.

A method of wireless communications at a base station is described. The method may include transmitting, to a UE a grant for communication of an uplink transmission that is part of batch of transmissions that collectively carry a file having a set of packets configured to be processed together, determining the transmission power for transmitting the uplink transmission based on the grant pertaining to transmission of batches, and transmitting the uplink transmission in accordance with the increased power and the grant.

An apparatus for wireless communications at a base station is described. The apparatus may include a processor, memory coupled (e.g., operatively, communicatively, functionally, electronically, electrically, etc.) with the processor, and instructions stored in the memory. The instructions may be executable by the processor to cause the apparatus to transmit, to a UE a grant for communication of an uplink transmission that is part of batch of transmissions that collectively carry a file having a set of packets configured to be processed together, determine the transmission power for transmitting the uplink transmission based on the grant pertaining to transmission of batches, and transmit the uplink transmission in accordance with the increased power and the grant.

Another apparatus for wireless communications at a base station is described. The apparatus may include means for transmitting, to a UE a grant for communication of an uplink transmission that is part of batch of transmissions that collectively carry a file having a set of packets configured to be processed together, determining the transmission power for transmitting the uplink transmission based on the grant pertaining to transmission of batches, and transmitting the uplink transmission in accordance with the increased power and the grant.

A non-transitory computer-readable medium storing code for wireless communications at a base station is described. The code may include instructions executable by a processor to transmit, to a UE a grant for communication of an uplink transmission that is part of batch of transmissions that collectively carry a file having a set of packets configured to be processed together, determine the transmission power for transmitting the uplink transmission based on the grant pertaining to transmission of batches, and transmit the uplink transmission in accordance with the increased power and the grant.

Some examples of the method, apparatuses, and non-transitory computer-readable medium described herein may further include operations, features, means, or instructions for determining an amount of the transmission power based on a size of the file.

Some examples of the method, apparatuses, and non-transitory computer-readable medium described herein may further include operations, features, means, or instructions for transmitting, to the UE, an indication of an amount of the transmission power via a control channel.

A method of wireless communications at a base station is described. The method may include transmitting, to a UE a grant for communication of a downlink transmission that is part of a batch of transmissions that collectively carry a file having a set of packets configured to be processed together and transmitting the downlink transmission in accordance with the grant, where a reference signal corresponding to a first transmission in the batch is combined with a reference signal corresponding to a second transmission in the batch.

An apparatus for wireless communications at a base station is described. The apparatus may include a processor, memory coupled (e.g., operatively, communicatively, functionally, electronically, electrically, etc.) with the processor, and instructions stored in the memory. The instructions may be executable by the processor to cause the apparatus to transmit, to a UE a grant for communication of a downlink transmission that is part of a batch of transmissions that collectively carry a file having a set of packets configured to be processed together and transmit the downlink transmission in accordance with the grant, where a reference signal corresponding to a first transmission in the batch is combined with a reference signal corresponding to a second transmission in the batch.

Another apparatus for wireless communications at a base station is described. The apparatus may include means for transmitting, to a UE a grant for communication of a downlink transmission that is part of a batch of transmissions that collectively carry a file having a set of packets configured to be processed together and transmitting the downlink transmission in accordance with the grant, where a reference signal corresponding to a first transmission in the batch is combined with a reference signal corresponding to a second transmission in the batch.

A non-transitory computer-readable medium storing code for wireless communications at a base station is described. The code may include instructions executable by a processor to transmit, to a UE a grant for communication of a downlink transmission that is part of a batch of transmissions that collectively carry a file having a set of packets configured to be processed together and transmit the downlink transmission in accordance with the grant, where a reference signal corresponding to a first transmission in the batch is combined with a reference signal corresponding to a second transmission in the batch.

In some examples of the method, apparatuses, and non-transitory computer-readable medium described herein, a precoding and energy per resource element may be consistent across each transmission of the batch.

A method of wireless communications at a base station is described. The method may include transmitting, to a UE, a grant for communication of an uplink transmission that is part of a batch of transmissions that collectively carry a file having a set of packets configured to be processed together and receiving the uplink transmission while maintaining a phase continuity for at least two transmissions within the batch of transmissions based on receiving the grant for communication of the uplink transmission.

An apparatus for wireless communications at a base station is described. The apparatus may include a processor, memory coupled (e.g., operatively, communicatively, functionally, electronically, electrically, etc.) with the processor, and instructions stored in the memory. The instructions may be executable by the processor to cause the apparatus to transmit, to a UE, a grant for communication of an uplink transmission that is part of a batch of transmissions that collectively carry a file having a set of packets configured to be processed together and receive the uplink transmission while maintaining a phase continuity for at least two transmissions within the batch of transmissions based on receiving the grant for communication of the uplink transmission.

Another apparatus for wireless communications at a base station is described. The apparatus may include means for transmitting, to a UE, a grant for communication of an uplink transmission that is part of a batch of transmissions that collectively carry a file having a set of packets configured to be processed together and receiving the uplink transmission while maintaining a phase continuity for at least two transmissions within the batch of transmissions based on receiving the grant for communication of the uplink transmission.

A non-transitory computer-readable medium storing code for wireless communications at a base station is described. The code may include instructions executable by a processor to transmit, to a UE, a grant for communication of an uplink transmission that is part of a batch of transmissions that collectively carry a file having a set of packets configured to be processed together and receive the uplink transmission while maintaining a phase continuity for at least two transmissions within the batch of transmissions based on receiving the grant for communication of the uplink transmission.

In some examples of the method, apparatuses, and non-transitory computer-readable medium described herein, the phase continuity may be maintained based on prohibiting power adjustments within the at least two transmissions.

Some examples of the method, apparatuses, and non-transitory computer-readable medium described herein may further include operations, features, means, or instructions for determining a first DM-RS pattern for a first transmission of the at least two transmissions, and determining a second DM-RS pattern for a second transmission of the at least two transmissions based on at least in part of the first DM-RS pattern.

BRIEF DESCRIPTION OF THE DRAWINGS

FIG. 2 illustrates an example of a wireless communications system that supports transmission batch scheduling and resource management in accordance with aspects of the present disclosure.

FIG. 7 illustrates an example of a wireless communications system that supports transmission batch scheduling and resource management in accordance with aspects of the present disclosure.

FIGS. 15 and 16 show block diagrams of devices that support transmission batch scheduling and resource management in accordance with aspects of the present disclosure.

FIGS. 19 through 33 show flowcharts illustrating methods that support transmission batch scheduling and resource management in accordance with aspects of the present disclosure.

DETAILED DESCRIPTION

Figure 1:
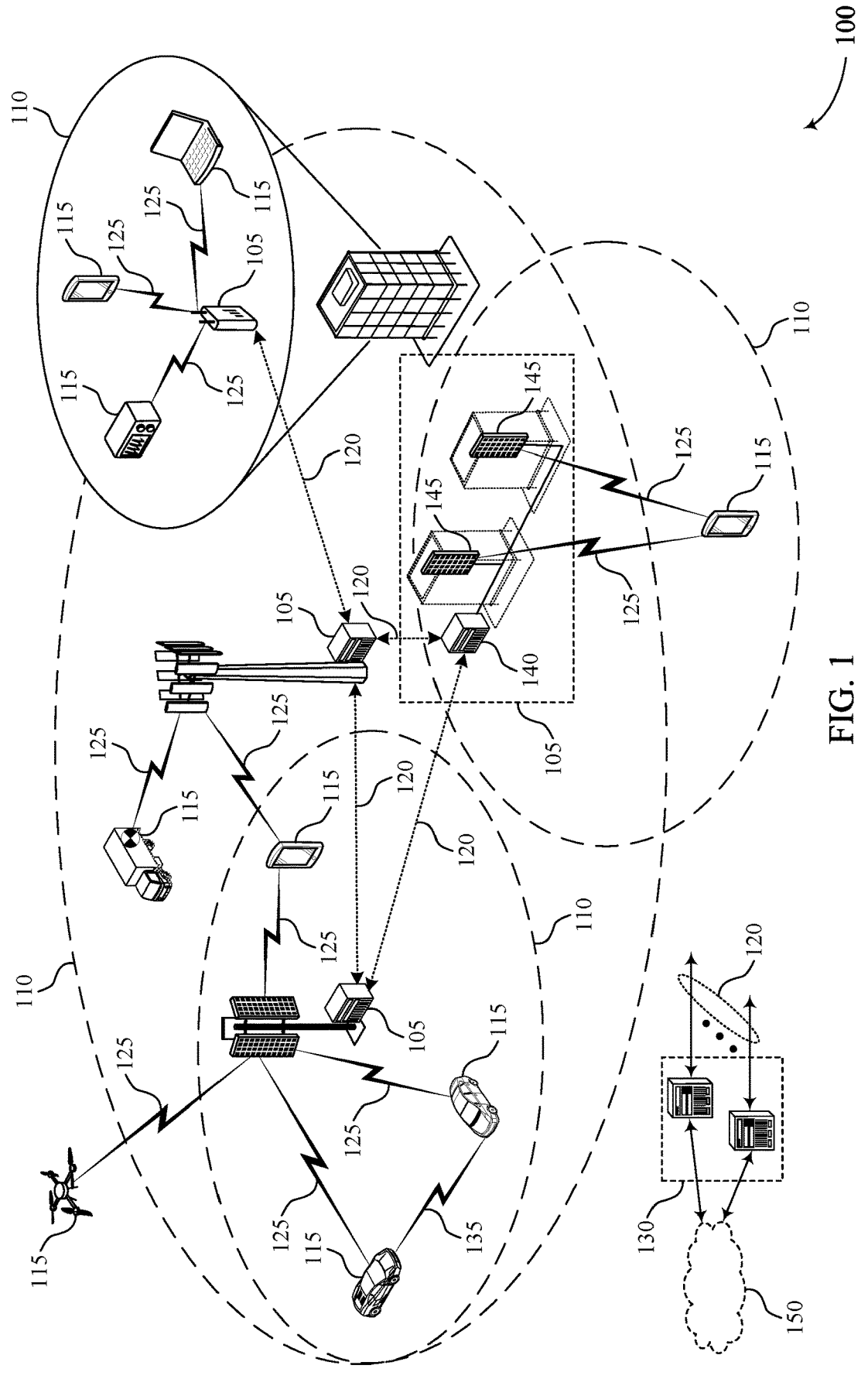
FIG. 1 illustrates an example of a system for wireless communications that supports transmission batch scheduling and resource management in accordance with aspects of the present disclosure.

A user equipment (UE) in a wireless communications system, such as a New Radio (NR) system or a Long Term Evolution (LTE) system, may support applications associated with high throughput and low latency. The described aspects of the disclosure relate to improved methods, systems, devices, or apparatuses that facilitate transmission batch scheduling and resource management. Specifically, wireless communications systems supporting extended reality (XR) applications may be associated with a high data rate requirement and a tight delay budget. In some examples XR applications, one or more transmitted packets may be in the form of groups or files. As one example, packets in a video frame in an XR application may be included in a file. The packets of a file may be configured to be processed together. For example, a transmitting device may include one or more Internet Protocol (IP) packets in a file if the file (such as a video frame) is usable at a receiver when all IP packets of the file are successfully received. The file or group of packets may be transmitted in one or more transmissions as a batch of transmissions.

In some examples, the techniques described herein provide for communication of a batch of transmissions configured to carry a file having a plurality of packets configured to be processed together. According to one or more aspects, a UE may determine a transmission direction schedule for communication of a file based on a grant (e.g., a UE-specific downlink control information (DCI), a configured grant, a group common DCI). A UE may also determine whether to process one or more transmissions carrying a file or portions of a file based on a preemption indication received from a base station. In some examples, a DCI message may be configured for scheduling resources for communication of a file. For example, a file may be scheduled using a separate DCI for each packet of a file, and each packet may be linked such that a UE may identify missed or dropped DCI signals. In some cases, a UE may monitor for a new DCI message corresponding to a file in addition to a legacy DCI message for other communications.

Techniques for transmission batch scheduling and resource management may also include allocation of resources for file communication using configured grants for groups of packets (e.g., files). For example, a configured grant may include a configured grant index indication, where the index corresponds to a resource configuration for communication of a file. A resource configuration may include a number, size, and location of transport blocks. In some cases, a UE may adjust a power for transmission of a file, maintain phase continuity for transport blocks for communication of a file, and/or process a file using combined reference signals for a batch transmissions carrying a file.

Particular aspects of the subject matter described herein may be implemented to realize one or more advantages. The described techniques may support improvements in file communication in high throughput and low latency communication environments. The techniques may support decreasing of signaling overhead and improving reliability by increasing the likelihood of file transmission. As such, supported techniques may include improve network operations and, in some examples, may promote network efficiencies, among other benefits. Aspects of the disclosure are initially described in the context of wireless communications systems. Aspects of the disclosure are further described with respect to additional wireless communications systems and process flow diagrams. Aspects of the disclosure are further illustrated by and described with reference to apparatus diagrams, system diagrams, and flowcharts that relate to transmission batch scheduling and resource management.

FIG. 1 illustrates an example of a wireless communications system 100 that supports transmission batch scheduling and resource management in accordance with aspects of the present disclosure. The wireless communications system 100 may include base stations 105, UEs 115, and a core network 130. In some examples, the wireless communications system 100 may be a Long Term Evolution (LTE) network, an LTE-Advanced (LTE-A) network, an LTE-A Pro network, or a New Radio (NR) network. In some cases, the wireless communications system 100 may support enhanced broadband communications, ultra-reliable (e.g., mission critical) communications, low latency communications, communications with low-cost and low-complexity devices, or any combination thereof.

Base stations 105 may be dispersed throughout a geographic area to form the wireless communications system 100 and may be devices in different forms or having different capabilities. Base stations 105 and UEs 115 may wirelessly communicate via one or more communication links 125. Each base station 105 may provide a coverage area 110 over which UEs 115 and the base station 105 may establish communication links 125. The coverage area 110 may be an example of a geographic area over which a base station 105 and a UE 115 support the communication of signals according to one or more radio access technologies.

UEs 115 may be dispersed throughout a coverage area 110 of the wireless communications system 100, and each UE 115 may be stationary, or mobile, or both at different times. UEs 115 may be devices in different forms or having different capabilities. Some example UEs 115 are illustrated in FIG. 1. The UEs 115 described herein may be able to communicate with various types of devices, such as other UEs 115, base stations 105, and/or network equipment (e.g., core network nodes, relay devices, integrated access and backhaul (IAB) nodes, or other network equipment), as shown in FIG. 1.

Base stations 105 may communicate with the core network 130, or with one another, or both. For example, base stations 105 may interface with the core network 130 through backhaul links 120 (e.g., via an S1, N2, N3, or other interface). Base stations 105 may communicate with one another over backhaul links 120 (e.g., via an X2, Xn, or other interface) either directly (e.g., directly between base stations 105), or indirectly (e.g., via core network 130), or both. In some examples, backhaul links 120 may be or may include one or more wireless links.

One or more of base stations 105 described herein may include or may be referred to by a person of ordinary skill in the art as a base transceiver station, a radio base station, an access point, a radio transceiver, a NodeB, an eNodeB (eNB), a next-generation NodeB or giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may be stationary or mobile. A UE 115 may also include or may be referred to as a personal electronic device such as a cellular phone, a personal digital assistant (PDA),), a multimedia/entertainment device (e.g., a radio, a MP3 player, a video device, etc.), a camera, a gaming device, a navigation/positioning device (e.g., GNSS (global navigation satellite system) devices based on, for example, GPS (global positioning system), Beidou, GLONASS, or Galileo, a terrestrial-based device, etc.), a tablet computer, a laptop computer, a netbook, a smartbook, a personal computer, a smart device, a wearable device (e.g., a smart watch, smart clothing, smart glasses, virtual reality goggles, a smart wristband, smart jewelry (e.g., a smart ring, a smart bracelet)), a drone, a robot/robotic device, a vehicle, a vehicular device, a meter (e.g., parking meter, electric meter, gas meter, water meter), a monitor, a gas pump, an appliance (e.g., kitchen appliance, washing machine, dryer), a location tag, a medical/healthcare device, an implant, a sensor/actuator, a display, or any other suitable device configured to communicate via a wireless or wired medium a personal computer, or a subscriber device. In some examples, a UE 115 may include or be referred to as a wireless local loop (WLL) station, an Internet of Things (IoT) device, an Internet of Everything (IoE) device, a machine type communications (MTC) device, or the like, which may be implemented in various objects such as appliances, vehicles, meters, or the like. In an aspect, techniques disclosed herein may be applicable to MTC or IoT UEs. MTC or IoT UEs may include MTC/enhanced MTC (cMTC, also referred to as CAT-M, Cat M1) UEs, NB-IOT (also referred to as CAT NB1) UEs, as well as other types of UEs. eMTC and NB-IOT may refer to future technologies that may evolve from or may be based on these technologies. For example, eMTC may include FeMTC (further eMTC), eFeMTC (enhanced further cMTC), mMTC (massive MTC), etc., and NB-IOT may include eNB-IOT (enhanced NB-IOT), FeNB-IOT (further enhanced NB-IOT), etc.

The UEs 115 described herein may be able to communicate with various types of devices, such as other UEs 115 that may sometimes act as relays as well as base stations 105 and network equipment including macro eNBs or gNBs, small cell eNBs or gNBs, relay base stations, and the like, as shown in FIG. 1.

UEs 115 and base stations 105 may wirelessly communicate with one another via one or more communication links 125 over one or more carriers. The term "carrier" may refer to a set of radio frequency spectrum resources having a defined physical layer structure for supporting communication links 125. For example, a carrier used for a communication link 125 may include a portion of a radio frequency spectrum band (e.g., a bandwidth part (BWP)) that is operated according to physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by UEs 115. A carrier may be operated in a standalone mode where initial acquisition and connection may be conducted by UEs 115 via the carrier, or the carrier may be operated in a nonstandalone mode where a connection is anchored using a different carrier (e.g., of the same or a different radio access technology).

Communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, 20, 40, or 80 megahertz (MHz)). Devices of the wireless communications system 100 (e.g., base stations 105, UEs 115, or both) may have hardware configurations that support communications over a particular carrier bandwidth or may be configurable to support communications over one of a set of carrier bandwidths. In some examples, the wireless communications system 100 may include base stations 105 and/or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into BWPs having the same or different numerologies. In some examples, a UE 115 may be configured with multiple BWPs. In some cases, a single BWP for a carrier is active at a given time, and communications for the UE 115 may be restricted to active BWPs.

Time intervals for base stations 105 or UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and Ns may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some cases, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some cases, the TTI duration (e.g., the number of symbol periods in a TTI) may be variable. Additionally or alternatively, the smallest scheduling unit of the wireless communications system 100 may be dynamically selected (e.g., in bursts of shortened TTIs (STTIs)).

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of UEs 115. For example, UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or various combinations thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, exterior spaces between or overlapping with geographic coverage areas 110, or the like.

A macro cell generally covers a relatively large geographic area (e.g., several kilometers in radius) and may allow unrestricted access by UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to UEs 115 with service subscriptions with the network provider or may provide restricted access to UEs 115 having an association with the small cell (e.g., UEs 115 in a closed subscriber group (CSG), UEs 115 associated with users in a home or office, and the like). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IOT), enhanced mobile broadband (eMBB), or others) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, overlapping geographic coverage areas 110 associated with different technologies may be supported by different base stations 105. The wireless communications system 100 may include, for example, a heterogeneous network in which different types of base stations 105 provide coverage for various geographic coverage areas 110 using the same or different radio access technologies.

The wireless communications system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging. In an aspect, techniques disclosed herein may be applicable to MTC or IoT UEs. MTC or IoT UEs may include MTC/enhanced MTC (eMTC, also referred to as CAT-M, Cat M1) UEs, NB-IOT (also referred to as CAT NB1) UEs, as well as other types of UEs. eMTC and NB-IOT may refer to future technologies that may evolve from or may be based on these technologies. For example, eMTC may include FeMTC (further eMTC), cFeMTC (enhanced further eMTC), mMTC (massive MTC), etc., and NB-IOT may include eNB-IOT (enhanced NB-IOT), FeNB-IOT (further enhanced NB-IoT), etc.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a predefined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some cases, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some cases, groups of UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some cases, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), a user plane function (UPF)). The control plane entity may manage non-access stratum (NAS) functions such as mobility, authentication, and bearer management for UEs 115 served by base stations 105 associated with the core network 130. User IP packets may be transferred through the user plane entity, which may provide IP address allocation as well as other functions. The user plane entity may be connected to the network operators IP services 150. The operators IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with UEs 115 through a number of other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105). Components within a wireless communications system may be coupled (for example, operatively, communicatively, functionally, electronically, and/or electrically) to each other.

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features, but the waves may penetrate structures sufficiently for a macro cell to provide service to UEs 115 located indoors. Transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between UEs 115 and base stations 105, and EHF antennas of the respective devices may be smaller and more closely spaced than UHF antennas. In some cases, this may facilitate use of antenna arrays within a device. The propagation of EHF transmissions, however, may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as base stations 105 and UEs 115 may employ carrier sensing for collision detection and avoidance. In some cases, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, D2D transmissions, or the like.

A base station 105 or UE 115 may be equipped with multiple antennas, which may be used to employ techniques such as transmit diversity, receive diversity, multiple-input multiple-output (MIMO) communications, or beamforming. The antennas of a base station 105 or UE 115 may be located within one or more antenna arrays or antenna panels, which may support MIMO operations or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

Base stations 105 or UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or a receiving device, such as a UE 115) a beam direction for subsequent transmission and/or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in different beam directions. For example, a UE 115 may receive one or more of the signals transmitted by the base station 105 in different directions and may report to the base station 105 an indication of the signal that the UE 115 received with a highest signal quality, or an otherwise acceptable signal quality.

In some cases, transmissions by a device (e.g., by a base station 105 or UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multipanel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or core network 130 supporting radio bearers for user plane data. At the Physical layer, transport channels may be mapped to physical channels.

UEs 115 and base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some cases, a device may support same-slot HARQ feedback, where the device may provide HARQ feedback in a specific slot for data received in a previous symbol in the slot. In other cases, the device may provide HARQ feedback in a subsequent slot, or according to some other time interval.

Existing wireless communications systems may receive data packets as a stream of bits, and may assign the data packets to transport blocks based on the received stream of bits. For some high throughput and low latency applications (for example, XR applications), it may be beneficial to group one or more transmitted packets as a batch. As one example, packets in a video frame of an application may be included in a batch (or a file), in which each batch is associated with a separate video frame. Additionally, it is beneficial to acknowledge receipt of packets included in a batch (such as a video frame).

According to one or more aspects of the present disclosure, the wireless communications system 100 may be configured to group data packets of the same video frame as a batch or file and perform recourse management based on the packets being associated as a file. In some cases, resources (e.g., symbols of a lot) may be determined based on one or more resource grants and/or DCI messages corresponding to file communication. For example, a DCI may be specifically configured for granting resources for communication of a file. In another example, configured grants may include a configured grant index corresponding to communication of a file. Other aspects may include configuration of a UE for responding to a preemption indication when a file is scheduled for communication, power adjustments for communication of a file, reference signal configurations for communication of a file, and/or coherent detection/transmission across two or more packets of a file. Using the described techniques, reliability and efficiency of communication (e.g., file communication) within the wireless communications system 100 may be enhanced.

FIG. 2 illustrates an example of a wireless communications system 200 that supports transmission batch scheduling and resource management in accordance with aspects of the present disclosure. In some examples, wireless communications system 200 may implement aspects of wireless communications system 100. The wireless communications system may include a base station 105-*a* and a UE 115-*a*, which may be examples of the corresponding devices described with respect to FIG. 1. In one example, the base station 105-*a* may be referred to as a transmitter, and the UE 115-*a* may be referred to as a receiver. In some implementations, the UE 115-*a* and the base station 105-*a* may operate in a mmW spectrum and/or using NR technologies.

In some wireless systems (for example, NR wireless systems, such as wireless communications system 200) the UE 115-*a* and the base station 105-*a* may support low latency and high throughput communications. Different types of communications may entail different traffic thresholds. Table 1 represents a table showing the traffic thresholds for different types of traffic in a NR wireless system. For example, an NR wireless system, such as wireless communications system 200, may support eMBB applications, ultra-reliable low latency communications (URLLC), and extended reality (XR) communications. In some implementations, one or more XR applications (for example, applications using XR traffic thresholds) may include cloud reality applications, virtual reality applications, and gaming applications. As discussed herein, XR applications are associated with high throughput (for example, throughput for rendering videos) and low latency. In some implementations, XR applications may include interactive video sessions (such as gaming or head mounted display). As described with reference to Table 1, XR applications may be associated with a packet delay budget and a packet error rate. For example, an XR application (or an XR communication session) may be associated with a packet delay budget of 10 ms and a packet error rate of 10-6.

TABLE 1

| Traffic Type | 5QI Value | Packet Delay Budget | Packet Error Rate | Default Maximum Data Burst Volume | Example Services |
|---|---|---|---|---|---|
| eMBB | 1 | 100 ms | $10^{-2}$ | N/A | Conversational voice |
| eMBB | 2 | 150 ms | $10^{-3}$ | N/A | Conversational video (for example, live streaming) |
| eMBB | 6, 8, 9 | 300 ms | $10^{-6}$ | N/A | Video (for example, buffered streaming) Transmission Control Protocol-based service (for example, e-mail, chat, file transfer protocol, peer-to-peer file sharing, progressive video) |
| . . . | . . . | . . . | . . . | . . . | . . . |
| XR | 80 | 10 ms | $10^{-6}$ | N/A | Low latency eMBB applications (such as augmented reality) |
| URLLC | 81 | 5 ms | $10^{-5}$ | 160 B | Remote control |
| . . . | . . . | . . . | . . . | . . . |

Additionally, Table 2 illustrates multiple use cases for XR applications. For example, an XR application may include virtual reality split rendering (for example, gaming applications). In such implementations, a head mounted display may communicate with a server that renders a video frame. In such examples, processing of the video frame may be performed at the server. Upon successful processing of the video frame, a communication link (such as a 5G communication link) may convey the processed video frame from the server to the head mounted display. For successful delivery of the processed video frame, 5G communication link may be associated with high throughput and low latency (for example, traffic threshold for XR applications). A second use case for XR applications may include augmented reality split computation. In augmented reality applications, an entire view of a user may not be covered by a rendered video. Instead, a rendered video (such as, video rendered from a server) may be augmented over a display of a user device (for example, a camera feed). A third use case for XR applications may include cloud gaming. In some examples, cloud gaming may be associated with high throughput and low latency communication link. Thus, XR applications may be subjected to higher traffic thresholds, and it may be beneficial for the NR wireless communications system (such as wireless communications system 200) to be aware of traffic associated with XR applications.

TABLE 2

|  | Virtual Reality split rendering | Augmented Reality split computation | Cloud Gaming |
|---|---|---|---|
| Head Mounted Display/Device | Head-mounted with 5G modem attached | Head-mounted with USB/Bluetooth connection to "Puck" or Smartphone with 5G modem | 5G Smartphone or Tablet |
| 5G usage Location | QoS Enterprise-Indoor, Residential-Indoor, Outdoor | QoS Enterprise-Indoor, Outdoor | OTT/QoS Outdoor |
| Mobility | Limited to head movements and restricted body movements, Hi-speed (VR in the back of a car) | Pedestrian, Hi-speed | Static, Hi-speed |

Existing wireless communications systems may be configured to treat data packets as a stream of bits without the knowledge of files associated with the packets. In some examples XR applications, one or more transmitted packets may be in the form of groups or files. As one example, packets in a video frame in an XR application may be included in a file. In some examples, the separate files may be associated with a file error rate. For example, a file error rate may be based on a number of packets in each file, a reliability threshold associated with each file (for example, whether a file includes an I-frame or a P-frame), or a combination thereof. Existing wireless communications may not have a method to support or guarantee a file error rate.

According to one or more aspects of the present disclosure, the wireless communications system 200 may be configured to group packets 205 of the same video frame as a file 210, and transmit the files 210 as packet-groups in uplink or downlink communications in accordance with file resource management techniques described herein. In some cases, base station 105-a may transmit an uplink grant or a DCI message to the UE 115-a, and the uplink grant or DCI message may include information for scheduling communication of a file.

Traffic flow illustrated in FIG. 2 may include multiple Internet Protocol (IP) packets 205. In some implementations, NR wireless systems (such as the wireless communications system 100 supporting XR applications) may be configured to group one or more IP packets 205 into one or more files 210. The wireless communications system 200 may group the one or more IP packets 205 based on a reliability threshold, packet delivery deadline, etc. For example, a first group of packets (e.g., file 210-a) may be associated with an I-frame, and a second group of packets (e.g., file 210-b) may be associated with a P-frame. In such an example, the first group of packets may have a higher reliability threshold (such as high priority) than the second group of packets. Additionally or alternatively, the wireless communications system may group the one or more IP packets 205 based on a delivery deadline associated with each IP packet 205. In some implementations, a delivery deadline of a packet 205 may be interpreted as a sum of a time of arrival of the packet (for example, at a base station 105) and a packet delay budget associated with the packet. In some examples, a group of packets having a same (or similar) delivery deadline may be grouped together as one file 210. In some examples, the wireless communications system 200 may implement additional signaling to convey information related to a delivery deadline and/or a packet delay budget from an application to base station 105 and the UE 115. In some implementations, the wireless communications system may group the one or more IP packets 205 based on a policy of file handling. For example, the wireless communications system may include one or more IP packets 205 in a file if the file (such as a video frame) is usable at a receiver (such as UE 115) when all IP packets of a file 210 are successfully received. In some examples, the wireless communications system may include one or more IP packets 205 in a file if the policy indicates that a continuous stream of IP packets 205 up to the first packet in error can be used at the receiver.

In the example of FIG. 2, the wireless communications system 200 generates 5 files. In some implementations, each file may include a set of IP packets 205 jointly processed by an application (such as an XR application). In some examples, the wireless communications system 200 may determine the IP packets 205 associated with a file based on a maximum transmission unit (MTU) setting on an IP stack interfacing with the application. In some examples, the wireless communications system may further fragment the IP packets 205 into smaller IP packet fragments (not shown). In some implementations, a burst 215 of files may be referred to as files generated by an application at the same (or similar) time. As depicted in the example of FIG. 2, the wireless communications system generates files 210-a and 210-b at a same (or similar) time. Accordingly, files 210-a and 210-b are included in a first burst 215-a (in uplink) of the traffic flow. Similarly, the UE 115-a (for example, an XR application included in the wireless communications system) may generate a second burst 215-b including files 210-c, 210-d, and 210-c.

In some wireless systems (for example, NR wireless systems, such as wireless communications system 200) the UE 115-a and the base station 105-a may support various techniques for grants, slot structures, etc. for supporting various services provided by the wireless communications system 200. For example, in a NR wireless system, the slot structure may be semi-statically indicated to the UE 115-a via a an SIB1 (e.g., cell-specific) message or via a RRC (e.g., UE-specific) message. A communication slot may include symbols allocated as a flexible symbol, an uplink symbol, or a downlink symbol. A flexible symbol allocated via semi-static downlink/uplink (DL/UL) or other previous assignment may be overwritten by more dynamically-indicated signaling (for example, measurement report-driven signaling, slot format indication (SFI) data, or UE specific signaling). A symbol allocated for UL/DL by semi-static DL/UL assignment may not be overwritten (e.g., changed from UL to DL or changed from DL to UL). Further, a symbol allocated for UL/DL by semi-static DL/UL assignment may not be changed to a flexible symbol by SFI. A transmission direction (e.g., UL or DL) indicated by a cell-specific RRC configuration (for example, for secondary cell (SCell) or for a primary/secondary cell (PSCell)) or by a UE-specifically delivered RRC symbol grants may not be changed (e.g., by SFI) to the other direction.

Further, in NR systems, a dynamic SFI may be indicated via a group common physical downlink control channel (PDCCH) (e.g., with DCI format 2_0), which may provide more flexible or dynamic slot structure management. In some cases, an SFI transmitted in a group common PDCCH (e.g., GC-PDCCH) may indicate a slot format for one or more slots. The GC-PDCCH may indicate information such as the number of slots and the slot format information for the slots. For symbols indicated via dynamic SFI and not allocated for DL or UL in semi-static DL/UL assignment, DL UL symbols may not be overwritten by UE specific data. When the UE specific data and a dynamic SFI imply different transmission directions, the UE 115-*a* may determine that an error has occurred. In some cases, a flexible symbol scheduled via dynamic SFI may be overwritten by UE specific data (e.g., changed to DL or UL). In such cases, the UE 115-*a* may use the DCI for UE-specific data transmission and reception to determine whether the flexible symbol is UL or DL. In a UE PDCCH monitoring occasion, if a direction of a flexible symbol is indicated by SFI (e.g., not overwritten) for at least one symbol also configured for UE specific PDCCH, then the UE 115-*a* may not be expected to monitor the PDCCH.

In some cases, resources may be granted via DCI for multi-slot transmission (e.g., physical downlink shared channel (PDSCH), physical uplink shared channel (PUSCH), PUCCH) via semi-static DL/UL assignment. In such cases, if the assignment configuration of a slot has no direction conflict with scheduled PDSCH/PUSCH/PUCCH assigned symbols, the PDSCH/PUSCH/PUCCH in that slot may be transmitted. If the assignment configuration of a slot has a direction conflict with scheduled PDSCH/PUSCH/ PUCCH assigned symbols, then the PDSCH/PUSCH/ PUCCH transmission in that slot may be canceled. For DCI granted multi-slot transmission (PDSCH/PUSCH/PUCCH) that overlaps with slots scheduled via dynamic SFI, when there is no semi-static DL/UL assignment or the semi-static DL/UL assignment indicates 'flexible,' then the slots may follow the scheduled multi-slot transmission allocation.

In some cases, resources may be allocated via configured grants. If the UE 115-*a* is configured by higher layers to receive PDSCH or CSI-RS in the set of symbols in a slot allocated via configured grant, then the UE 115-*a* may receive the PDSCH or the CSI-RS in the set of symbols of the slot if an SFI-index field value in DCI format 2_0 indicates the set of symbols of the slots as downlink. If the UE 115-*a* is configured by higher layers to transmit PUCCH, PUSCH, or physical random access channel (PRACH) in the set of symbols of the slot allocated via configured grants, then the UE 115-*a* may transmit the PUCCH, PUSCH, or PRACH in the slot if an SFI-index field value in DCI format 2_0 indicates the set of symbols of the slot as uplink.

In NR systems, such as wireless communications system 200, the devices (e.g., base station 105-*a* and UE 115-*a*) may support preemption indication for resource management. A downlink preemption indication may be transmitted by the base station 105-*a* to the UE 115-*a*, and the preemption indication may identify resources (e.g., downlink-scheduled resources) as being preempted. In some instances, the preempted resources may have already occurred, meaning that the preemption indicator may signal the UE 115-*a* to not process data received during the preempted resources. An uplink preemption indication may be transmitted by the base station 105-*a* to the UE 115-*a* to indicate that the UE 115-*a* should not transmit during previously-scheduled uplink resources. Thus, when UE 115-*a* receives a preemption indication, the UE 115-*a* may be configured to respond accordingly. For example, the UE 115-*a* may cease transmissions for UL symbols indicated as preempted, may not process DL symbols indicated as preempted, or, in some cases, may ignore the preemption indication. Different services may have different performance requirements or priorities. In particular, URLLC (or higher priority communications or channels) may be expected to be scheduled with tighter timelines due to lower latency requirements. For example, ultra-reliability may correspond to a 10-5 block-error rate (BLER). In order to facilitate scheduling URLLC traffic and to maximize system efficiency, it may be important to have eMBB (or lower priority communications or channels) and URLLC resources dynamically multiplexed in the same carrier. Thus, it may be important to preempt ongoing eMBB transmissions for a newly scheduled URLLC transmission due to its urgency and ultra-reliability.

For downlink preemption, preemption indication monitoring may be configured by RRC signaling, and the configuration of UE monitoring of preemption indications may be indicated per DL bandwidth part (BWP). Preempted resources may be indicated by a group common DCI (GC-DCI) carrying the preemption indication. Preemption may affect a particular time and/or frequency resources. The time duration of the reference DL resource for preemption indication may equal the monitoring periodicity of the group-common DCI carrying the preemption indication (e.g., 1 slot, 2 slots, etc.). The frequency region of the reference DL resource for preemption indication may be the active DL BWP. The periodicity to monitor group common DCI for a pre-emption indication may be UE configured. For RRC-configurable payload size of the GC-DCI carrying the downlink pre-emption indication (PI), a bitmap may be used to indicate preempted resources within the semi-statically configured DL reference resource. The bitmap may indicate preemption for one or more frequency domain parts (N≥1) and/or one or more time domain parts (M≥1). The combinations of {M, N}={14, 1}, {7, 2} may be supported and predefined. A combination of {M,N} from this set of possible {M,N} may be indicated in 1-bit by RRC configuration for a UE. When a preemption indication (PI) is detected by the UE 115-*a*, the impacted time/frequency resource may be assumed to be preempted (although previously allocated), and the UE 115-*a* may process resources accordingly. UL PIs may be indicated as described with respect to DL PIs. However, when the UL PI is detected, the UE may stop an ongoing UL transmission according to the PI.

In NR systems, such as wireless communications system 200, the devices may support scheduling of resources via grants for resource management. The grants may be in the form of dynamically scheduled grants via DCI or configured grants. For dynamically scheduled grants via DCI, PDSCH may be scheduled by DCI formats 1_0 and 1_1, PUSCH may be scheduled by DCI formats 0_0 and 0_1. The schedule may be for a mini-slot (e.g., 2, 4, or 7 symbols), a slot, or multiple slots. For resources scheduled via configured grants, the resources may be configured via RRC or with scheduling information partially configured by RRC and using DCI to activate/release the configured grant while the activation/deactivation DCI may provide additional scheduling information. Each grant may be allocated for a packet consisting of one transport block (for up to 4 layers MIMO) or two transport blocks (5 to 8 layers MIMO), with a specific set of frequency and time resources.

Aspects of the disclosure described herein provide for resource management techniques to leverage dynamic scheduling via DCI and configured grant scheduling for file transmission. Group-based scheduled packets (e.g., files) may require high reliability and reasonably low latency (e.g., in XR services). This may be due to packet dependencies within a file. For example, if one packet of a file is dropped or fails to transmit in wireless communications system 200, then the file (e.g., remaining packets) may not be useful to one or more of the devices (e.g., the UE 115-*a* and base station 105-*a*). As such, the techniques described herein may increase the reliability of a file transmission. Further aspects may provide techniques for handling potential interaction with slot format indication and UL/DL preemption indications, as well as power management, DM-RS management, and coherent transmission/reception.

Figure 3:
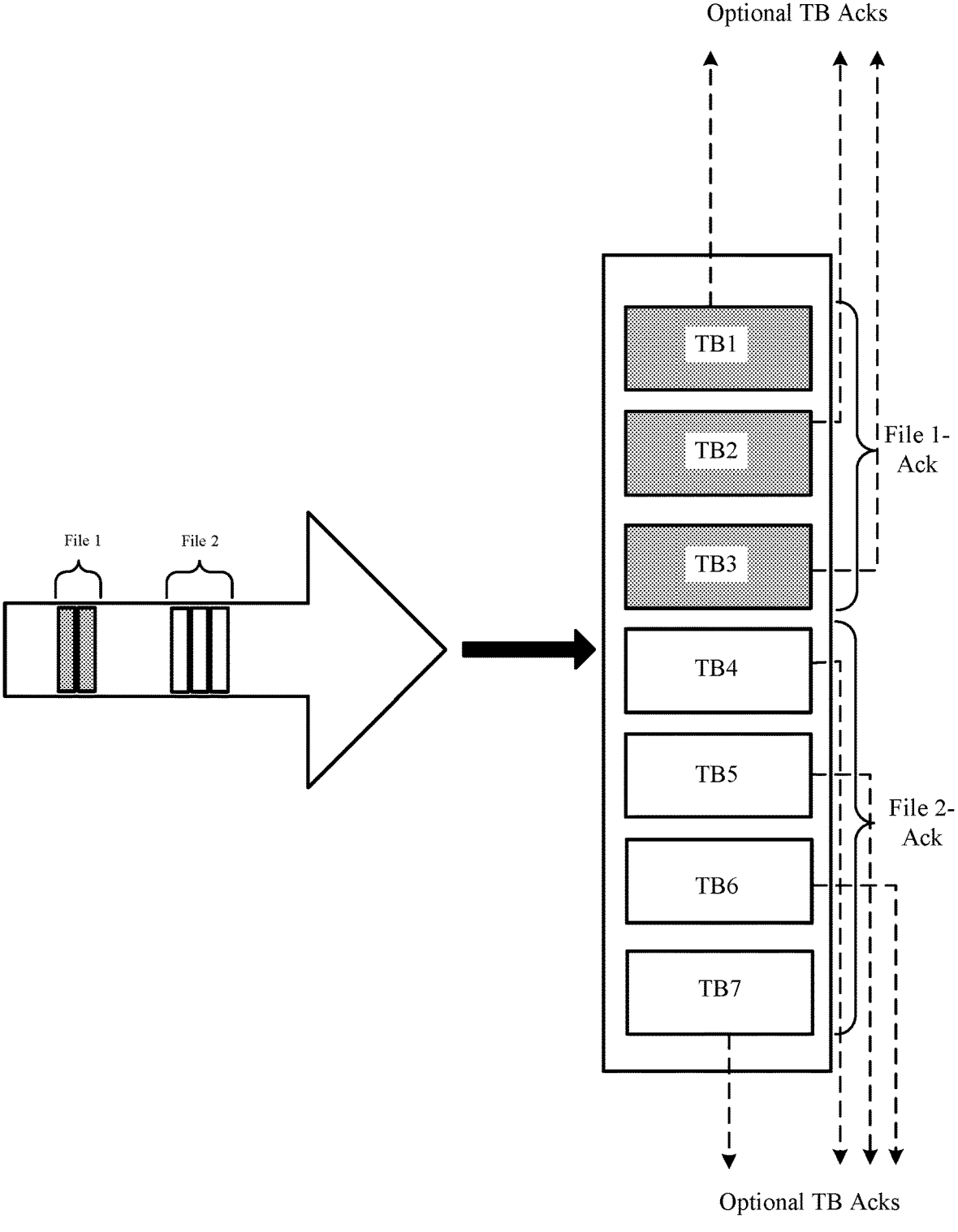
FIG. 3 illustrates an example of a wireless communications system that supports transmission batch scheduling and resource management in accordance with aspects of the present disclosure.

FIG. 3 illustrates an example of a mapping 300 that supports transmission batch scheduling and resource management in accordance with aspects of the present disclosure. In some examples, mapping 300 may implement aspects of wireless communications system 100. In some examples, the mapping 300 may be implemented by aspects of wireless communications system 100 and the wireless communications system 200 as described with reference to FIG. 1 and FIG. 2. In the example of FIG. 3, the mapping 300 may depict a mapping of packets (such as data packets included in one or more processing batches) to one or more transport blocks based on a processing-batch assignment for each packet for management resources. In one implementation, the packets may be mapped to one or more files (or processing batches) based on delivery deadlines associated with the packets.

According to one or more aspects of the present disclosure, a transmitter (such as, a UE 115 or a base station 105) may map a first group of packets (such as, packets associated with File 1) to a first transport block (TB 1), a second transport block (TB 2), and a third transport block (TB 3). As depicted in the example of FIG. 3, the first group of packets may be associated with a first processing batch (or file). In some cases, the first processing batch may have an urgent deadline. In some examples, the transmitter may map a second group of packets (such as packets associated with File 2) to a fourth transport block (TB 3), a fifth transport block (TB 5), a sixth transport block (TB 6), and a seventh transport block (TB 7)). In some examples, the second group of packets may be associated with a second processing batch (or file). In some cases, the second processing batch may have a non-urgent deadline. As described with reference to FIG. 3, the base station 105 may map the packets as previously described, and the UE 115 may receive the mapped packets. The UE 115 may then optionally transmit one or more transport block (TB) acknowledgements (for TB 1, TB 2, TB 3, TB 3, TB 5, TB 6, and TB 7).

According to one or more aspects of the present disclosure, the UE 115 may provide a processing-batch based (or file-based) acknowledgement to indicate a reception of a processing-batch. For example, the UE 115 may transmit a first processing-batch based acknowledgement to acknowledge the reception of File 1, and a second processing-batch based acknowledgement to acknowledge the reception of File 2.

Figure 4:
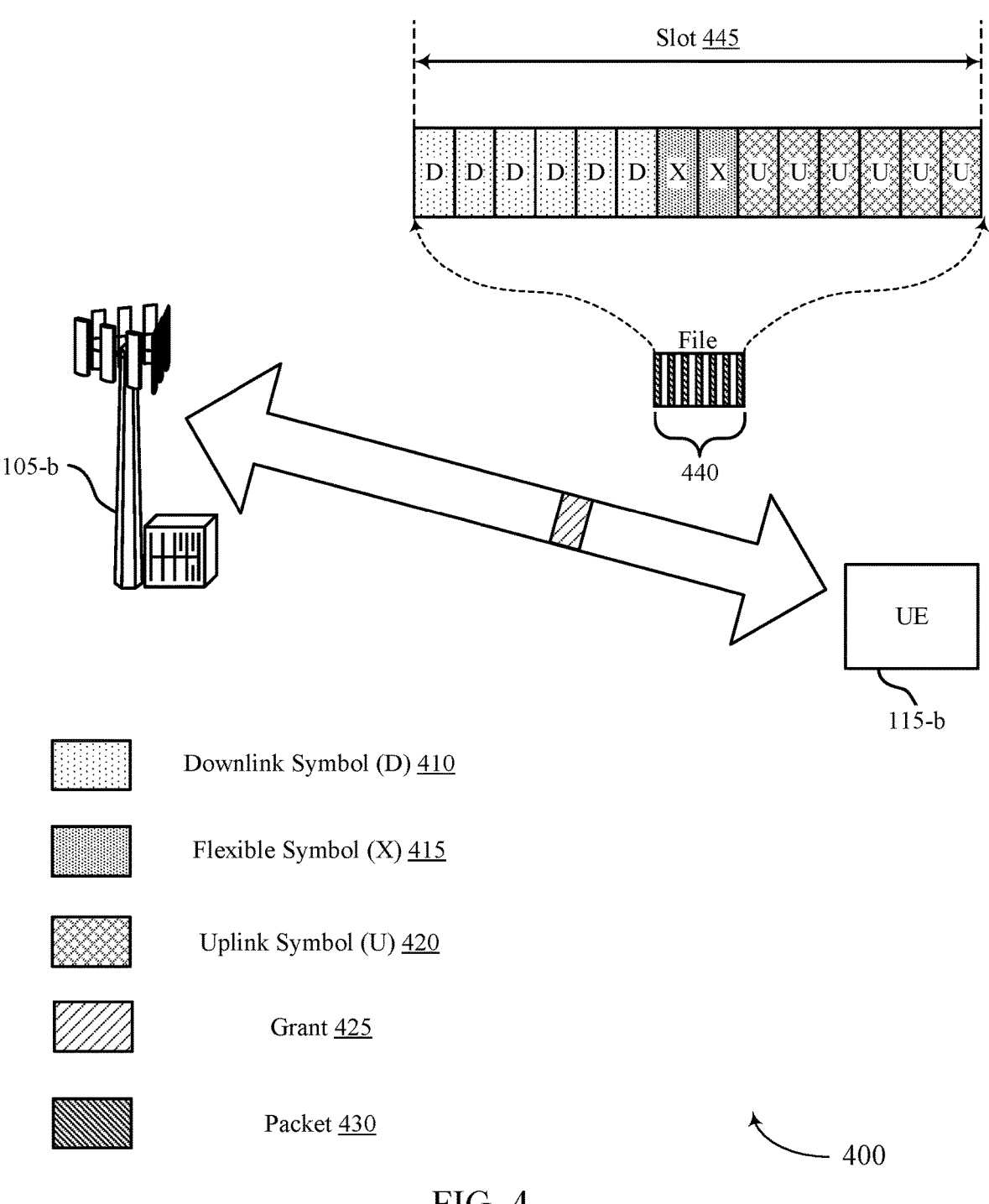
FIG. 4 illustrates an example of a wireless communications system that supports transmission batch scheduling and resource management in accordance with aspects of the present disclosure.

FIG. 4 illustrates an example of a wireless communications system 400 that supports transmission batch scheduling and resource management in accordance with aspects of the present disclosure. In some examples, wireless communications system 400 may implement aspects of wireless communications system 100. In some examples, the wireless communications system 400 may implement aspects of the wireless communications systems of FIGS. 1 through 3. The wireless communications system 400 includes a base station 105-b and a UE 115-b, which may be examples of the corresponding devices of FIGS. 1 to 3. The UE 115-b and the base station 105-b may communicate various control and data (e.g., packets 430) in accordance with various grants (e.g., grant 425) and on one or more communication links established between the UE 115-b and the base station 105-b.

In FIG. 4, the base station 105-b transmits one or more grants including grant 425 on downlink resources (e.g., PDCCH, PDSCH). The grant may allocate resources for communication of a packet 430 of a plurality of packets configured to be processed together as a file 440. The grant 425 (or another grant) may allocate various resources, such as slot 445, which may be used to communicate the packets 430 of the file 440. For performing resource management, the UE 115-b may identify a transmission direction schedule for the slot 445 including a plurality of symbols. The transmission direction schedule may identify the symbols of the slot as downlink symbols 410, flexible symbols 415, or uplink symbols 420 in accordance with a grant. In accordance with the transmission direction schedule, the file may be communicated on the various symbols of the slot 445. For example, if the file 440 is scheduled to be transmitted from the UE 115-b to the base station 105-b, then the UE 115-b may map the data (e.g., packets 430) of the file 440 to the uplink symbols 420 of the slot for communication of a batch of transmissions including the file. In some cases, the UE 115-b may designate one or more of the flexible symbols 415 as uplink symbols 420 (e.g., in addition to the uplink symbols 420) for communication of the file 440 as a batch of transmission. If the file 440 is scheduled to be transmitted from the base station 105-b to the UE 115-b, then the downlink symbols 410 of the slot 445 may be used to communicate the file 440. In some case, the flexible symbols 415 may also be designated as downlink symbols for communication of the file 440 in a batch of transmissions.

For any cell-specific and UE-specific semi-statically indicated downlink symbols 410 or uplink symbols 420, communication of the packets 430 of the file 440 may be consistent with the indicated link direction. In other words, the downlink symbols 410 and the uplink symbols 420 may not be changed for communication of the packets 430. If the file 440 is scheduled for communication via a UE-specific DCI (e.g., if the grant 425 is a UE-specific DCI), then the direction of the flexible symbols 415 may be determined in accordance with the UE-specific DCI. If the file 440 is scheduled via configured grant (e.g., the grant 425 is a configured grant indication), then directions of the flexible symbols 415 may be determined in accordance with either a group common DCI or in accordance with the configured grant (e.g., grant 425).

In the case of the file 440 being scheduled via configured grant and the group-common DCI taking precedence for flexible symbol 415 direction over the configured grant, then a packet 430 being dropped from the file 440 may increase the likelihood that the file 440 is not delivered. However, in such cases, then the UE 115-b and the base station 105-b may be configured to automatically retransmit a dropped packet 430 of the file 440. In the case of the file 440 being scheduled via configured grant and the configured grant taking precedence for flexible symbol 415 direction over the configured grant, a new group common DCI may be introduced. The group common DCI may indicate a slot structure for group-scheduling (or file scheduling) such that group-scheduled packets may take precedence over legacy group common DCIs. Thus, when a file 440 is scheduled for transmission, then the UE 115-b may ignore the legacy DCI and monitor for the new dedicated group common DCI.

In some cases, the wireless communications system 400 may support other resource management techniques for increasing the likelihood for successful file transmission. For example, if the file is scheduled for transmission between the UE 115-b and the base station 105-b, then the UE 115-b may determine to increase the power for transmission of each packet of the file. For example, file and non-file based PUSCH may share the same open loop configuration and the same closed loop operation. However, for the PUSCH transmission identified to be within a file, an additional power boost (e.g., of n dB) can be applied for new & re-transmissions (or only to re-transmissions). The value of n may be pre-defined or configured or may be dependent on the file size.

Another resource management technique may support coherent detection/transmission across two or more packets in the group (e.g., on the same carrier). For downlink transmissions of files DM-RS borrowing/bundling may be considered. That is, DM-RS for a first packet in a group can be used or combined with DM-RS of a second packet in the same group to improve PDSCH detection. The same pre-coding and energy per resource element (EPRE) may be assumed across different packets. For uplink transmission of files, uplink transmission adjustment may be prohibited during the transmission of the entire group (to maintain phase continuity).

Figure 5:
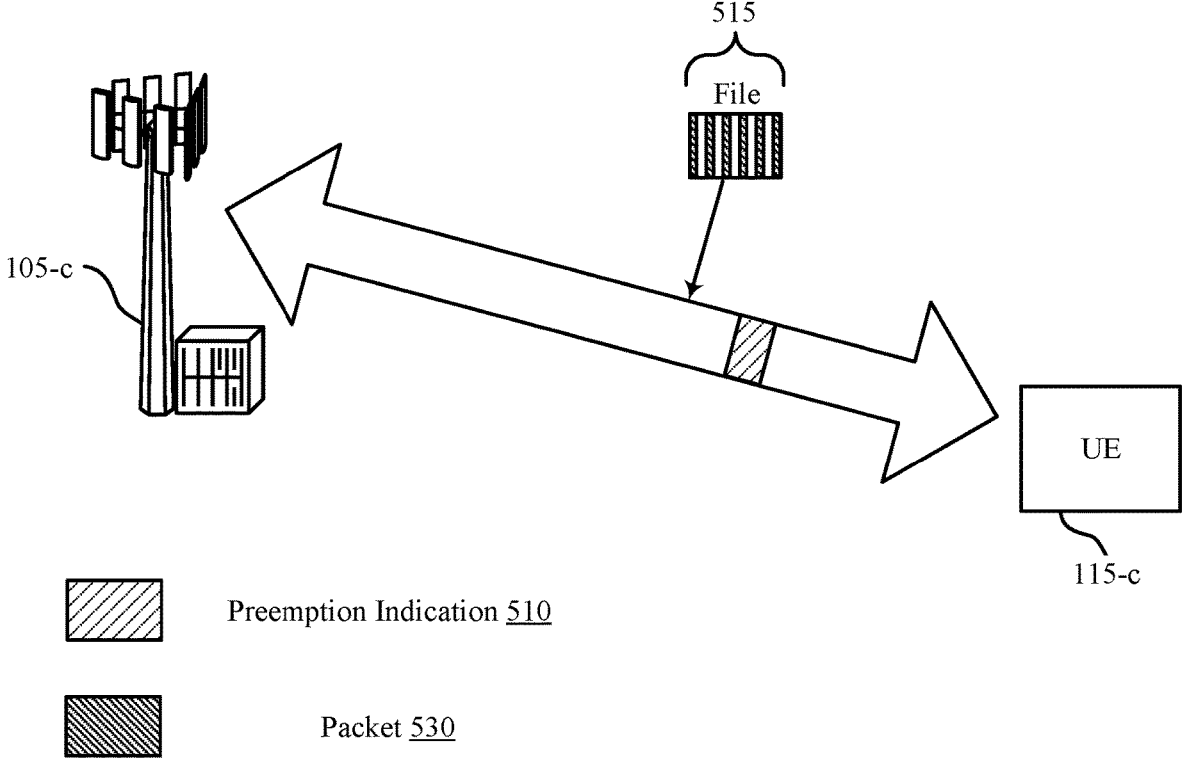
FIG. 5 illustrates an example of a wireless communications system that supports transmission batch scheduling and resource management in accordance with aspects of the present disclosure.

FIG. 5 illustrates an example of a wireless communications system 500 that supports transmission batch scheduling and resource management in accordance with aspects of the present disclosure. In some examples, wireless communications system 500 may implement aspects of wireless communications system 100. In some examples, the wireless communications system 500 may implement aspects of the wireless communications systems of FIGS. 1 through 4. The wireless communications system 500 includes a base station 105-c and a UE 115-c, which may be examples of the corresponding devices of FIGS. 1 to 4. The UE 115-c and the base station 105-c may communicate various control and data (e.g., packets 530) in accordance with various grants and on one or more communication links established between the UE 115-b and the base station 105-b.

A file 515 including a plurality of packets 530 configured to be processed together is scheduled for transmission from the UE 115-c to the base station 105-c or is being received by the UE 115-c from the base station 105-c according to a grant. The base station 105-c may transmit a preemption indication 510. The preemption indication 510 may specify resources for preemption. In some cases, the specified resources correspond to resources being used to communicate the file 515 or packets 530 of the file. According to the preemption indication 510, the UE 115-c may identify that at least a portion of the set of resource allocated for communication of a batch of transmissions (carrying the file 515) is preempted. Based on one or more preemption rules, the UE 115-c may apply the preemption indication 510 to processing or transmission of the file 515.

If the file 515 is scheduled for downlink and the UE 115-c receives the preemption indication 510, then the preemption rule may designate that the indicated preempted resources are not available for the corresponding PDSCH. In other words, the UE 115-c may process the resources carrying the file 515. This processing may be similar to the effect of a preemption indication to an eMBB device. If the file 515 is scheduled for uplink and the UE 115-c receives the preemption indication 510, then the preemption rule may designate that the impacted PUSCH is not to be used to transmit of the file starting from the indicated pre-empted resources (e.g., the UE 115-c stop transmission on the PUSCH).

In some cases, a preemption rule may designate that the UE 115-c ignore the preemption indication 510 according to various conditions. For example, a new preemption indication dedicated to file scheduling may be used for group scheduled packets 530. Thus, when a file 515 is scheduled for transmission, the UE 115-c may ignore legacy DL preemption indications or legacy UL preemption indications and monitor for the new file or group dedicated downlink preemption indication or uplink preemption indication.

Figure 6:
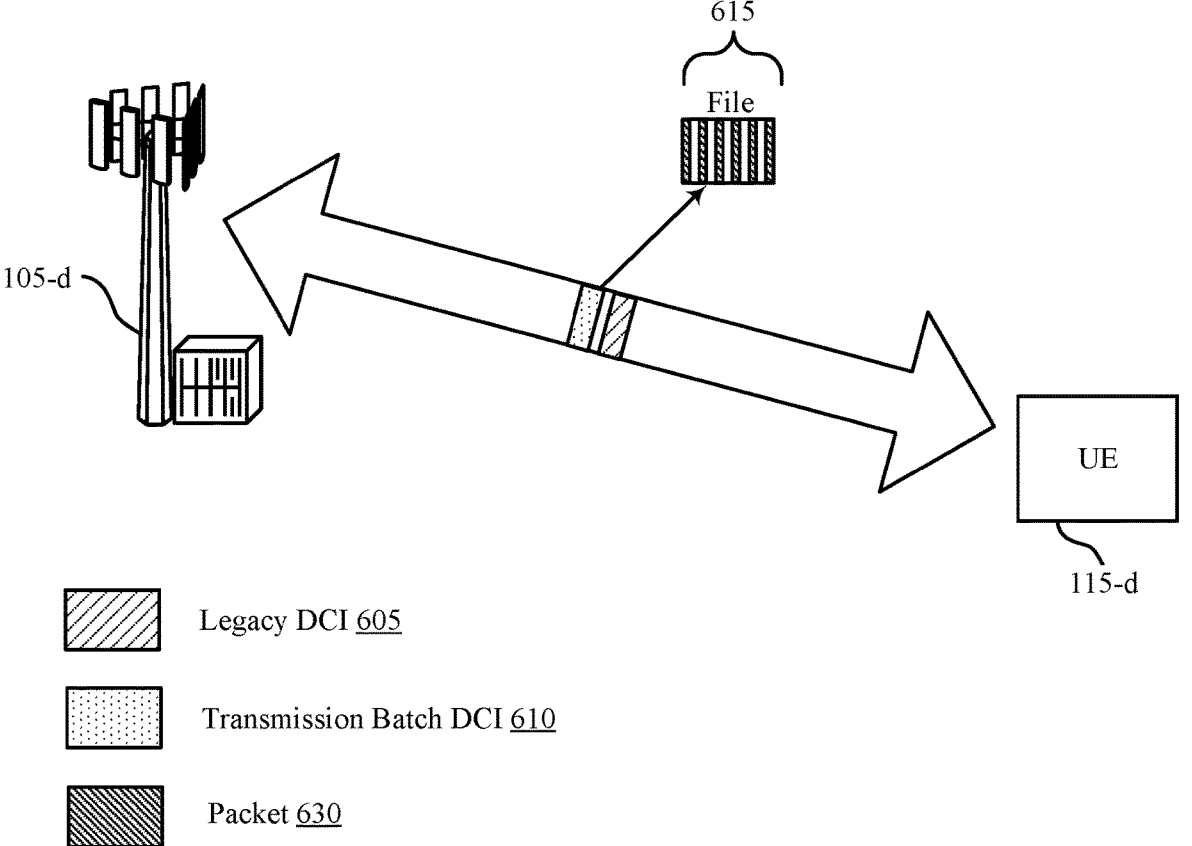
FIG. 6 illustrates an example of a wireless communications system that supports transmission batch scheduling and resource management in accordance with aspects of the present disclosure.

FIG. 6 illustrates an example of a wireless communications system 600 that supports transmission batch scheduling and resource management in accordance with aspects of the present disclosure. In some examples, wireless communications system 600 may implement aspects of wireless communications system 100. In some examples, the wireless communications system 600 may implement aspects of the wireless communications systems of FIGS. 1 through 5. The wireless communications system 600 includes a base station 105-d and a UE 115-d, which may be examples of the corresponding devices of FIGS. 1 to 5. The UE 115-d and the base station 105-d may communicate various control and data (e.g., packets 630) in accordance with various grants and on one or more communication links established between the UE 115-d and the base station 105-d.

In some cases, resources may be granted via one or DCI messages, such as legacy DCI 605 and transmission batch DCI 610. The transmission batch DCI 610 may be allocated to a first set of decoding candidates in a control channel (e.g., PDCCH) and may be configured to allocate resources for a batch of transmissions that collectively carry a file 615 having a plurality of packets 630 configured to be processed together. The legacy DCI 605 may be allocated to a second set of decoding candidates in the control channel and may be configured to allocate resources for communication of data not pertaining to files. The first set of decoding candidates and the second set of decoding candidates may differ by at least one decoding candidate. The UE 115-d and the base station 105-d may communicate based at least in part on monitoring of the first or second set of decoding candidate by the UE 115-d. The control channel carrying the first and second set of decoding candidate may be a cell-specific or a group-specific downlink control channel or a UE-specific grant In some cases, the first set if decoding candidates and the second set of decoding candidates differ by at least one decoding candidate based at least in part on a set of aggregation levels, the set of decoding candidates for a given aggregative level, or a downlink control information message size. For example, the transmission batch DCI 610 may have an aggregation level 16 instead of aggregation level 8. In some cases, the transmission batch DCI 610 of the first set of decoding candidates includes an indication linking the downlink control information message to a previous downlink message in a previous grant (e.g., previous DCI) corresponding to the batch of transmissions (e.g., the file 615). For example, a first transmission batch DCI 610 may schedule a first packet 630 of the file 615, and a second transmission batch DCI may schedule a second packet 630 of file 615. Each of the first transmission batch DCI 610 and the second transmission batch DCI 610 may indicate the presence of the other DCIs, so that if one DCI is missed, the UE 1151-d may identify PDSCH transmissions scheduled by the other DCI, if the PDSCHs have one-to-one resource mappings (e.g., same resource allocation in adjacent slots).

FIG. 7 illustrates an example of a wireless communications system 700 that supports transmission batch scheduling and resource management in accordance with aspects of the present disclosure. In some examples, wireless communications system 700 may implement aspects of wireless communications system 100. In some examples, the wireless communications system 700 may implement aspects of the wireless communications systems of FIGS. 1 through 6. The wireless communications system 700 includes a base station 105-e and a UE 115-e, which may be examples of the corresponding devices of FIGS. 1 to 5. The UE 115-*d* and the base station 105-*d* may communicate various control and data (e.g., packets 730) in accordance with various grants and on one or more communication links established between the UE 115-*d* and the base station 105-*d*.

The UE 115-*e* and the base station 105-*e* may communicate using NR wireless communication formats and may support transmission batch configured grants 710 for file 715 transmission. The UE 115-*e* may transmit a transmission batch configured grant 710 to the UE 115-*e*. The transmission batch configured grant 710 may include a configured grant index indicative of a resource configuration for communication of a batch of transmissions that collectively carry the file 715 having a plurality of packets 730 configured to be processed together. In a first resource configuration example, the configured grant index may indicate utilization of a single transport block in a slot. In a second resource configuration example, the configured grant index may indicate utilization of two transport blocks in two adjacent slots. In a third resource configuration example, the configured grant index may indicate utilize of four transport blocks of a first size in four adjacent slots. In a fourth resource configuration example, the configurated grant index may indicate utilization of four transport blocks of a second size in four adjacent slots.

Base station 105-*e* or UE 115-*e* may activate a resource configuration indicated by the transmission batch configured grant 710 based on need. In one example, UE 115-*e* may chose (e.g., activate) one configured grant depending in the buffer size within the UE 115-*e* and/or quality of service requirements. Accordingly, the UE 115-*e* and the base station 105-*e* may determine resources for communication of the file 715 based on the file 715 and the transmission batch configured grant 710.

Figure 8:
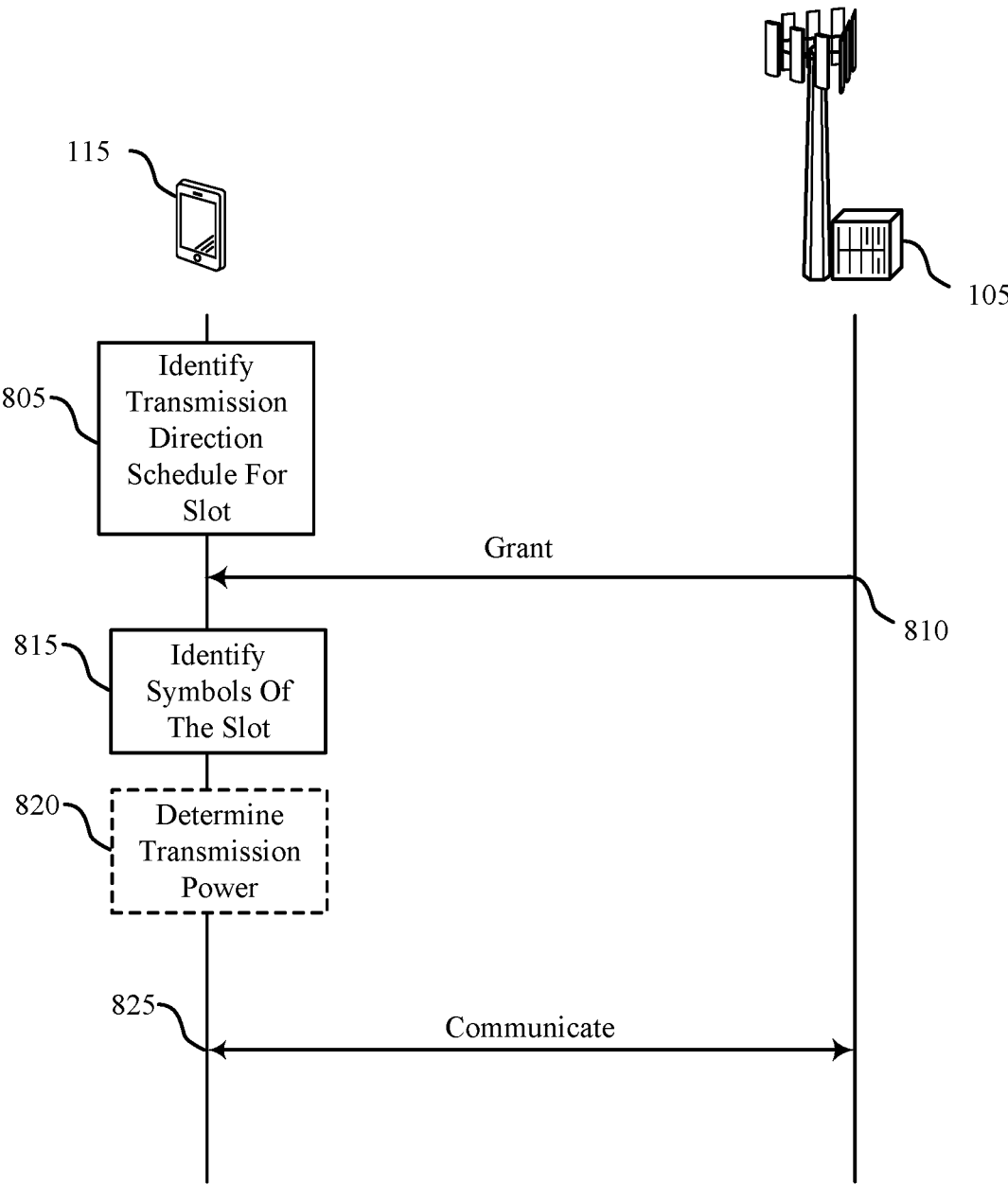
FIG. 8 illustrates an example of a process flow diagram that supports transmission batch scheduling and resource management in accordance with aspects of the present disclosure.

FIG. 8 illustrates an example of a process flow diagram 800 that supports transmission batch scheduling and resource management in accordance with aspects of the present disclosure. In some examples, process flow diagram 800 may implement aspects of wireless communications system 100. The process flow diagram includes UE 115 and base station 105, which may be examples of the corresponding devices of FIGS. 1 through 7. The devices may be operating in a NR wireless communications system.

At 805, the UE 115 identifies a transmission direction schedule for a slot. The transmission schedule may identify one or more symbols of the slot as being uplink, downlink, or flexible. In some cases, identifying the transmission direction schedule includes receiving the transmission direction schedule via a cell-specific or UE-specific radio resource control message, wherein a transmission direction of the one or more symbols, as indicated by the grant, is in accordance with the transmission direction schedule for the one or more symbols.

At 810, the UE 115 receives, from the base station 105, a grant for communication, by the UE, of a packet that is one of a plurality of packets configured to be processed together as a file. In some cases, the grant is a UE-specific downlink control information message, and the transmission direction of a flexible symbol may be based at least in part on the UE-specific downlink control information message. In other cases, the grant may be a configured grant via a radio resource control message. The UE 115 may further receive a group common downlink control information, and the transmission direction of a flexible symbol may be based at least in part on the group common downlink control information message or on the configured grant. The group common downlink control information message may be a formatted in a file-specific format. In the case of the grant being a configured grant, the grant may include a configured grant index indicative of a resource configuration for communication, by the UE, of a batch of transmissions that collectively carry a file having a plurality of packets configured to be processed together. For example, the resource configuration may include one or more assignments for the communication of the file using two or more transport blocks, which may be transmitted or received in adjacent slots. In some cases, the UE 115 may activate the configured grant based on the file, quality of service requirements, or buffer size.

At 815, the UE 115 identifies, based at least in part on at least one of the grant and the transmission direction schedule, one or more symbols of the slot for communication of the packet. Identification of the symbols may include identifying at least one symbol of the slot as a flexible symbol.

At 820, the UE 115 may determine a transmission power for transmitting the uplink transmission based at least in part on the grant pertaining to transmission of batches. The UE 115 may increase the transmission power relative to transmission not associated with transmitting the file. In such cases, the UE 115 may increase the likelihood that the packets of the file are received at the base station 105. The transmission power amount may be determined based on a pre-defined offset, the size of the file, or an indication received in a control channel. At 825, the UE 115 and the base station 105 participate in the communication of the packet on the identified one or more symbols of the slot. Participation in communication may include transmitting the packet to the base station 105 or receiving the packet from the base station 105. In some cases, transmitting the packet may include transmitting the uplink transmission in accordance with the transmission power and the grant. In the same or alternative cases, the UE 115 may transmit the uplink transmission while maintaining a phase continuity for at least two transmissions within the batch of transmissions based at least in part on receiving the grant for communication of the uplink transmission. When the batch of transmissions is communicated from the base station 105 to the UE 115, a reference signal corresponding to a first transmission in the batch is combined with a reference signal corresponding to a second transmission in the batch, and the UE 115 may decode the transmission in accordance with the combined reference signal.

Figure 9:
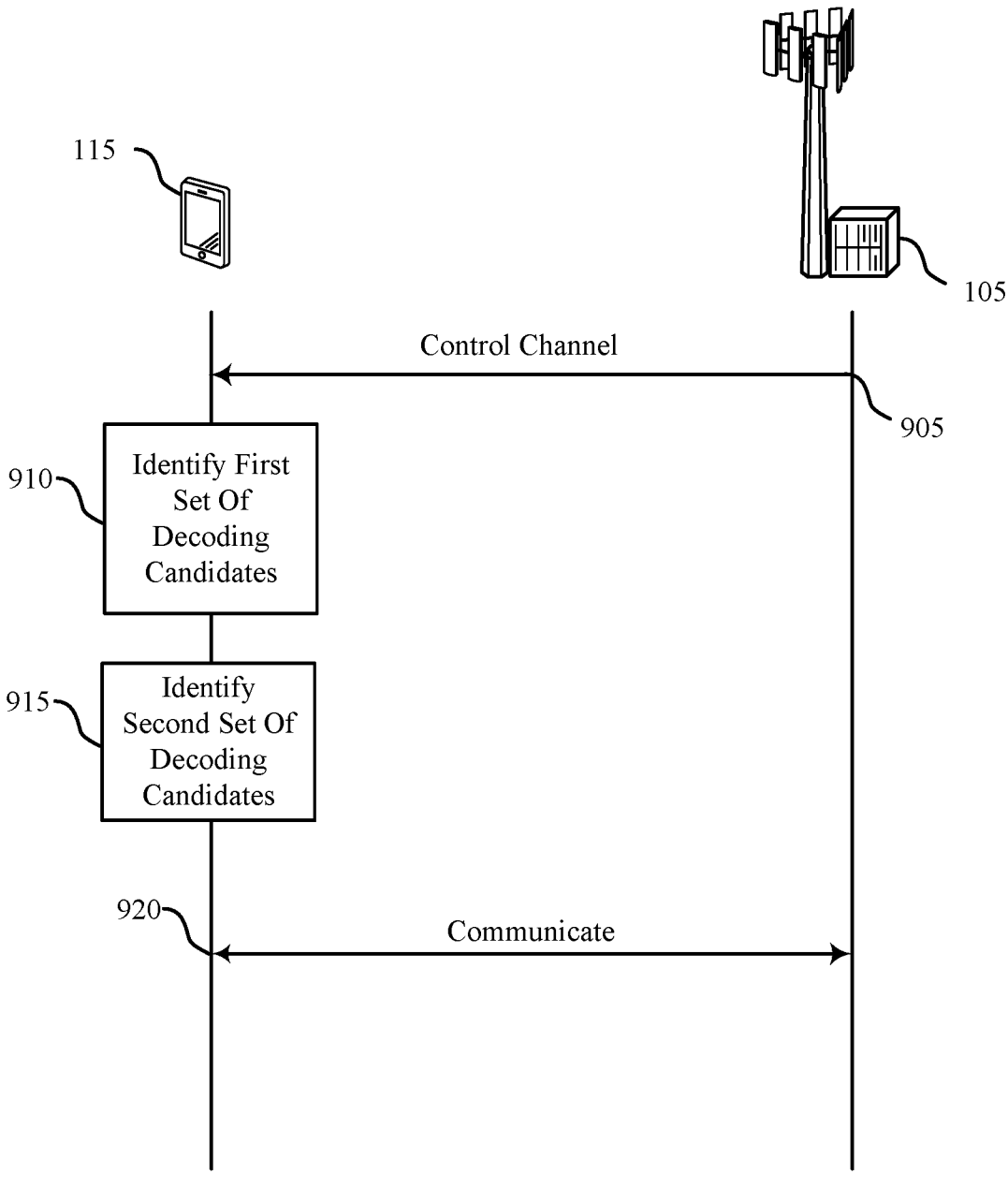
FIG. 9 illustrates an example of a process flow diagram that supports transmission batch scheduling and resource management in accordance with aspects of the present disclosure.

FIG. 9 illustrates an example of a process flow diagram 900 that supports transmission batch scheduling and resource management in accordance with aspects of the present disclosure. In some examples, process flow diagram 900 may implement aspects of wireless communications system 100. The process flow diagram 900 includes UE 115 and base station 105, which may be examples of the corresponding devices of FIGS. 1 through 8. The devices may be operating in a NR wireless communications system.

At 905, UE 115 receives information via a control channel from the base station 105. The control channel may be a PDCCH. At 910, the UE 115 identifies a first set of decoding candidates for communication of a batch of transmissions that collectively carry a file having a plurality of packets configured to be processed together. At 920, the UE 115 identifies a second set of decoding candidates for communications not pertaining to files, wherein the first set of decoding candidates and the second set of decoding candidates differ by at least one decoding candidate. The decoding candidates may correspond to resources of the control channel. In some cases, the UE 115 monitors a cell-specific or a group-specific downlink control channel to identify the decoding candidates. In other cases, the UE 115 monitors for one or more UE-specific grants to identify the decoding candidates.

The first set of decoding candidates and the second set of decoding candidates differ by at least one decoding candidate based at least in part on a set of aggregation levels, a set of decoding candidates for a given aggregation level, or a downlink control information message size. In some cases, a downlink control information message in one of the first set of decoding candidates includes an indication linking the downlink control information message to a previous downlink message in a previous grant corresponding to the batch of transmissions. At 925, the UE 115 and the base station 105 participate in the communication by monitoring at least one of the first set of decoding candidates or the second set of decoding candidates.

Figure 10:
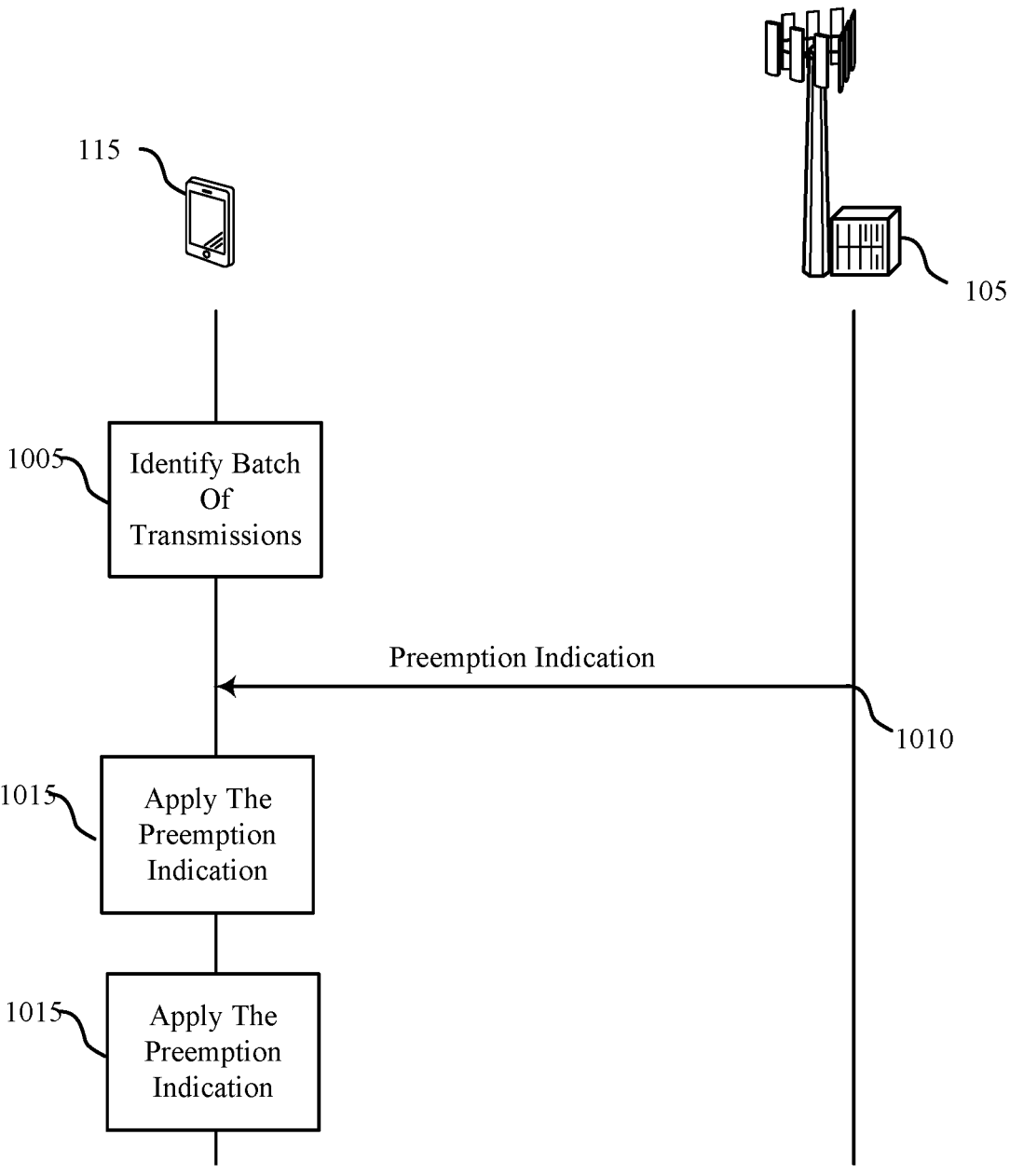
FIG. 10 illustrates an example of a process flow diagram that supports transmission batch scheduling and resource management in accordance with aspects of the present disclosure.

FIG. 10 illustrates an example of a process flow diagram 1000 that supports transmission batch scheduling and resource management in accordance with aspects of the present disclosure. In some examples, process flow diagram 1000 may implement aspects of wireless communications system 100. The process flow diagram 1000 includes UE 115 and base station 105, which may be examples of the corresponding devices of FIGS. 1 through 9. The devices may be operating in a NR wireless communications system.

At 1005, the UE 115 identifies that a batch of transmissions has been received from a base station or is scheduled to be transmitted to the base station via a set of resources. The batch collectively comprises a file having a plurality of packets configured to be processed together. At 1010, the UE 115 receives a preemption indication from the base station. At 1015, the UE 115 identifies, via the preemption indication, that at least a portion of the set of resources allocated for communication of the batch is preempted. At 1020, the UE 115 applies the preemption indication to process or transmission of the batch in accordance with a rule for preemption of batches. In cases when the batch is received from the base station 105, applying the preemption indication to processing the batch includes processing the batch without processing transmissions received on the portion of the set of resources indicated as preempted, in accordance with the rule for preemption of batches. In other cases where the batch is received from the base station applying the preemption indication to processing the batch includes processing the batch by ignoring the preemption indication, in accordance with the rule for preemption of batches.

In cases when the batch is transmitted to the base station 105, applying the preemption rule to transmission of the batch may include transmitting a first portion of the file using resources of the set of resources that precede the portion of the set of resources indicated as preempted and refraining from transmitting a second portion of the file on the portion of the set of resources indicated as preempted, in accordance with the rule for preemption of batches. In other cases when the batch is transmitted to the base station 105, applying the preemption rule to transmission of the batch may include transmitting the file by ignoring the preemption indication, in accordance with the rule for preemption of batches. In some cases, the preemption indication is different from a legacy preemption indication, and the UE 115 ignores the legacy preemption indication based on the file being scheduled or received.

Figure 11:
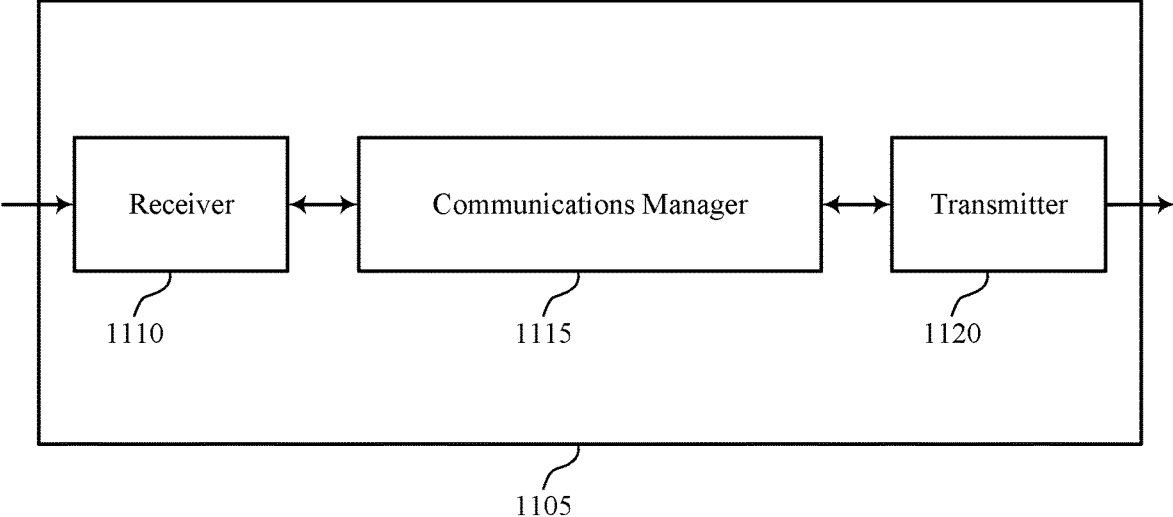
FIGS. 11 and 12 show block diagrams of devices that support transmission batch scheduling and resource management in accordance with aspects of the present disclosure.

FIG. 11 shows a block diagram 1100 of a device 1105 that supports transmission batch scheduling and resource management in accordance with aspects of the present disclosure. The device 1105 may be an example of aspects of a UE 115 as described herein. The device 1105 may include a receiver 1110, a communications manager 1115, and a transmitter 1120. The device 1105 may also include a processor. Each of these components may be in communication with one another (e.g., via one or more buses).

The receiver 1110 may receive information such as packets, user data, or control information associated with various information channels (e.g., control channels, data channels, and information related to transmission batch scheduling and resource management, etc.). Information may be passed on to other components of the device 1105. The receiver 1110 may be an example of aspects of the transceiver 1420 described with reference to FIG. 14. The receiver 1110 may utilize a single antenna or a set of antennas.

The communications manager 1115 may identify a packet that is one of a set of packets configured to be processed together as a file, perform resource management for communicating the packet based on identifying that the packet is one of the set of packets configured to be processed together as the file, and participate in the communicating of the packet in accordance with the resource management and the packet being one of the set of packets configured to be processed together as the file.

The communications manager 1115 may identify a transmission direction schedule for a slot, where the transmission direction schedule identifies one or more symbols of the slot as being uplink, downlink, or flexible, receive a grant for communication, by the UE, of a packet that is one of a set of packets configured to be processed together as a file, identify, based on at least one of the grant and the transmission direction schedule, one or more symbols of the slot for communication of the packet, and participate in the communication of the packet on the identified one or more symbols of the slot. The communications manager 1115 may also identify a first set of decoding candidates for communication of a batch of transmissions that collectively carry a file having a set of packets configured to be processed together, identify a second set of decoding candidates for communications not pertaining to files, where the first set of decoding candidates and the second set of decoding candidates differ by at least one decoding candidate, and participate in the communication by monitoring at least one of the first set of decoding candidates or the second set of decoding candidates. The communications manager 1115 may also receive at least one grant as a configured grant via a radio resource control message, the configured grant including a configured grant index indicative of a resource configuration for communication, by the UE, of a batch of transmissions that collectively carry a file having a set of packets configured to be processed together and participate in the communication based at least in part of on the configured grant. The communications manager 1115 may also identify that a batch of transmissions has been received from a base station or is scheduled to be transmitted to the base station via a set of resources, the batch collectively including a file having a set of packets configured to be processed together, identify, via a preemption indication, that at least a portion of the set of resources allocated for communication of the batch is preempted, and apply the preemption indication to processing or transmission of the batch in accordance with a rule for preemption of batches. The communications manager 1115 may also receive a grant for communication, by the UE, of an uplink transmission that is part of batch of transmissions that collectively carry a file having a set of packets configured to be processed together, determine a transmission power for transmitting the uplink transmission based on the grant pertaining to transmission of batches, and transmit the uplink transmission in accordance with the transmission power and the grant. The communications manager 1115 may also receive a grant for communication of a downlink transmission that is part of a batch of transmissions that collectively carry a file having a set of packets configured to be processed together, receive the downlink transmission in accordance with the grant, where a reference signal corresponding to a first transmission in the batch is combined with a reference signal corresponding to a second transmission in the batch, and decode the downlink transmission in accordance with the combined reference signal. The communications manager 1115 may also receive a grant for communication, by the UE, of an uplink transmission that is part of a batch of transmissions that collectively carry a file having a set of packets configured to be processed together and transmit the uplink transmission while maintaining a phase continuity for at least two transmissions within the batch of transmissions based on receiving the grant for communication of the uplink transmission. The communications manager 1115 may be an example of aspects of the communications manager 1410 described herein.

The communications manager 1115, or its sub-components, may be implemented in hardware, code (e.g., software or firmware) executed by a processor, or any combination thereof. If implemented in code executed by a processor, the functions of the communications manager 1115, or its sub-components may be executed by a general-purpose processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described in the present disclosure. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations The communications manager 1115, or its sub-components, may be physically located at various positions, including being distributed such that portions of functions are implemented at different physical locations by one or more physical components. In some examples, the communications manager 1115, or its sub-components, may be a separate and distinct component in accordance with various aspects of the present disclosure. In some examples, the communications manager 1115, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 1120 may transmit signals generated by other components of the device 1105. In some examples, the transmitter 1120 may be collocated with a receiver 1110 in a transceiver module. For example, the transmitter 1120 may be an example of aspects of the transceiver 1420 described with reference to FIG. 14. The transmitter 1120 may utilize a single antenna or a set of antennas.

Figure 12:
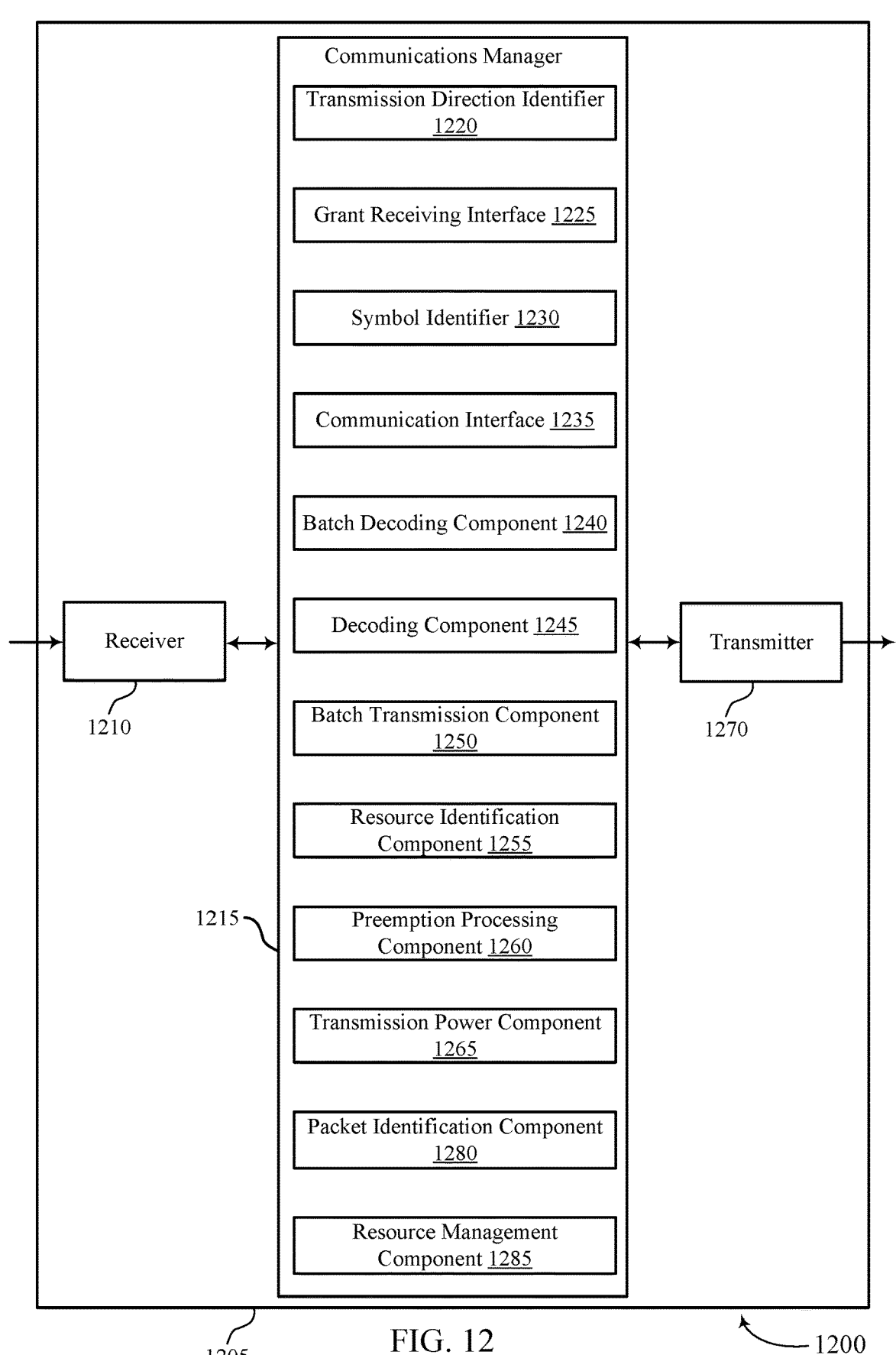

FIG. 12 shows a block diagram 1200 of a device 1205 that supports transmission batch scheduling and resource management in accordance with aspects of the present disclosure. The device 1205 may be an example of aspects of a device 1105, or a UE 115 as described herein. The device 1205 may include a receiver 1210, a communications manager 1215, and a transmitter 1270. The device 1205 may also include a processor. Each of these components may be in communication with one another (e.g., via one or more buses).

The receiver 1210 may receive information such as packets, user data, or control information associated with various information channels (e.g., control channels, data channels, and information related to transmission batch scheduling and resource management, etc.). Information may be passed on to other components of the device 1205. The receiver 1210 may be an example of aspects of the transceiver 1420 described with reference to FIG. 14. The receiver 1210 may utilize a single antenna or a set of antennas.

The communications manager 1215 may be an example of aspects of the communications manager 1115 as described herein. The communications manager 1215 may include a transmission direction identifier 1220, a grant receiving interface 1225, a symbol identifier 1230, a communication interface 1235, a batch decoding component 1240, a decoding component 1245, a batch transmission component 1250, a resource identification component 1255, a preemption processing component 1260, a transmission power component 1265, a packet identification component 1280, and a resource management component 1285. The communications manager 1215 may be an example of aspects of the communications manager 1410 described herein.

The packet identification component 1280 may identify a packet that is one of a set of packets configured to be processed together as a file.

The resource management component 1285 may perform resource management for communicating the packet based on identifying that the packet is one of the set of packets configured to be processed together as the file.

The communication interface 1235 may participate in the communicating of the packet in accordance with the resource management and the packet being one of the set of packets configured to be processed together as the file.

The transmission direction identifier 1220 may identify a transmission direction schedule for a slot, where the transmission direction schedule identifies one or more symbols of the slot as being uplink, downlink, or flexible. The grant receiving interface 1225 may receive a grant for communication, by the UE, of a packet that is one of a set of packets configured to be processed together as a file.

The symbol identifier 1230 may identify, based on at least one of the grant and the transmission direction schedule, one or more symbols of the slot for communication of the packet. The communication interface 1235 may participate in the communication of the packet on the identified one or more symbols of the slot.

The batch decoding component 1240 may identify a first set of decoding candidates for communication of a batch of transmissions that collectively carry a file having a set of packets configured to be processed together. The decoding component 1245 may identify a second set of decoding candidates for communications not pertaining to files, where the first set of decoding candidates and the second set of decoding candidates differ by at least one decoding candidate.

The communication interface 1235 may participate in the communication by monitoring at least one of the first set of decoding candidates or the second set of decoding candidates. The grant receiving interface 1225 may receive at least one grant as a configured grant via a radio resource control message, the configured grant including a configured grant index indicative of a resource configuration for communication, by the UE, of a batch of transmissions that collectively carry a file having a set of packets configured to be processed together.

The communication interface 1235 may participate in the communication based at least in part of on the configured grant. The batch transmission component 1250 may identify that a batch of transmissions has been received from a base station or is scheduled to be transmitted to the base station via a set of resources, the batch collectively including a file having a set of packets configured to be processed together.

The resource identification component 1255 may identify, via a preemption indication, that at least a portion of the set of resources allocated for communication of the batch is preempted. The preemption processing component 1260 may apply the preemption indication to processing or transmission of the batch in accordance with a rule for preemption of batches.

The grant receiving interface 1225 may receive a grant for communication, by the UE, of an uplink transmission that is part of batch of transmissions that collectively carry a file having a set of packets configured to be processed together. The transmission power component 1265 may determine a transmission power for transmitting the uplink transmission based on the grant pertaining to transmission of batches.

The communication interface 1235 may transmit the uplink transmission in accordance with the transmission power and the grant. The grant receiving interface 1225 may receive a grant for communication of a downlink transmission that is part of a batch of transmissions that collectively carry a file having a set of packets configured to be processed together.

The communication interface 1235 may receive the downlink transmission in accordance with the grant, where a reference signal corresponding to a first transmission in the batch is combined with a reference signal corresponding to a second transmission in the batch.

The decoding component 1245 may decode the downlink transmission in accordance with the combined reference signal. The grant receiving interface 1225 may receive a grant for communication, by the UE, of an uplink transmission that is part of a batch of transmissions that collectively carry a file having a set of packets configured to be processed together.

The communication interface 1235 may transmit the uplink transmission while maintaining a phase continuity for at least two transmissions within the batch of transmissions based on receiving the grant for communication of the uplink transmission.

The transmitter 1270 may transmit signals generated by other components of the device 1205. In some examples, the transmitter 1270 may be collocated with a receiver 1210 in a transceiver module. For example, the transmitter 1270 may be an example of aspects of the transceiver 1420 described with reference to FIG. 14. The transmitter 1270 may utilize a single antenna or a set of antennas.

Figure 13:
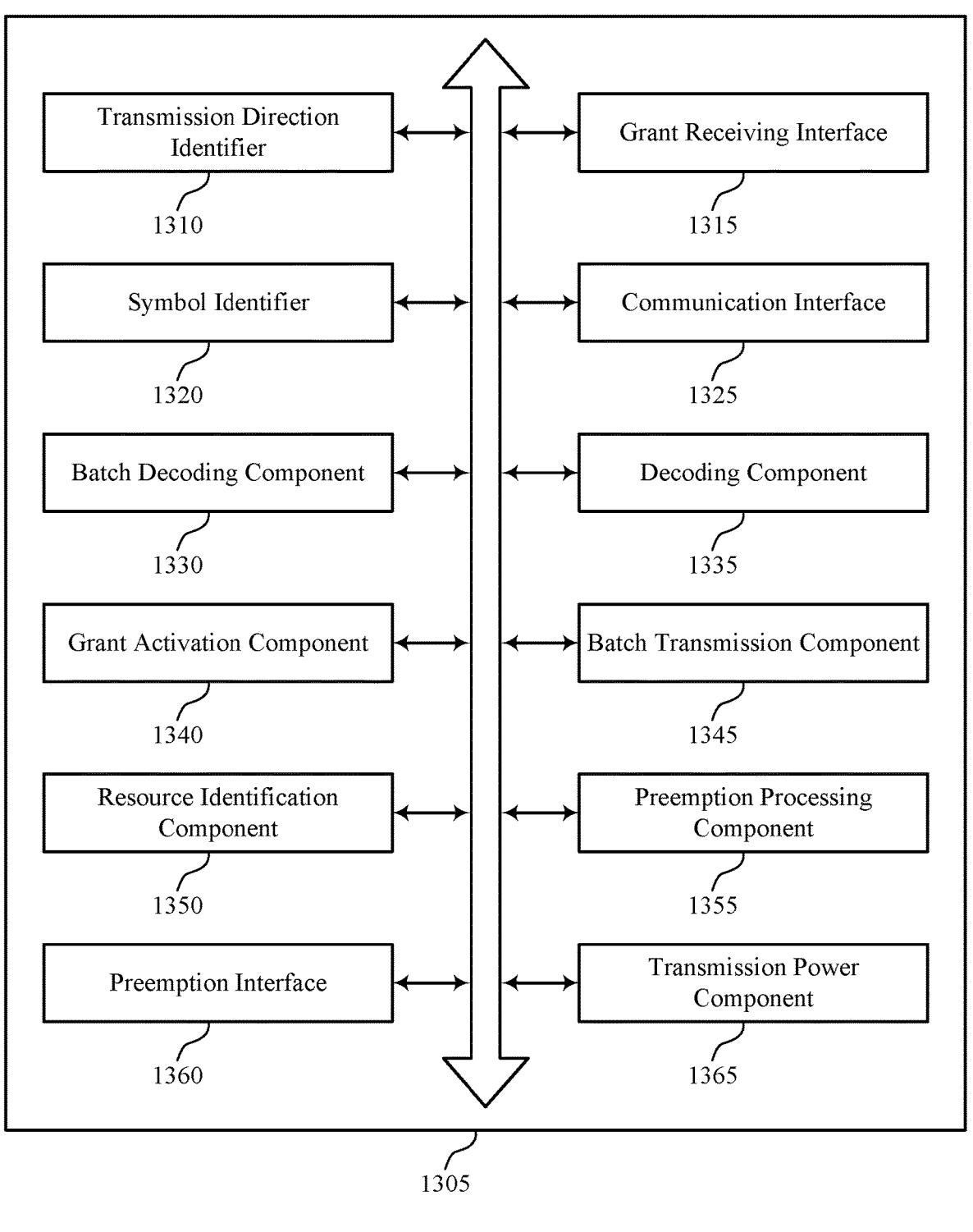
FIG. 13 shows a block diagram of a communications manager that supports transmission batch scheduling and resource management in accordance with aspects of the present disclosure.

FIG. 13 shows a block diagram 1300 of a communications manager 1305 that supports transmission batch scheduling and resource management in accordance with aspects of the present disclosure. The communications manager 1305 may be an example of aspects of a communications manager 1115, a communications manager 1215, or a communications manager 1410 described herein. The communications manager 1305 may include a transmission direction identifier 1310, a grant receiving interface 1315, a symbol identifier 1320, a communication interface 1325, a batch decoding component 1330, a decoding component 1335, a grant activation component 1340, a batch transmission component 1345, a resource identification component 1350, a preemption processing component 1355, a preemption interface 1360, and a transmission power component 1365. Each of these modules may communicate, directly or indirectly, with one another (e.g., via one or more buses).

The transmission direction identifier 1310 may identify a transmission direction schedule for a slot, where the transmission direction schedule identifies one or more symbols of the slot as being uplink, downlink, or flexible. In some examples, the transmission direction identifier 1310 may receive the transmission direction schedule via a cell-specific or UE-specific radio resource control message, where a transmission direction of the one or more symbols, as indicated by the grant, is in accordance with the transmission direction schedule for the one or more symbols.

In some examples, the transmission direction identifier 1310 may receive a group common downlink control information message, where a transmission direction of the flexible symbol is based on the group common downlink control information message. In some examples, the transmission direction identifier 1310 may receive a group common downlink control information message, where a transmission direction of the flexible symbol is based on the group common downlink control information message and where the group common downlink control information message is formatted as a file-specific format.

In some cases, the configured grant is for communication of the file via uplink resources, downlink resources, or sidelink resources. The grant receiving interface 1315 may receive a grant for communication, by the UE, of a packet that is one of a set of packets configured to be processed together as a file.

In some examples, the grant receiving interface 1315 may receive at least one grant as a configured grant via a radio resource control message, the configured grant including a configured grant index indicative of a resource configuration for communication, by the UE, of a batch of transmissions that collectively carry a file having a set of packets configured to be processed together. In some examples, the grant receiving interface 1315 may receive a grant for communication, by the UE, of an uplink transmission that is part of batch of transmissions that collectively carry a file having a set of packets configured to be processed together. In some examples, the grant receiving interface 1315 may receive a grant for communication of a downlink transmission that is part of a batch of transmissions that collectively carry a file having a set of packets configured to be processed together.

In some examples, the grant receiving interface 1315 may receive a grant for communication, by the UE, of an uplink transmission that is part of a batch of transmissions that collectively carry a file having a set of packets configured to be processed together.

In some examples, the grant receiving interface 1315 may receive the grant via a UE-specific downlink control information message, where a transmission direction of the flexible symbol is based on the grant.

In some examples, the grant receiving interface 1315 may receive the grant as a configured grant via a radio resource control message. In some examples, the grant receiving interface 1315 may receive the grant as a configured grant via a radio resource control message, where a transmission direction of the flexible symbol is based on the grant.

In some examples, the grant receiving interface 1315 may receive the configured grant including one or more assignments for the communication of the file using two or more transport blocks. In some cases, the two or more transport blocks are scheduled by the one or more assignments to be transmitted or received in two or more adjacent slots.

The symbol identifier 1320 may identify, based on at least one of the grant and the transmission direction schedule, one or more symbols of the slot for communication of the packet. In some examples, the symbol identifier 1320 may identify that at least one of the one or more symbols is a flexible symbol, as indicated by the transmission direction schedule.

The communication interface 1325 may participate in the communication of the packet on the identified one or more symbols of the slot. In some examples, the communication interface 1325 may participate in the communication by monitoring at least one of the first set of decoding candidates or the second set of decoding candidates.

In some examples, the communication interface 1325 may participate in the communication based at least in part of on the configured grant. In some examples, the communication interface 1325 may transmit the uplink transmission in accordance with the transmission power and the grant.

In some examples, the communication interface 1325 may receive the downlink transmission in accordance with the grant, where a reference signal corresponding to a first transmission in the batch is combined with a reference signal corresponding to a second transmission in the batch.

In some examples, the communication interface 1325 may transmit the uplink transmission while maintaining a phase continuity for at least two transmissions within the batch of transmissions based on receiving the grant for communication of the uplink transmission. In some examples, the communication interface 1325 may process the batch by ignoring the at least one legacy preemption indication.

In some examples, the communication interface 1325 may determine a first DM-RS pattern for a first transmission of the at least two transmissions. In some examples, the communication interface 1325 may determine a second DM-RS pattern for a second transmission of the at least two transmissions based on at least in part of the first DM-RS pattern. In some cases, the phase continuity is maintained based on prohibiting power adjustments within the at least two transmissions.

The batch decoding component 1330 may identify a first set of decoding candidates for communication of a batch of transmissions that collectively carry a file having a set of packets configured to be processed together.

The decoding component 1335 may identify a second set of decoding candidates for communications not pertaining to files, where the first set of decoding candidates and the second set of decoding candidates differ by at least one decoding candidate.

In some examples, the decoding component 1335 may decode the downlink transmission in accordance with the combined reference signal. In some examples, the decoding component 1335 may monitor a cell-specific or a group-specific downlink control channel. In some examples, the decoding component 1335 may monitor for one or more UE-specific grants.

In some cases, the first set of decoding candidates and the second set of decoding candidates differ by at least one decoding candidate based on a set of aggregation levels, a set of decoding candidates for a given aggregation level, or a downlink control information message size. In some cases, the first set of decoding candidates has a higher aggregation level than the second set of decoding candidates.

In some cases, a downlink control information in the first set of decoding candidates includes an indication linking the downlink control information message to a previous downlink message in a previous grant corresponding to the batch of transmissions. In some cases, a precoding and energy per resource element are consistent across each transmission of the set of transmissions of the batch.

The batch transmission component 1345 may identify that a batch of transmissions has been received from a base station or is scheduled to be transmitted to the base station via a set of resources, the batch collectively including a file having a set of packets configured to be processed together. The resource identification component 1350 may identify, via a preemption indication, that at least a portion of the set of resources allocated for communication of the batch is preempted.

The preemption processing component 1355 may apply the preemption indication to processing or transmission of the batch in accordance with a rule for preemption of batches. In some examples, the preemption processing component 1355 may process the batch without processing transmissions received on the portion of the set of resources indicated as preempted, in accordance with the rule for preemption of batches.

In some examples, the preemption processing component 1355 may transmit a first portion of the file using resources of the set of resources that precede the portion of the set of resources indicated as preempted. In some examples, the preemption processing component 1355 may refrain from transmitting a second portion of the file on the portion of the set of resources indicated as preempted, in accordance with the rule for preemption of batches.

In some examples, the preemption processing component 1355 may process the batch by ignoring the preemption indication, in accordance with the rule for preemption of batches. In some examples, the preemption processing component 1355 may transmit the file by ignoring the preemption indication, in accordance with the rule for preemption of batches.

The transmission power component 1365 may determine a transmission power for transmitting the uplink transmission based on the grant pertaining to transmission of batches. In some examples, the transmission power component 1365 may determine an amount of the transmission power based on a size of the file.

In some examples, the transmission power component 1365 may determine an amount of the transmission power based on an indication from a control channel. In some examples, the transmission power component 1365 may determine an amount of the transmission power based on a pre-defined power offset.

The grant activation component 1340 may activate the configured grant based on the file, a buffer size, quality of service requirements, or a combination thereof. In some cases, the activation indicates a number of transport blocks for communication of the batch of transmissions. The preemption interface 1360 may monitor at least one legacy preemption indication.

Figure 14:
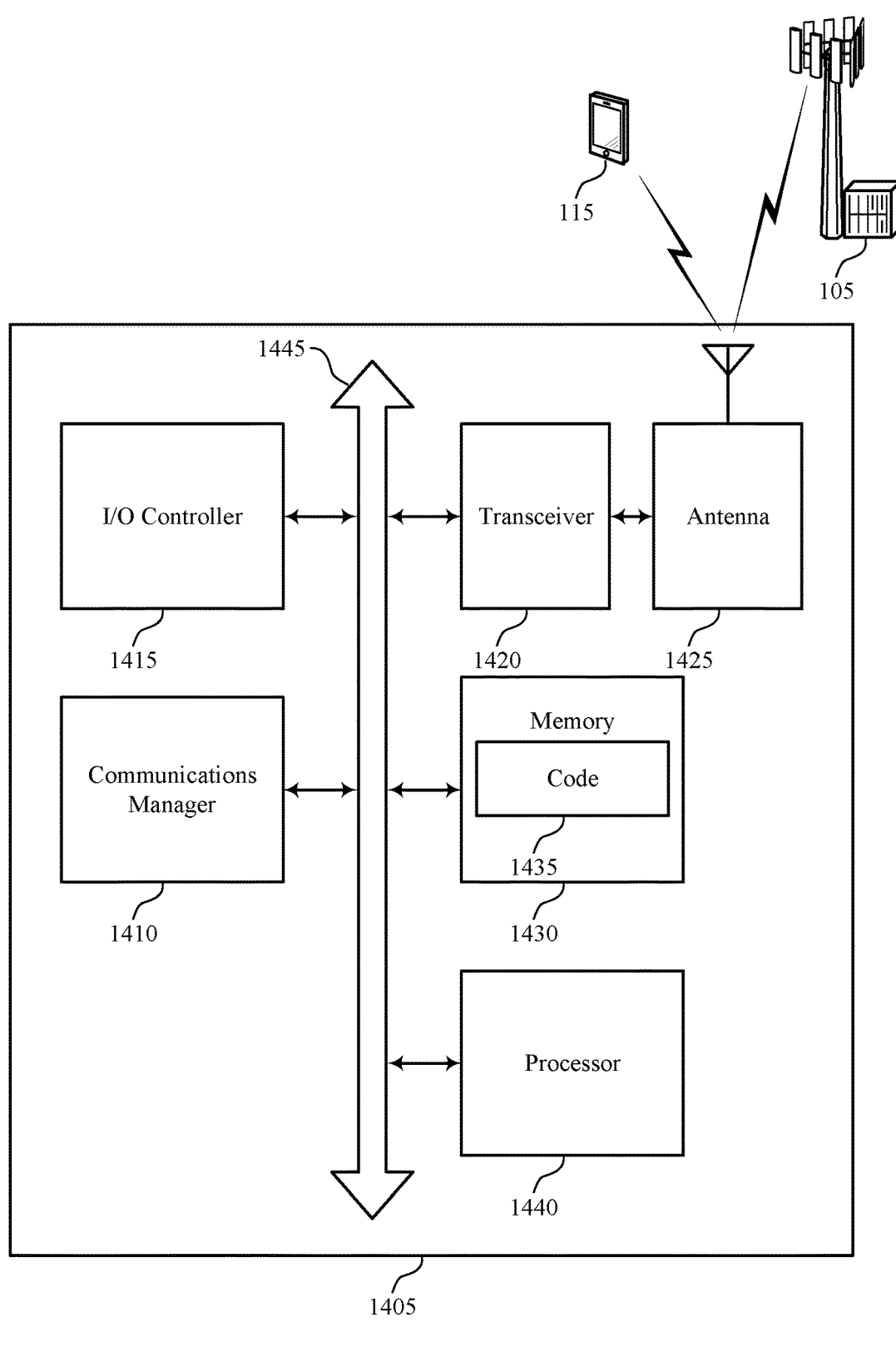
FIG. 14 shows a diagram of a system including a device that supports transmission batch scheduling and resource management in accordance with aspects of the present disclosure.

FIG. 14 shows a diagram of a system 1400 including a device 1405 that supports transmission batch scheduling and resource management in accordance with aspects of the present disclosure. The device 1405 may be an example of or include the components of device 1105, device 1205, or a UE 115 as described herein. The device 1405 may include components for bi-directional voice and data communications including components for transmitting and receiving communications, including a communications manager 1410, an I/O controller 1415, a transceiver 1420, an antenna 1425, memory 1430, and a processor 1440. These components may be in electronic communication via one or more buses (e.g., bus 1445).

The communications manager 1410 may identify a transmission direction schedule for a slot, where the transmission direction schedule identifies one or more symbols of the slot as being uplink, downlink, or flexible, receive a grant for communication, by the UE, of a packet that is one of a set of packets configured to be processed together as a file, identify, based on at least one of the grant and the transmission direction schedule, one or more symbols of the slot for communication of the packet, and participate in the communication of the packet on the identified one or more symbols of the slot. The communications manager 1410 may also identify a first set of decoding candidates for communication of a batch of transmissions that collectively carry a file having a set of packets configured to be processed together, identify a second set of decoding candidates for communications not pertaining to files, where the first set of decoding candidates and the second set of decoding candidates differ by at least one decoding candidate, and participate in the communication by monitoring at least one of the first set of decoding candidates or the second set of decoding candidates. The communications manager 1410 may also receive at least one grant as a configured grant via a radio resource control message, the configured grant including a configured grant index indicative of a resource configuration for communication, by the UE, of a batch of transmissions that collectively carry a file having a set of packets configured to be processed together and participate in the communication based at least in part of on the configured grant. The communications manager 1410 may also identify that a batch of transmissions has been received from a base station or is scheduled to be transmitted to the base station via a set of resources, the batch collectively including a file having a set of packets configured to be processed together, identify, via a preemption indication, that at least a portion of the set of resources allocated for communication of the batch is preempted, and apply the preemption indication to processing or transmission of the batch in accordance with a rule for preemption of batches. The communications manager 1410 may also receive a grant for communication, by the UE, of an uplink transmission that is part of batch of transmissions that collectively carry a file having a set of packets configured to be processed together, determine a transmission power for transmitting the uplink transmission based on the grant pertaining to transmission of batches, and transmit the uplink transmission in accordance with the transmission power and the grant. The communications manager 1410 may also receive a grant for communication of a downlink transmission that is part of a batch of transmissions that collectively carry a file having a set of packets configured to be processed together, receive the downlink transmission in accordance with the grant, where a reference signal corresponding to a first transmission in the batch is combined with a reference signal corresponding to a second transmission in the batch, and decode the downlink transmission in accordance with the combined reference signal. The communications manager 1410 may also receive a grant for communication, by the UE, of an uplink transmission that is part of a batch of transmissions that collectively carry a file having a set of packets configured to be processed together and transmit the uplink transmission while maintaining a phase continuity for at least two transmissions within the batch of transmissions based on receiving the grant for communication of the uplink transmission.

The I/O controller 1415 may manage input and output signals for the device 1405. The I/O controller 1415 may also manage peripherals not integrated into the device 1405. In some cases, the I/O controller 1415 may represent a physical connection or port to an external peripheral. In some cases, the I/O controller 1415 may utilize an operating system such as iOS®, ANDROID®, MS-DOS®, MS-WINDOWS®, OS/2®, UNIX®, LINUX®, or another known operating system. In other cases, the I/O controller 1415 may represent or interact with a modem, a keyboard, a mouse, a touchscreen, or a similar device. In some cases, the I/O controller 1415 may be implemented as part of a processor. In some cases, a user may interact with the device 1405 via the I/O controller 1415 or via hardware components controlled by the I/O controller 1415.

The transceiver 1420 may communicate bi-directionally, via one or more antennas, wired, or wireless links as described above. For example, the transceiver 1420 may represent a wireless transceiver and may communicate bi-directionally with another wireless transceiver. The transceiver 1420 may also include a modem to modulate the packets and provide the modulated packets to the antennas for transmission, and to demodulate packets received from the antennas.

In some cases, the wireless device may include a single antenna 1425. However, in some cases the device may have more than one antenna 1425, which may be capable of concurrently transmitting or receiving multiple wireless transmissions.

The memory 1430 may include RAM and ROM. The memory 1430 may store computer-readable, computer-executable code 1435 including instructions that, when executed, cause the processor to perform various functions described herein. In some cases, the memory 1430 may contain, among other things, a basic input/output system (BIOS) which may control basic hardware or software operation such as the interaction with peripheral components or devices.

The processor 1440 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1440 may be configured to operate a memory array using a memory controller. In other cases, a memory controller may be integrated into the processor 1440. The processor 1440 may be configured to execute computer-readable instructions stored in a memory (e.g., the memory 1430) to cause the device 1405 to perform various functions (e.g., functions or tasks supporting transmission batch scheduling and resource management).

The code 1435 may include instructions to implement aspects of the present disclosure, including instructions to support wireless communications. The code 1435 may be stored in a non-transitory computer-readable medium such as system memory or other type of memory. In some cases, the code 1435 may not be directly executable by the processor 1440 but may cause a computer (e.g., when compiled and executed) to perform functions described herein.

FIG. 15 shows a block diagram 1500 of a device 1505 that supports transmission batch scheduling and resource management in accordance with aspects of the present disclosure. The device 1505 may be an example of aspects of a base station 105 as described herein. The device 1505 may include a receiver 1510, a communications manager 1515, and a transmitter 1520. The device 1505 may also include a processor. Each of these components may be in communication with one another (e.g., via one or more buses).

The receiver 1510 may receive information such as packets, user data, or control information associated with various information channels (e.g., control channels, data channels, and information related to transmission batch scheduling and resource management, etc.). Information may be passed on to other components of the device 1505. The receiver 1510 may be an example of aspects of the transceiver 1820 described with reference to FIG. 18. The receiver 1510 may utilize a single antenna or a set of antennas.

The communications manager 1515 may identify a transmission direction schedule for a slot, where the transmission direction schedule identifies one or more symbols of the slot as being uplink, downlink, or flexible, transmit, to a UE, a grant for communication of a packet that is one of a set of packets configured to be processed together as a file, identify, based on at least one of the grant and the transmission direction schedule, one or more symbols of the slot for communication of the packet, and participate in the communication of the packet on the identified one or more symbols of the slot. The communications manager 1515 may also transmit a first set of decoding candidates for communication of a batch of transmissions that collectively carry a file having a set of packets configured to be processed together, transmit a second set of decoding candidates for communications not pertaining to files, where the first set of decoding candidates and the second set of decoding candidates differ by at least one decoding candidate, and participate in the communication based on at least one of the first set of decoding candidates or the second set of decoding candidates. The communications manager 1515 may also transmit at least one grant as a configured grant via a radio resource control message, the configured grant including a configured grant index indicative of a resource configuration for communication of a batch of transmissions that collectively carry a file having a set of packets and participate in the communication based on the configured grant. The communications manager 1515 may also identify that a batch of transmissions has been transmitted to a UE or is scheduled to be received from the UE via a set of resources, the batch collectively including a file having a set of packets configured to be processed together, identify, via a preemption indication, that at least a portion of the set of resources allocated for communication of the batch is preempted, and apply the preemption indication to processing or transmission of the batch in accordance with a rule for preemption of batches. The communications manager 1515 may also transmit, to a UE a grant for communication of an uplink transmission that is part of batch of transmissions that collectively carry a file having a set of packets configured to be processed together, determine the transmission power for transmitting the uplink transmission based on the grant pertaining to transmission of batches, and transmit the uplink transmission in accordance with the increased power and the grant. The communications manager 1515 may also transmit, to a UE a grant for communication of a downlink transmission that is part of a batch of transmissions that collectively carry a file having a set of packets configured to be processed together and transmit the downlink transmission in accordance with the grant, where a reference signal corresponding to a first transmission in the batch is combined with a reference signal corresponding to a second transmission in the batch. The communications manager 1515 may also transmit, to a UE, a grant for communication of an uplink transmission that is part of a batch of transmissions that collectively carry a file having a set of packets configured to be processed together and receive the uplink transmission while maintaining a phase continuity for at least two transmissions within the batch of transmissions based on receiving the grant for communication of the uplink transmission. The communications manager 1515 may be an example of aspects of the communications manager 1810 described herein.

The communications manager 1515, or its sub-components, may be implemented in hardware, code (e.g., software or firmware) executed by a processor, or any combination thereof. If implemented in code executed by a processor, the functions of the communications manager 1515, or its sub-components may be executed by a general-purpose processor, a DSP, an application-specific integrated circuit (ASIC), an FPGA or other programmable logic device, discrete gate or transistor logic, discrete hardware components, or any combination thereof designed to perform the functions described in the present disclosure.

The communications manager 1515, or its sub-components, may be physically located at various positions, including being distributed such that portions of functions are implemented at different physical locations by one or more physical components. In some examples, the communications manager 1515, or its sub-components, may be a separate and distinct component in accordance with various aspects of the present disclosure. In some examples, the communications manager 1515, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 1520 may transmit signals generated by other components of the device 1505. In some examples, the transmitter 1520 may be collocated with a receiver 1510 in a transceiver module. For example, the transmitter 1520 may be an example of aspects of the transceiver 1820 described with reference to FIG. 18. The transmitter 1520 may utilize a single antenna or a set of antennas.

Figure 16:
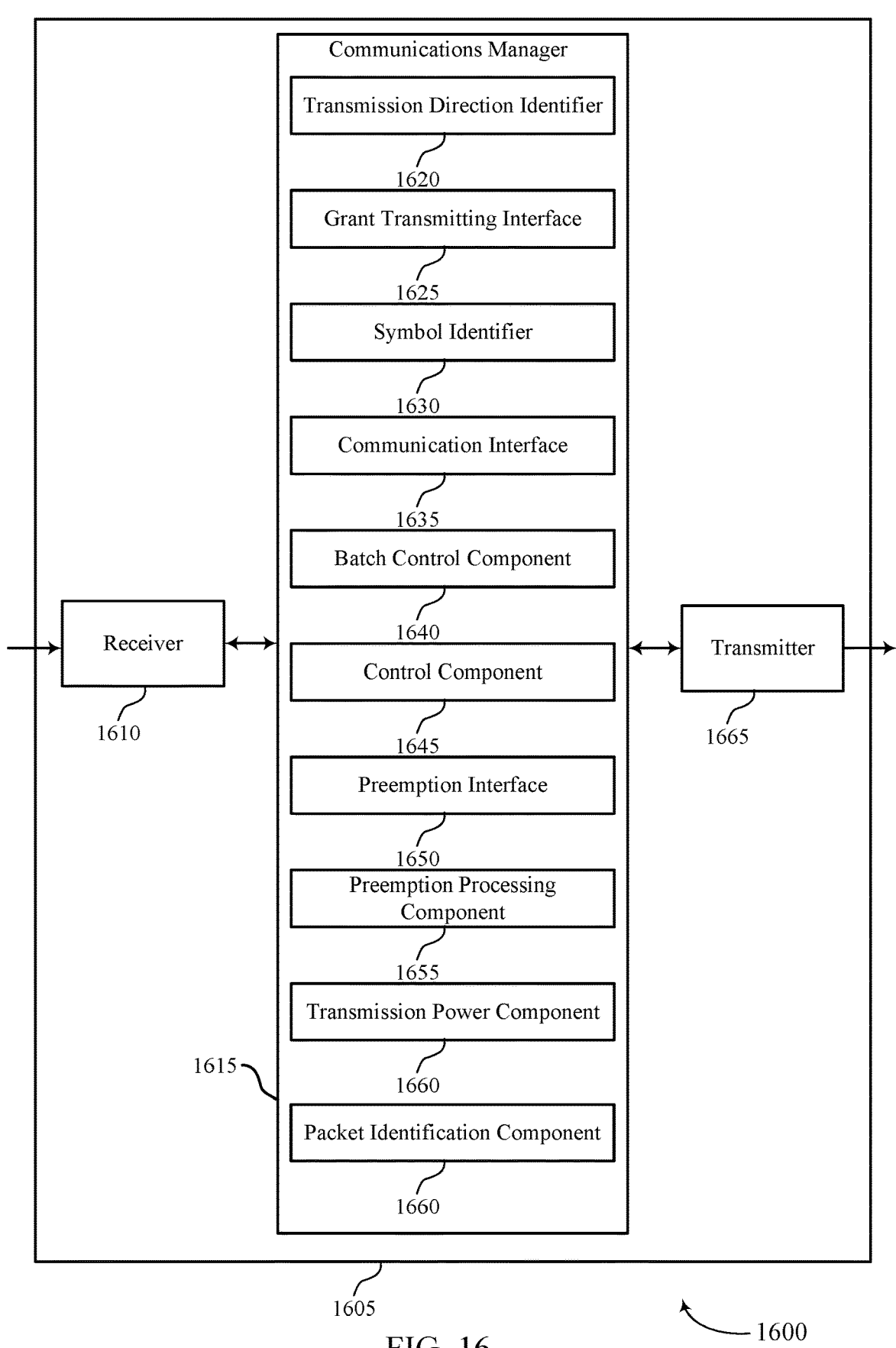

FIG. 16 shows a block diagram 1600 of a device 1605 that supports transmission batch scheduling and resource management in accordance with aspects of the present disclosure. The device 1605 may be an example of aspects of a device 1505, or a base station 105 as described herein. The device 1605 may include a receiver 1610, a communications manager 1615, and a transmitter 1665. The device 1605 may also include a processor. Each of these components may be in communication with one another (e.g., via one or more buses).

The receiver 1610 may receive information such as packets, user data, or control information associated with various information channels (e.g., control channels, data channels, and information related to transmission batch scheduling and resource management, etc.). Information may be passed on to other components of the device 1605. The receiver 1610 may be an example of aspects of the transceiver 1820 described with reference to FIG. 18. The receiver 1610 may utilize a single antenna or a set of antennas.

The communications manager 1615 may be an example of aspects of the communications manager 1515 as described herein. The communications manager 1615 may include a transmission direction identifier 1620, a grant transmitting interface 1625, a symbol identifier 1630, a communication interface 1635, a batch control component 1640, a control component 1645, a preemption interface 1650, a preemption processing component 1655, and a transmission power component 1660. The communications manager 1615 may be an example of aspects of the communications manager 1810 described herein.

The transmission direction identifier 1620 may identify a transmission direction schedule for a slot, where the transmission direction schedule identifies one or more symbols of the slot as being uplink, downlink, or flexible. The grant transmitting interface 1625 may transmit, to a UE, a grant for communication of a packet that is one of a set of packets configured to be processed together as a file.

The symbol identifier 1630 may identify, based on at least one of the grant and the transmission direction schedule, one or more symbols of the slot for communication of the packet. The communication interface 1635 may participate in the communication of the packet on the identified one or more symbols of the slot.

The batch control component 1640 may transmit a first set of decoding candidates for communication of a batch of transmissions that collectively carry a file having a set of packets configured to be processed together. The control component 1645 may transmit a second set of decoding candidates for communications not pertaining to files, where the first set of decoding candidates and the second set of decoding candidates differ by at least one decoding candidate. The communication interface 1635 may participate in the communication based on at least one of the first set of decoding candidates or the second set of decoding candidates.

The batch control component 1640 may transmit at least one grant as a configured grant via a radio resource control message, the configured grant including a configured grant index indicative of a resource configuration for communication of a batch of transmissions that collectively carry a file having a set of packets.

The communication interface 1635 may participate in the communication based on the configured grant. The batch control component 1640 may identify that a batch of transmissions has been transmitted to a UE or is scheduled to be received from the UE via a set of resources, the batch collectively including a file having a set of packets configured to be processed together.

The preemption interface 1650 may identify, via a preemption indication, that at least a portion of the set of resources allocated for communication of the batch is preempted.

The preemption processing component 1655 may apply the preemption indication to processing or transmission of the batch in accordance with a rule for preemption of batches. The grant transmitting interface 1625 may transmit, to a UE a grant for communication of an uplink transmission that is part of batch of transmissions that collectively carry a file having a set of packets configured to be processed together.

The transmission power component 1660 may determine the transmission power for transmitting the uplink transmission based on the grant pertaining to transmission of batches.

The communication interface 1635 may transmit the uplink transmission in accordance with the increased power and the grant.

The grant transmitting interface 1625 may transmit, to a UE a grant for communication of a downlink transmission that is part of a batch of transmissions that collectively carry a file having a set of packets configured to be processed together. The communication interface 1635 may transmit the downlink transmission in accordance with the grant, where a reference signal corresponding to a first transmission in the batch is combined with a reference signal corresponding to a second transmission in the batch.

The grant transmitting interface 1625 may transmit, to a UE, a grant for communication of an uplink transmission that is part of a batch of transmissions that collectively carry a file having a set of packets configured to be processed together. The communication interface 1635 may receive the uplink transmission while maintaining a phase continuity for at least two transmissions within the batch of transmissions based on receiving the grant for communication of the uplink transmission.

The transmitter 1665 may transmit signals generated by other components of the device 1605. In some examples, the transmitter 1665 may be collocated with a receiver 1610 in a transceiver module. For example, the transmitter 1665 may be an example of aspects of the transceiver 1820 described with reference to FIG. 18. The transmitter 1665 may utilize a single antenna or a set of antennas.

Figure 17:
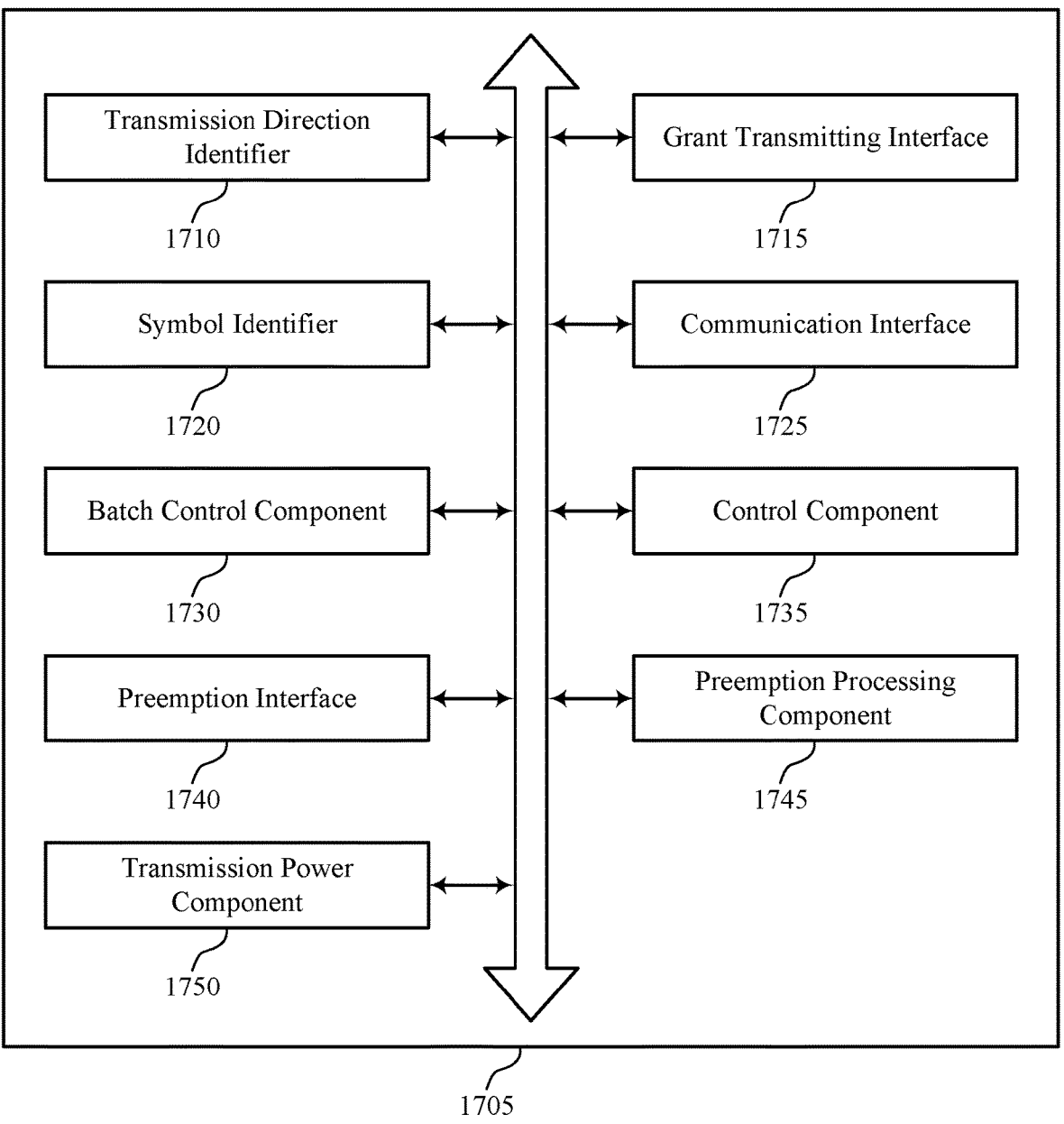
FIG. 17 shows a block diagram of a communications manager that supports transmission batch scheduling and resource management in accordance with aspects of the present disclosure.

FIG. 17 shows a block diagram 1700 of a communications manager 1705 that supports transmission batch scheduling and resource management in accordance with aspects of the present disclosure. The communications manager 1705 may be an example of aspects of a communications manager 1515, a communications manager 1615, or a communications manager 1810 described herein. The communications manager 1705 may include a transmission direction identifier 1710, a grant transmitting interface 1715, a symbol identifier 1720, a communication interface 1725, a batch control component 1730, a control component 1735, a preemption interface 1740, a preemption processing component 1745, and a transmission power component 1750. Each of these modules may communicate, directly or indirectly, with one another (e.g., via one or more buses).

The transmission direction identifier 1710 may identify a transmission direction schedule for a slot, where the transmission direction schedule identifies one or more symbols of the slot as being uplink, downlink, or flexible.

The grant transmitting interface 1715 may transmit, to a UE, a grant for communication of a packet that is one of a set of packets configured to be processed together as a file. In some examples, the grant transmitting interface 1715 may transmit, to a UE a grant for communication of an uplink transmission that is part of batch of transmissions that collectively carry a file having a set of packets configured to be processed together.

In some examples, the grant transmitting interface 1715 may transmit, to a UE a grant for communication of a downlink transmission that is part of a batch of transmissions that collectively carry a file having a set of packets configured to be processed together. In some examples, the grant transmitting interface 1715 may transmit, to a UE, a grant for communication of an uplink transmission that is part of a batch of transmissions that collectively carry a file having a set of packets configured to be processed together.

In some examples, the grant transmitting interface 1715 may transmit, to the UE, a transmission direction schedule via a cell-specific or UE-specific radio resource control message, where a transmission direction of one or more symbols of a slot, as indicated by the grant, is in accordance with the transmission direction schedule for the one or more symbols.

In some examples, the grant transmitting interface 1715 may transmit the grant via a UE-specific downlink control information message, where a transmission direction of a flexible symbol of a slot is based on the grant. In some examples, the grant transmitting interface 1715 may transmit the grant as a configured grant via a radio resource control message.

In some examples, the grant transmitting interface 1715 may transmit a group common downlink control information message, where a transmission direction of a flexible symbol of a slot is based on the group common downlink control information message.

In some examples, the grant transmitting interface 1715 may transmit the grant as a configured grant via a radio resource control message, where a transmission direction of the flexible symbol is based on the grant. In some examples, the grant transmitting interface 1715 may transmit a group common downlink control information message, where a transmission direction of the flexible symbol is based on the group common downlink control information message and where the group common downlink control information message is formatted as a batch-specific format.

The symbol identifier 1720 may identify, based on at least one of the grant and the transmission direction schedule, one or more symbols of the slot for communication of the packet. In some examples, the symbol identifier 1720 may identify that at least one of the one or more symbols is a flexible symbol, as indicated by the transmission direction schedule.

The communication interface 1725 may participate in the communication of the packet on the identified one or more symbols of the slot. In some examples, the communication interface 1725 may participate in the communication based on at least one of the first set of decoding candidates or the second set of decoding candidates.

In some examples, the communication interface 1725 may participate in the communication based on the configured grant. In some examples, the communication interface 1725 may transmit the uplink transmission in accordance with the increased power and the grant.

In some examples, the communication interface 1725 may transmit the downlink transmission in accordance with the grant, where a reference signal corresponding to a first transmission in the batch is combined with a reference signal corresponding to a second transmission in the batch. In some examples, the communication interface 1725 may receive the uplink transmission while maintaining a phase continuity for at least two transmissions within the batch of transmissions based on receiving the grant for communication of the uplink transmission.

In some examples, the communication interface 1725 may determine a first DM-RS pattern for a first transmission of the at least two transmissions. In some examples, the communication interface 1725 may determine a second DM-RS pattern for a second transmission of the at least two transmissions based on at least in part of the first DM-RS pattern.

In some cases, a precoding and energy per resource element are consistent across each transmission of the batch. In some cases, the phase continuity is maintained based on prohibiting power adjustments within the at least two transmissions.

The batch control component 1730 may transmit a first set of decoding candidates for communication of a batch of transmissions that collectively carry a file having a set of packets configured to be processed together. In some examples, the batch control component 1730 may transmit at least one grant as a configured grant via a radio resource control message, the configured grant including a configured grant index indicative of a resource configuration for communication of a batch of transmissions that collectively carry a file having a set of packets.

In some examples, the batch control component 1730 may identify that a batch of transmissions has been transmitted to a UE or is scheduled to be received from the UE via a set of resources, the batch collectively including a file having a set of packets configured to be processed together. In some examples, the batch control component 1730 may transmit the first set of decoding candidates or the second set of decoding candidates in a cell-specific or a group-specific downlink control channel.

In some examples, the batch control component 1730 may transmit one or more UE-specific grants. In some examples, the batch control component 1730 may transmit the configured grant including one or more assignments for the communication of the file using two or more transport blocks.

In some examples, the batch control component 1730 may transmit, to the UE, an indication of an amount of the transmission power via a control channel. In some cases, the two or more transport blocks are scheduled by the grant to be transmitted or received in two or more adjacent slots.

The control component 1735 may transmit a second set of decoding candidates for communications not pertaining to files, where the first set of decoding candidates and the second set of decoding candidates differ by at least one decoding candidate. In some cases, the first set of decoding candidates and the second set of decoding candidates differ by at least one decoding candidate based on a set of aggregation levels, a set of decoding candidates for a given aggregation level, or a downlink control information message size.

In some cases, the first set of decoding candidates has a higher aggregation level than the second set of decoding candidates. In some cases, a downlink control information in the first set of decoding candidates includes an indication linking the downlink control information message to a previous downlink message in a previous grant corresponding to the batch of transmissions.

In some cases, the configured grant is for communication of the file via uplink resources, downlink resources, or sidelink resources.

The preemption interface 1740 may identify, via a preemption indication, that at least a portion of the set of resources allocated for communication of the batch is preempted. In some examples, the preemption interface 1740 may transmit at least one legacy preemption indication. In some examples, the preemption interface 1740 may transmit the preemption indication that is specific to the batch transmissions.

The preemption processing component 1745 may apply the preemption indication to processing or transmission of the batch in accordance with a rule for preemption of batches. In some examples, the preemption processing component 1745 may process the batch without processing transmissions transmitted on the portion of the set of resources indicated as preempted, in accordance with the rule for preemption of batches.

In some examples, the preemption processing component 1745 may receive a first portion of the file using resources of the set of resources that precede the portion of the set of resources indicated as preempted, where the second portion of the file on the portion of the set of resource indicated as preempted are not received in accordance with the rule for preemption of batches.

In some examples, the preemption processing component 1745 may process the batch by ignoring the preemption indication, in accordance with the rule for preemption of batches. In some examples, the preemption processing component 1745 may receive the batch in accordance with the rule for preemption of batches.

The transmission power component 1750 may determine the transmission power for transmitting the uplink transmission based on the grant pertaining to transmission of batches. In some examples, the transmission power component 1750 may determine an amount of the transmission power based on a size of the file.

Figure 18:
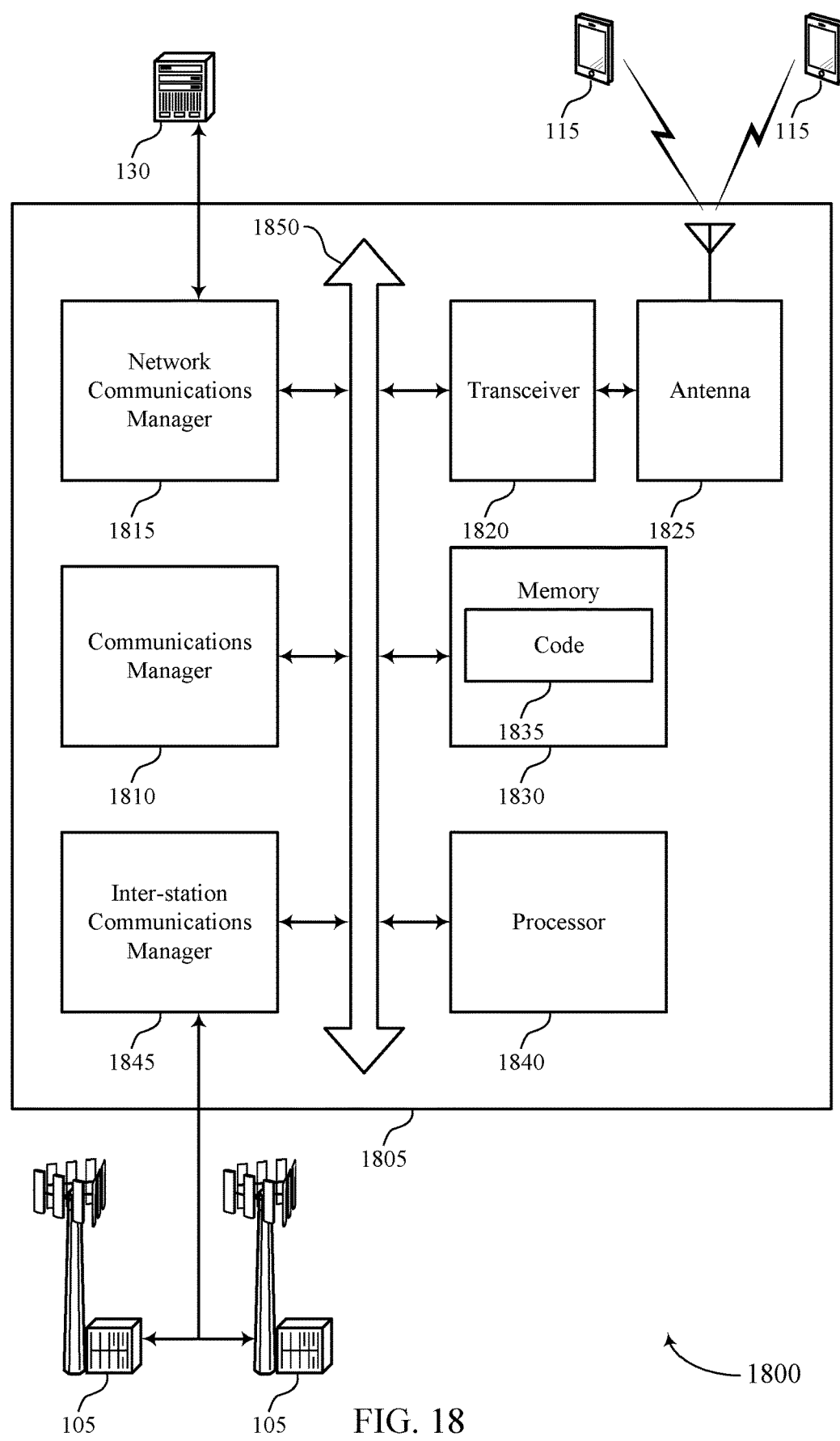
FIG. 18 shows a diagram of a system including a device that supports transmission batch scheduling and resource management in accordance with aspects of the present disclosure.

FIG. 18 shows a diagram of a system 1800 including a device 1805 that supports transmission batch scheduling and resource management in accordance with aspects of the present disclosure. The device 1805 may be an example of or include the components of device 1505, device 1605, or a base station 105 as described herein. The device 1805 may include components for bi-directional voice and data communications including components for transmitting and receiving communications, including a communications manager 1810, a network communications manager 1815, a transceiver 1820, an antenna 1825, memory 1830, a processor 1840, and an inter-station communications manager 1845. These components may be in electronic communication via one or more buses (e.g., bus 1850).

The communications manager 1810 may identify a transmission direction schedule for a slot, where the transmission direction schedule identifies one or more symbols of the slot as being uplink, downlink, or flexible, transmit, to a UE, a grant for communication of a packet that is one of a set of packets configured to be processed together as a file, identify, based on at least one of the grant and the transmission direction schedule, one or more symbols of the slot for communication of the packet, and participate in the communication of the packet on the identified one or more symbols of the slot. The communications manager 1810 may also transmit a first set of decoding candidates for communication of a batch of transmissions that collectively carry a file having a set of packets configured to be processed together, transmit a second set of decoding candidates for communications not pertaining to files, where the first set of decoding candidates and the second set of decoding candidates differ by at least one decoding candidate, and participate in the communication based on at least one of the first set of decoding candidates or the second set of decoding candidates. The communications manager 1810 may also transmit at least one grant as a configured grant via a radio resource control message, the configured grant including a configured grant index indicative of a resource configuration for communication of a batch of transmissions that collectively carry a file having a set of packets and participate in the communication based on the configured grant. The communications manager 1810 may also identify that a batch of transmissions has been transmitted to a UE or is scheduled to be received from the UE via a set of resources, the batch collectively including a file having a set of packets configured to be processed together, identify, via a preemption indication, that at least a portion of the set of resources allocated for communication of the batch is preempted, and apply the preemption indication to processing or transmission of the batch in accordance with a rule for preemption of batches. The communications manager 1810 may also transmit, to a UE a grant for communication of an uplink transmission that is part of batch of transmissions that collectively carry a file having a set of packets configured to be processed together, determine the transmission power for transmitting the uplink transmission based on the grant pertaining to transmission of batches, and transmit the uplink transmission in accordance with the increased power and the grant. The communications manager 1810 may also transmit, to a UE a grant for communication of a downlink transmission that is part of a batch of transmissions that collectively carry a file having a set of packets configured to be processed together and transmit the downlink transmission in accordance with the grant, where a reference signal corresponding to a first transmission in the batch is combined with a reference signal corresponding to a second transmission in the batch. The communications manager 1810 may also transmit, to a UE, a grant for communication of an uplink transmission that is part of a batch of transmissions that collectively carry a file having a set of packets configured to be processed together and receive the uplink transmission while maintaining a phase continuity for at least two transmissions within the batch of transmissions based on receiving the grant for communication of the uplink transmission.

The network communications manager 1815 may manage communications with the core network (e.g., via one or more wired backhaul links). For example, the network communications manager 1815 may manage the transfer of data communications for client devices, such as one or more UEs 115.

The transceiver 1820 may communicate bi-directionally, via one or more antennas, wired, or wireless links as described above. For example, the transceiver 1820 may represent a wireless transceiver and may communicate bi-directionally with another wireless transceiver. The transceiver 1820 may also include a modem to modulate the packets and provide the modulated packets to the antennas for transmission, and to demodulate packets received from the antennas.

In some cases, the wireless device may include a single antenna 1825. However, in some cases the device may have more than one antenna 1825, which may be capable of concurrently transmitting or receiving multiple wireless transmissions.

The memory 1830 may include RAM, ROM, or a combination thereof. The memory 1830 may store computer-readable code 1835 including instructions that, when executed by a processor (e.g., the processor 1840) cause the device to perform various functions described herein. In some cases, the memory 1830 may contain, among other things, a BIOS which may control basic hardware or software operation such as the interaction with peripheral components or devices.

The processor 1840 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1840 may be configured to operate a memory array using a memory controller. In some cases, a memory controller may be integrated into processor 1840. The processor 1840 may be configured to execute computer-readable instructions stored in a memory (e.g., the memory 1830) to cause the device 1805 to perform various functions (e.g., functions or tasks supporting transmission batch scheduling and resource management).

The inter-station communications manager 1845 may manage communications with other base station 105, and may include a controller or scheduler for controlling communications with UEs 115 in cooperation with other base stations 105. For example, the inter-station communications manager 1845 may coordinate scheduling for transmissions to UEs 115 for various interference mitigation techniques such as beamforming or joint transmission. In some examples, the inter-station communications manager 1845 may provide an X2 interface within an LTE/LTE-A wireless communication network technology to provide communication between base stations 105.

The code 1835 may include instructions to implement aspects of the present disclosure, including instructions to support wireless communications. The code 1835 may be stored in a non-transitory computer-readable medium such as system memory or other type of memory. In some cases, the code 1835 may not be directly executable by the processor 1840 but may cause a computer (e.g., when compiled and executed) to perform functions described herein.

FIG. 19 shows a flowchart illustrating a method 1900 that supports transmission batch scheduling and resource management in accordance with aspects of the present disclosure. The operations of method 1900 may be implemented by a UE 115 or its components as described herein. For example, the operations of method 1900 may be performed by a communications manager as described with reference to FIGS. 11 through 14. In some examples, a UE may execute a set of instructions to control the functional elements of the UE to perform the functions described below. Additionally or alternatively, a UE may perform aspects of the functions described below using special-purpose hardware.

At 1905, the UE may identify a transmission direction schedule for a slot, where the transmission direction schedule identifies one or more symbols of the slot as being uplink, downlink, or flexible. The operations of 1905 may be performed according to the methods described herein. In some examples, aspects of the operations of 1905 may be performed by a transmission direction identifier as described with reference to FIGS. 11 through 14.

At 1910, the UE may receive a grant for communication, by the UE, of a packet that is one of a set of packets configured to be processed together as a file. The operations of 1910 may be performed according to the methods described herein. In some examples, aspects of the operations of 1910 may be performed by a grant receiving interface as described with reference to FIGS. 11 through 14.

At 1915, the UE may identify, based on at least one of the grant and the transmission direction schedule, one or more symbols of the slot for communication of the packet. The operations of 1915 may be performed according to the methods described herein. In some examples, aspects of the operations of 1915 may be performed by a symbol identifier as described with reference to FIGS. 11 through 14.

At 1920, the UE may participate in the communication of the packet on the identified one or more symbols of the slot. The operations of 1920 may be performed according to the methods described herein. In some examples, aspects of the operations of 1920 may be performed by a communication interface as described with reference to FIGS. 11 through 14.

FIG. 20 shows a flowchart illustrating a method 2000 that supports transmission batch scheduling and resource management in accordance with aspects of the present disclosure. The operations of method 2000 may be implemented by a UE 115 or its components as described herein. For example, the operations of method 2000 may be performed by a communications manager as described with reference to FIGS. 11 through 14. In some examples, a UE may execute a set of instructions to control the functional elements of the UE to perform the functions described below. Additionally or alternatively, a UE may perform aspects of the functions described below using special-purpose hardware.

At 2005, the UE may identify a first set of decoding candidates for communication of a batch of transmissions that collectively carry a file having a set of packets configured to be processed together. The operations of 2005 may be performed according to the methods described herein. In some examples, aspects of the operations of 2005 may be performed by a batch decoding component as described with reference to FIGS. 11 through 14.

At 2010, the UE may identify a second set of decoding candidates for communications not pertaining to files, where the first set of decoding candidates and the second set of decoding candidates differ by at least one decoding candidate. The operations of 2010 may be performed according to the methods described herein. In some examples, aspects of the operations of 2010 may be performed by a decoding component as described with reference to FIGS. 11 through 14.

At 2015, the UE may participate in the communication by monitoring at least one of the first set of decoding candidates or the second set of decoding candidates. The operations of 2015 may be performed according to the methods described herein. In some examples, aspects of the operations of 2015 may be performed by a communication interface as described with reference to FIGS. 11 through 14.

FIG. 21 shows a flowchart illustrating a method 2100 that supports transmission batch scheduling and resource management in accordance with aspects of the present disclosure. The operations of method 2100 may be implemented by a UE 115 or its components as described herein. For example, the operations of method 2100 may be performed by a communications manager as described with reference to FIGS. 11 through 14. In some examples, a UE may execute a set of instructions to control the functional elements of the UE to perform the functions described below. Additionally or alternatively, a UE may perform aspects of the functions described below using special-purpose hardware.

At 2105, the UE may receive at least one grant as a configured grant via a radio resource control message, the configured grant including a configured grant index indicative of a resource configuration for communication, by the UE, of a batch of transmissions that collectively carry a file having a set of packets configured to be processed together. The operations of 2105 may be performed according to the methods described herein. In some examples, aspects of the operations of 2105 may be performed by a grant receiving interface as described with reference to FIGS. 11 through 14.

At 2110, the UE may participate in the communication based at least in part of on the configured grant. The operations of 2110 may be performed according to the methods described herein. In some examples, aspects of the operations of 2110 may be performed by a communication interface as described with reference to FIGS. 11 through 14.

FIG. 22 shows a flowchart illustrating a method 2200 that supports transmission batch scheduling and resource management in accordance with aspects of the present disclosure. The operations of method 2200 may be implemented by a UE 115 or its components as described herein. For example, the operations of method 2200 may be performed by a communications manager as described with reference to FIGS. 11 through 14. In some examples, a UE may execute a set of instructions to control the functional elements of the UE to perform the functions described below. Additionally or alternatively, a UE may perform aspects of the functions described below using special-purpose hardware.

At 2205, the UE may identify that a batch of transmissions has been received from a base station or is scheduled to be transmitted to the base station via a set of resources, the batch collectively including a file having a set of packets configured to be processed together. The operations of 2205 may be performed according to the methods described herein. In some examples, aspects of the operations of 2205 may be performed by a batch transmission component as described with reference to FIGS. 11 through 14.

At 2210, the UE may identify, via a preemption indication, that at least a portion of the set of resources allocated for communication of the batch is preempted. The operations of 2210 may be performed according to the methods described herein. In some examples, aspects of the operations of 2210 may be performed by a resource identification component as described with reference to FIGS. 11 through 14.

At 2215, the UE may apply the preemption indication to processing or transmission of the batch in accordance with a rule for preemption of batches. The operations of 2215 may be performed according to the methods described herein. In some examples, aspects of the operations of 2215 may be performed by a preemption processing component as described with reference to FIGS. 11 through 14.

FIG. 23 shows a flowchart illustrating a method 2300 that supports transmission batch scheduling and resource management in accordance with aspects of the present disclosure. The operations of method 2300 may be implemented by a UE 115 or its components as described herein. For example, the operations of method 2300 may be performed by a communications manager as described with reference to FIGS. 11 through 14. In some examples, a UE may execute a set of instructions to control the functional elements of the UE to perform the functions described below. Additionally or alternatively, a UE may perform aspects of the functions described below using special-purpose hardware.

At 2305, the UE may receive a grant for communication, by the UE, of an uplink transmission that is part of batch of transmissions that collectively carry a file having a set of packets configured to be processed together. The operations of 2305 may be performed according to the methods described herein. In some examples, aspects of the operations of 2305 may be performed by a grant receiving interface as described with reference to FIGS. 11 through 14.

At 2310, the UE may determine a transmission power for transmitting the uplink transmission based on the grant pertaining to transmission of batches. The operations of 2310 may be performed according to the methods described herein. In some examples, aspects of the operations of 2310 may be performed by a transmission power component as described with reference to FIGS. 11 through 14.

At 2315, the UE may transmit the uplink transmission in accordance with the transmission power and the grant. The operations of 2315 may be performed according to the methods described herein. In some examples, aspects of the operations of 2315 may be performed by a communication interface as described with reference to FIGS. 11 through 14.

FIG. 24 shows a flowchart illustrating a method 2400 that supports transmission batch scheduling and resource management in accordance with aspects of the present disclosure. The operations of method 2400 may be implemented by a UE 115 or its components as described herein. For example, the operations of method 2400 may be performed by a communications manager as described with reference to FIGS. 11 through 14. In some examples, a UE may execute a set of instructions to control the functional elements of the UE to perform the functions described below. Additionally or alternatively, a UE may perform aspects of the functions described below using special-purpose hardware.

At 2405, the UE may receive a grant for communication of a downlink transmission that is part of a batch of transmissions that collectively carry a file having a set of packets configured to be processed together. The operations of 2405 may be performed according to the methods described herein. In some examples, aspects of the operations of 2405 may be performed by a grant receiving interface as described with reference to FIGS. 11 through 14.

At 2410, the UE may receive the downlink transmission in accordance with the grant, where a reference signal corresponding to a first transmission in the batch is combined with a reference signal corresponding to a second transmission in the batch. The operations of 2410 may be performed according to the methods described herein. In some examples, aspects of the operations of 2410 may be performed by a communication interface as described with reference to FIGS. 11 through 14.

At 2415, the UE may decode the downlink transmission in accordance with the combined reference signal. The operations of 2415 may be performed according to the methods described herein. In some examples, aspects of the operations of 2415 may be performed by a decoding component as described with reference to FIGS. 11 through 14.

FIG. 25 shows a flowchart illustrating a method 2500 that supports transmission batch scheduling and resource management in accordance with aspects of the present disclosure. The operations of method 2500 may be implemented by a UE 115 or its components as described herein. For example, the operations of method 2500 may be performed by a communications manager as described with reference to FIGS. 11 through 14. In some examples, a UE may execute a set of instructions to control the functional elements of the UE to perform the functions described below. Additionally or alternatively, a UE may perform aspects of the functions described below using special-purpose hardware.

At 2505, the UE may receive a grant for communication, by the UE, of an uplink transmission that is part of a batch of transmissions that collectively carry a file having a set of packets configured to be processed together. The operations of 2505 may be performed according to the methods described herein. In some examples, aspects of the operations of 2505 may be performed by a grant receiving interface as described with reference to FIGS. 11 through 14.

At 2510, the UE may transmit the uplink transmission while maintaining a phase continuity for at least two transmissions within the batch of transmissions based on receiving the grant for communication of the uplink transmission. The operations of 2510 may be performed according to the methods described herein. In some examples, aspects of the operations of 2510 may be performed by a communication interface as described with reference to FIGS. 11 through 14.

Figure 26:
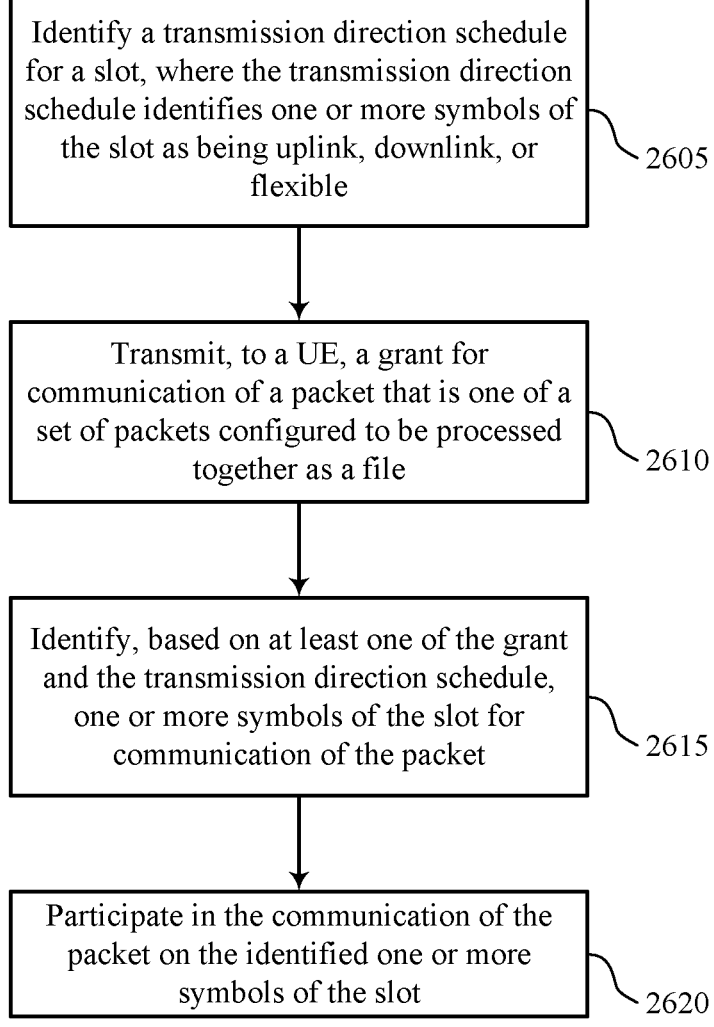

FIG. 26 shows a flowchart illustrating a method 2600 that supports transmission batch scheduling and resource management in accordance with aspects of the present disclosure. The operations of method 2600 may be implemented by a base station 105 or its components as described herein. For example, the operations of method 2600 may be performed by a communications manager as described with reference to FIGS. 15 through 18. In some examples, a base station may execute a set of instructions to control the functional elements of the base station to perform the functions described below. Additionally or alternatively, a base station may perform aspects of the functions described below using special-purpose hardware.

At 2605, the base station may identify a transmission direction schedule for a slot, where the transmission direction schedule identifies one or more symbols of the slot as being uplink, downlink, or flexible. The operations of 2605 may be performed according to the methods described herein. In some examples, aspects of the operations of 2605 may be performed by a transmission direction identifier as described with reference to FIGS. 15 through 18.

At 2610, the base station may transmit, to a UE, a grant for communication of a packet that is one of a set of packets configured to be processed together as a file. The operations of 2610 may be performed according to the methods described herein. In some examples, aspects of the operations of 2610 may be performed by a grant transmitting interface as described with reference to FIGS. 15 through 18.

At 2615, the base station may identify, based on at least one of the grant and the transmission direction schedule, one or more symbols of the slot for communication of the packet. The operations of 2615 may be performed according to the methods described herein. In some examples, aspects of the operations of 2615 may be performed by a symbol identifier as described with reference to FIGS. 15 through 18.

At 2620, the base station may participate in the communication of the packet on the identified one or more symbols of the slot. The operations of 2620 may be performed according to the methods described herein. In some examples, aspects of the operations of 2620 may be performed by a communication interface as described with reference to FIGS. 15 through 18.

FIG. 27 shows a flowchart illustrating a method 2700 that supports transmission batch scheduling and resource management in accordance with aspects of the present disclosure. The operations of method 2700 may be implemented by a base station 105 or its components as described herein. For example, the operations of method 2700 may be performed by a communications manager as described with reference to FIGS. 15 through 18. In some examples, a base station may execute a set of instructions to control the functional elements of the base station to perform the functions described below. Additionally or alternatively, a base station may perform aspects of the functions described below using special-purpose hardware.

At 2705, the base station may transmit a first set of decoding candidates for communication of a batch of transmissions that collectively carry a file having a set of packets configured to be processed together. The operations of 2705 may be performed according to the methods described herein. In some examples, aspects of the operations of 2705 may be performed by a batch control component as described with reference to FIGS. 15 through 18.

At 2710, the base station may transmit a second set of decoding candidates for communications not pertaining to files, where the first set of decoding candidates and the second set of decoding candidates differ by at least one decoding candidate. The operations of 2710 may be performed according to the methods described herein. In some examples, aspects of the operations of 2710 may be performed by a control component as described with reference to FIGS. 15 through 18.

At 2715, the base station may participate in the communication based on at least one of the first set of decoding candidates or the second set of decoding candidates. The operations of 2715 may be performed according to the methods described herein. In some examples, aspects of the operations of 2715 may be performed by a communication interface as described with reference to FIGS. 15 through 18.

FIG. 28 shows a flowchart illustrating a method 2800 that supports transmission batch scheduling and resource management in accordance with aspects of the present disclosure. The operations of method 2800 may be implemented by a base station 105 or its components as described herein. For example, the operations of method 2800 may be performed by a communications manager as described with reference to FIGS. 15 through 18. In some examples, a base station may execute a set of instructions to control the functional elements of the base station to perform the functions described below. Additionally or alternatively, a base station may perform aspects of the functions described below using special-purpose hardware.

At 2805, the base station may transmit at least one grant as a configured grant via a radio resource control message, the configured grant including a configured grant index indicative of a resource configuration for communication of a batch of transmissions that collectively carry a file having a set of packets. The operations of 2805 may be performed according to the methods described herein. In some examples, aspects of the operations of 2805 may be performed by a batch control component as described with reference to FIGS. 15 through 18.

At 2810, the base station may participate in the communication based on the configured grant. The operations of 2810 may be performed according to the methods described herein. In some examples, aspects of the operations of 2810 may be performed by a communication interface as described with reference to FIGS. 15 through 18.

FIG. 29 shows a flowchart illustrating a method 2900 that supports transmission batch scheduling and resource management in accordance with aspects of the present disclosure. The operations of method 2900 may be implemented by a base station 105 or its components as described herein. For example, the operations of method 2900 may be performed by a communications manager as described with reference to FIGS. 15 through 18. In some examples, a base station may execute a set of instructions to control the functional elements of the base station to perform the functions described below. Additionally or alternatively, a base station may perform aspects of the functions described below using special-purpose hardware.

At 2905, the base station may identify that a batch of transmissions has been transmitted to a UE or is scheduled to be received from the UE via a set of resources, the batch collectively including a file having a set of packets configured to be processed together. The operations of 2905 may be performed according to the methods described herein. In some examples, aspects of the operations of 2905 may be performed by a batch control component as described with reference to FIGS. 15 through 18.

At 2910, the base station may identify, via a preemption indication, that at least a portion of the set of resources allocated for communication of the batch is preempted. The operations of 2910 may be performed according to the methods described herein. In some examples, aspects of the operations of 2910 may be performed by a preemption interface as described with reference to FIGS. 15 through 18.

At 2915, the base station may apply the preemption indication to processing or transmission of the batch in accordance with a rule for preemption of batches. The operations of 2915 may be performed according to the methods described herein. In some examples, aspects of the operations of 2915 may be performed by a preemption processing component as described with reference to FIGS. 15 through 18.

FIG. 30 shows a flowchart illustrating a method 3000 that supports transmission batch scheduling and resource management in accordance with aspects of the present disclosure. The operations of method 3000 may be implemented by a base station 105 or its components as described herein. For example, the operations of method 3000 may be performed by a communications manager as described with reference to FIGS. 15 through 18. In some examples, a base station may execute a set of instructions to control the functional elements of the base station to perform the functions described below. Additionally or alternatively, a base station may perform aspects of the functions described below using special-purpose hardware.

At 3005, the base station may transmit, to a UE a grant for communication of an uplink transmission that is part of batch of transmissions that collectively carry a file having a set of packets configured to be processed together. The operations of 3005 may be performed according to the methods described herein. In some examples, aspects of the operations of 3005 may be performed by a grant transmitting interface as described with reference to FIGS. 15 through 18.

At 3010, the base station may determine the transmission power for transmitting the uplink transmission based on the grant pertaining to transmission of batches. The operations of 3010 may be performed according to the methods described herein. In some examples, aspects of the operations of 3010 may be performed by a transmission power component as described with reference to FIGS. 15 through 18.

At 3015, the base station may transmit the uplink transmission in accordance with the increased power and the grant. The operations of 3015 may be performed according to the methods described herein. In some examples, aspects of the operations of 3015 may be performed by a communication interface as described with reference to FIGS. 15 through 18.

FIG. 31 shows a flowchart illustrating a method 3100 that supports transmission batch scheduling and resource management in accordance with aspects of the present disclosure. The operations of method 3100 may be implemented by a base station 105 or its components as described herein. For example, the operations of method 3100 may be performed by a communications manager as described with reference to FIGS. 15 through 18. In some examples, a base station may execute a set of instructions to control the functional elements of the base station to perform the functions described below. Additionally or alternatively, a base station may perform aspects of the functions described below using special-purpose hardware.

At 3105, the base station may transmit, to a UE a grant for communication of a downlink transmission that is part of a batch of transmissions that collectively carry a file having a set of packets configured to be processed together. The operations of 3105 may be performed according to the methods described herein. In some examples, aspects of the operations of 3105 may be performed by a grant transmitting interface as described with reference to FIGS. 15 through 18.

At 3110, the base station may transmit the downlink transmission in accordance with the grant, where a reference signal corresponding to a first transmission in the batch is combined with a reference signal corresponding to a second transmission in the batch. The operations of 3110 may be performed according to the methods described herein. In some examples, aspects of the operations of 3110 may be performed by a communication interface as described with reference to FIGS. 15 through 18.

FIG. 32 shows a flowchart illustrating a method 3200 that supports transmission batch scheduling and resource management in accordance with aspects of the present disclosure. The operations of method 3200 may be implemented by a base station 105 or its components as described herein. For example, the operations of method 3200 may be performed by a communications manager as described with reference to FIGS. 15 through 18. In some examples, a base station may execute a set of instructions to control the functional elements of the base station to perform the functions described below. Additionally or alternatively, a base station may perform aspects of the functions described below using special-purpose hardware.

At 3205, the base station may transmit, to a UE, a grant for communication of an uplink transmission that is part of a batch of transmissions that collectively carry a file having a set of packets configured to be processed together. The operations of 3205 may be performed according to the methods described herein. In some examples, aspects of the operations of 3205 may be performed by a grant transmitting interface as described with reference to FIGS. 15 through 18.

At 3210, the base station may receive the uplink transmission while maintaining a phase continuity for at least two transmissions within the batch of transmissions based on receiving the grant for communication of the uplink transmission. The operations of 3210 may be performed according to the methods described herein. In some examples, aspects of the operations of 3210 may be performed by a communication interface as described with reference to FIGS. 15 through 18.

Figure 33:
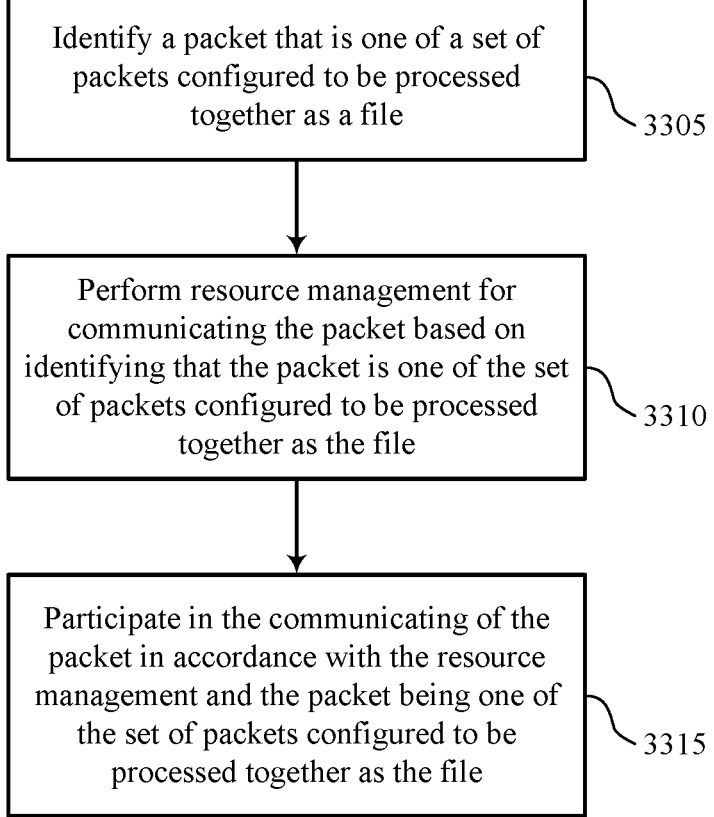

FIG. 33 shows a flowchart illustrating a method 3300 that supports transmission batch scheduling and resource management in accordance with aspects of the present disclosure. The operations of method 3300 may be implemented by a UE 115 or its components as described herein. For example, the operations of method 3300 may be performed by a communications manager as described with reference to FIGS. 11 through 14. In some examples, a UE may execute a set of instructions to control the functional elements of the UE to perform the functions described below. Additionally or alternatively, a UE may perform aspects of the functions described below using special-purpose hardware.

At 3305, the UE may identify a packet that is one of a set of packets configured to be processed together as a file. The operations of 3305 may be performed according to the methods described herein. In some examples, the operations of 3305 may be performed by a packet identification component 1280 as described with reference to FIGS. 11 through 14.

At 3310, the UE may perform resource management for communicating the packet based on identifying that the packet is one of the set of packets configured to be processed together as the file. The operations of 3310 may be performed according to the methods described herein. In some examples, the operations of 3310 may be performed by a resource management component 1285 as described with reference to FIGS. 11 through 14.

At 3315, the UE may participate in the communicating of the packet in accordance with the resource management and the packet being one of the set of packets configured to be processed together as the file. The operations of 3315 may be performed according to the methods described herein. In some examples, the operations of 3315 may be performed by a communication interface 1235 as described with reference to FIGS. 11 through 14.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special purpose computer. By way of example, and not limitation, non-transitory computer-readable media may include random-access memory (RAM), read-only memory (ROM), electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on." As used herein, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communications at a user equipment (UE), comprising:

monitoring, via a first set of decoding candidates, for a first downlink control information (DCI) message that indicates first resources for communication of a batch of transmissions that collectively carry a file having a plurality of packets configured to be processed together;

monitoring, via a second set of decoding candidates, for a second DCI message that indicates second resources for communications not pertaining to files, wherein the first set of decoding candidates and the second set of decoding candidates differ by at least one decoding candidate;

monitoring, via the first set of decoding candidates, for a third DCI message that indicates third resources for communication of the batch of transmissions;

receiving the third DCI message based at least in part on monitoring for the third DCI message via the first set of decoding candidates, wherein the third DCI message includes an indication linking the third DCI message to the first DCI message corresponding to the first resources for communicating the batch of transmissions; and participating in communications of the batch of transmissions based at least in part on receiving the first DCI message.

2. The method of claim 1, wherein monitoring for the first DCI message and the third DCI message via the first set of decoding candidates and monitoring for the second DCI message via the second set of decoding candidates further comprises:

monitoring a cell-specific or a group-specific downlink control channel.

3. The method of claim 1, wherein monitoring for the first DCI message and the third DCI message via the first set of decoding candidates and monitoring for the second DCI message via the second set of decoding candidates further comprises:

monitoring for one or more UE-specific grants.

4. The method of claim 1, wherein the first set of decoding candidates and the second set of decoding candidates differ by the at least one decoding candidate based at least in part on a set of aggregation levels, a set of decoding candidates for a given aggregation level, or a downlink control information message size.

5. The method of claim 1, wherein the first set of decoding candidates has a higher aggregation level then the second set of decoding candidates.

6. The method of claim 1, wherein the first set of decoding candidates is associated with receipt of DCIs pertaining to scheduling the batch of transmissions that collectively carry the file.

7. The method of claim 1, further comprising:

receiving, via a preemption indication, an indication that at least a portion of the first resources allocated for the communication of the batch of transmissions that collectively carry the file is preempted; and applying the preemption indication to processing or transmission of the batch of transmissions in accordance with a rule for preemption of batches.

8. The method of claim 7, wherein the batch of transmissions is received from a network entity, and wherein applying the preemption indication to processing or transmission of the batch of transmissions comprises:

processing the batch of transmissions without processing transmissions received on the portion of the first resources indicated as preempted, in accordance with the rule for preemption of batches.

9. The method of claim 8, wherein the batch of transmissions is transmitted to the network entity, and wherein applying the preemption indication to the processing or the transmission of the batch of transmissions comprises:

transmitting a first portion of the file using resources of the first resources that precede the portion of the first resources indicated as preempted; and refraining from transmitting a second portion of the file on the portion of the first resources indicated as preempted, in accordance with the rule for preemption of batches.

10. The method of claim 7, wherein the batch of transmissions is received from a network entity, and wherein applying the preemption indication to processing or transmission of the batch of transmissions comprises:

processing the batch of transmissions or transmitting the file by ignoring the preemption indication, in accordance with the rule for preemption of batches.

11. The method of claim 1, further comprising:

receiving at least one grant as a configured grant via a radio resource control message, the configured grant including a configured grant index indicative of a resource configuration for communication, by the UE, of the batch of transmissions that collectively carry the file having the plurality of packets configured to be processed together, wherein a packet is communicated based at least in part on the configured grant, and wherein the UE participates in the communication based at least in part on the configured grant.

12. The method of claim 11, wherein receiving the at least one grant as the configured grant comprises:

receiving the configured grant comprising one or more assignments for the communication of the file using two or more transport blocks.

13. The method of claim 12, wherein the two or more transport blocks are scheduled by the one or more assignments to be transmitted or received in two or more adjacent slots.

14. The method of claim 1, wherein receiving the third DCI message comprises:

receiving a grant for communication, by the UE, of an uplink transmission that is part of the batch of transmissions that collectively carry the file having the plurality of packets configured to be processed together; and transmitting the uplink transmission in accordance with a transmission power based at least in part on the grant pertaining to transmission of the batch of transmissions.

15. The method of claim 14, wherein the transmission power is based at least in part on a size of the file, an indication from a control channel message, a pre-defined power offset, or a combination thereof.

16. A non-transitory computer-readable medium storing code for wireless communication, the code comprising instructions executable by one or more processors to:

monitor, via a first set of decoding candidates, for a first downlink control information (DCI) message that indicates first resources for communication of a batch of transmissions that collectively carry a file having a plurality of packets configured to be processed together;

monitor, via a second set of decoding candidates, for a second DCI message that indicates second resources for communications not pertaining to files, wherein the first set of decoding candidates and the second set of decoding candidates differ by at least one decoding candidate;

monitor, via the first set of decoding candidates, for a third DCI message that indicates third resources for communication of the batch of transmissions;

receive the third DCI message based at least in part on monitoring for the third DCI message via the first set of decoding candidates, wherein the third DCI message includes an indication linking the third DCI message to the first DCI message corresponding to the first resources for communicating the batch of transmissions; and participate in communications of the batch of transmissions based at least in part on receiving the first DCI message.

17. The non-transitory computer-readable medium of claim 16, wherein the first set of decoding candidates and the second set of decoding candidates differ by the at least one decoding candidate based at least in part on a set of aggregation levels, a set of decoding candidates for a given aggregation level, or a downlink control information message size.

18. A user equipment (UE) for wireless communication, comprising:

one or more memories storing processor-executable code; and one or more processors coupled with the one or more memories and individually or collectively operable to execute the code to cause the UE to:

monitor, via a first set of decoding candidates, for a first downlink control information (DCI) message that indicates first resources for communication of a batch of transmissions that collectively carry a file having a plurality of packets configured to be processed together;

monitor, via a second set of decoding candidates, for a second DCI message that indicates second resources for communications not pertaining to files, wherein the first set of decoding candidates and the second set of decoding candidates differ by at least one decoding candidate;

monitor, via the first set of decoding candidates, for a third DCI message that indicates third resources for communication of the batch of transmissions;

receive the third DCI message based at least in part on monitoring for the third DCI message via the first set of decoding candidates, wherein the third DCI message includes an indication linking the third DCI message to the first DCI message corresponding to the first resources for communicating the batch of transmissions; and participate in communications of the batch of transmissions based at least in part on receiving the first DCI message.

19. The UE of claim 18, wherein, to monitor for the first DCI message and the third DCI message via the first set of decoding candidates and to monitor for the second DCI message via the second set of decoding candidates, the one or more processors are individually or collectively further operable to cause the UE to:

monitor a cell-specific or a group-specific downlink control channel.

* * * * *